US012333059B1

(12) United States Patent
Gilbert et al.

(10) Patent No.: US 12,333,059 B1
(45) Date of Patent: Jun. 17, 2025

(54) DEVICE WITH ROTATABLE PRIVACY COVER

(71) Applicant: Amazon Technologies, Inc., Seattle, WA (US)

(72) Inventors: Marcus-Alan Gilbert, Plano, TX (US); Matthew J. England, Santa Monica, CA (US); Shao-Hung Wang, Taipei (TW); Oleksii Krasnoshchok, Kiev (UA); Eric S. Micko, San Jose, CA (US); Michael Kalajian, Calabasas, CA (US); Matthew Glein, Los Angeles, CA (US); Te-Chun Hsu, New Taipei (TW)

(73) Assignee: Amazon Technologies, Inc., Seattle, WA (US)

( * ) Notice: Subject to any disclaimer, the term of this patent is extended or adjusted under 35 U.S.C. 154(b) by 246 days.

(21) Appl. No.: 17/991,638

(22) Filed: Nov. 21, 2022

(51) Int. Cl.
*G06F 21/84* (2013.01)
*G03B 11/04* (2021.01)
*H04N 7/18* (2006.01)

(52) U.S. Cl.
CPC ............ *G06F 21/84* (2013.01); *G03B 11/043* (2013.01); *H04N 7/18* (2013.01)

(58) Field of Classification Search
CPC .. G03B 11/043; G03B 17/561; G03B 11/041; G03B 17/02; G03B 30/00; G03B 11/045; G03B 29/00; G03B 11/04; G03B 7/26
USPC ......................................... 348/143
See application file for complete search history.

(56) References Cited

U.S. PATENT DOCUMENTS

| 2014/0080542 A1* | 3/2014 | Pan ..................... H04M 1/0283 |
| | | 455/556.1 |
| 2022/0334618 A1* | 10/2022 | Magi ..................... G06F 1/1656 |

* cited by examiner

*Primary Examiner* — Masum Billah
(74) *Attorney, Agent, or Firm* — Eversheds Sutherland (US) LLP

(57) ABSTRACT

A device includes a camera and a privacy cover configured to rotate between a first position and a second position. In the first position, the camera is deactivated and the privacy cover obstructs the camera. In the second position, the camera is activated and the camera is unobstructed by the privacy cover. A first indication is visible through a portion of the privacy cover in the first position, the first indication indicating that the camera is deactivated. A second indication is visible through the portion of the privacy cover in the second position, the second indication indicating that the camera is activated.

29 Claims, 45 Drawing Sheets

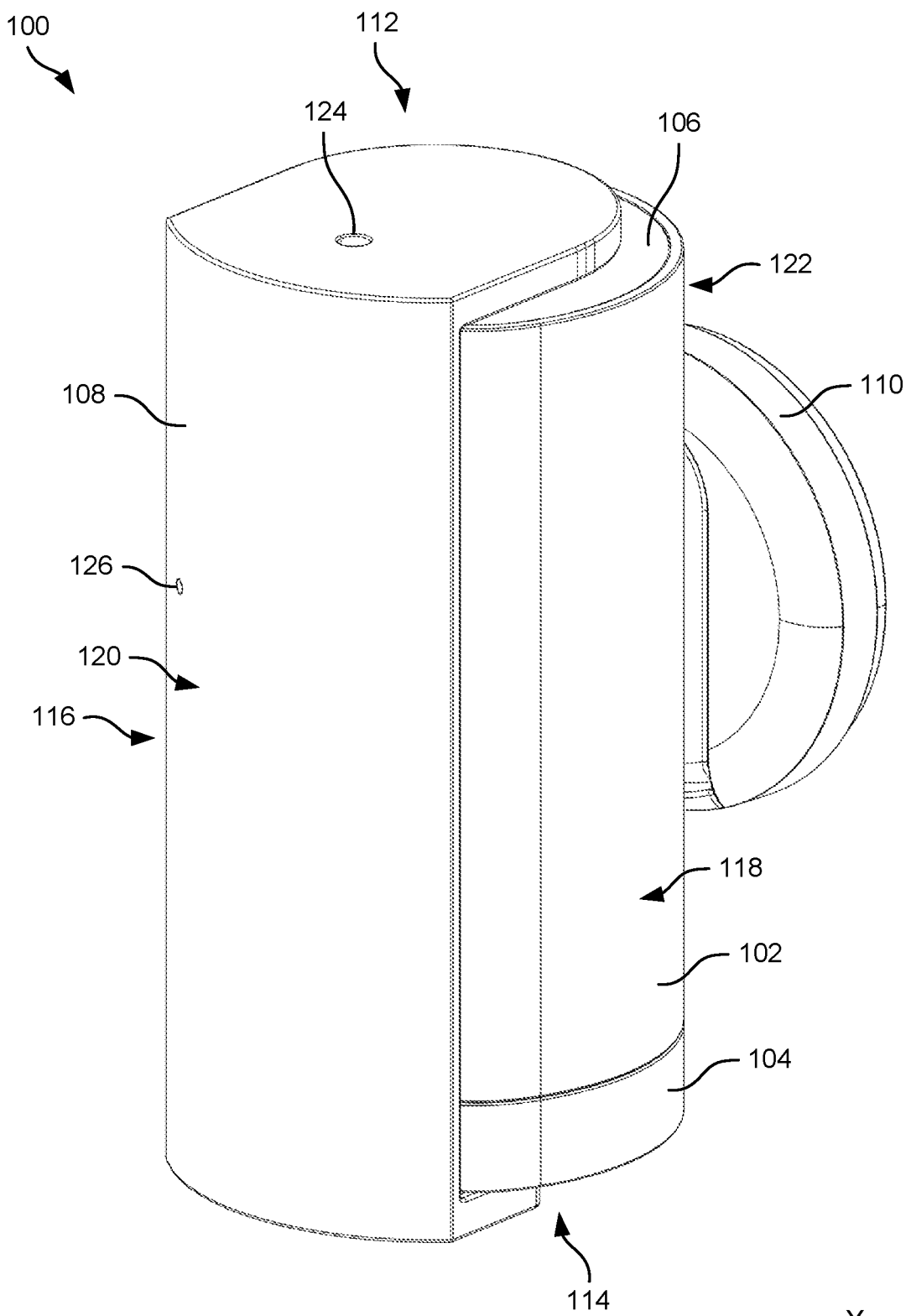
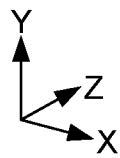
FIG. 1

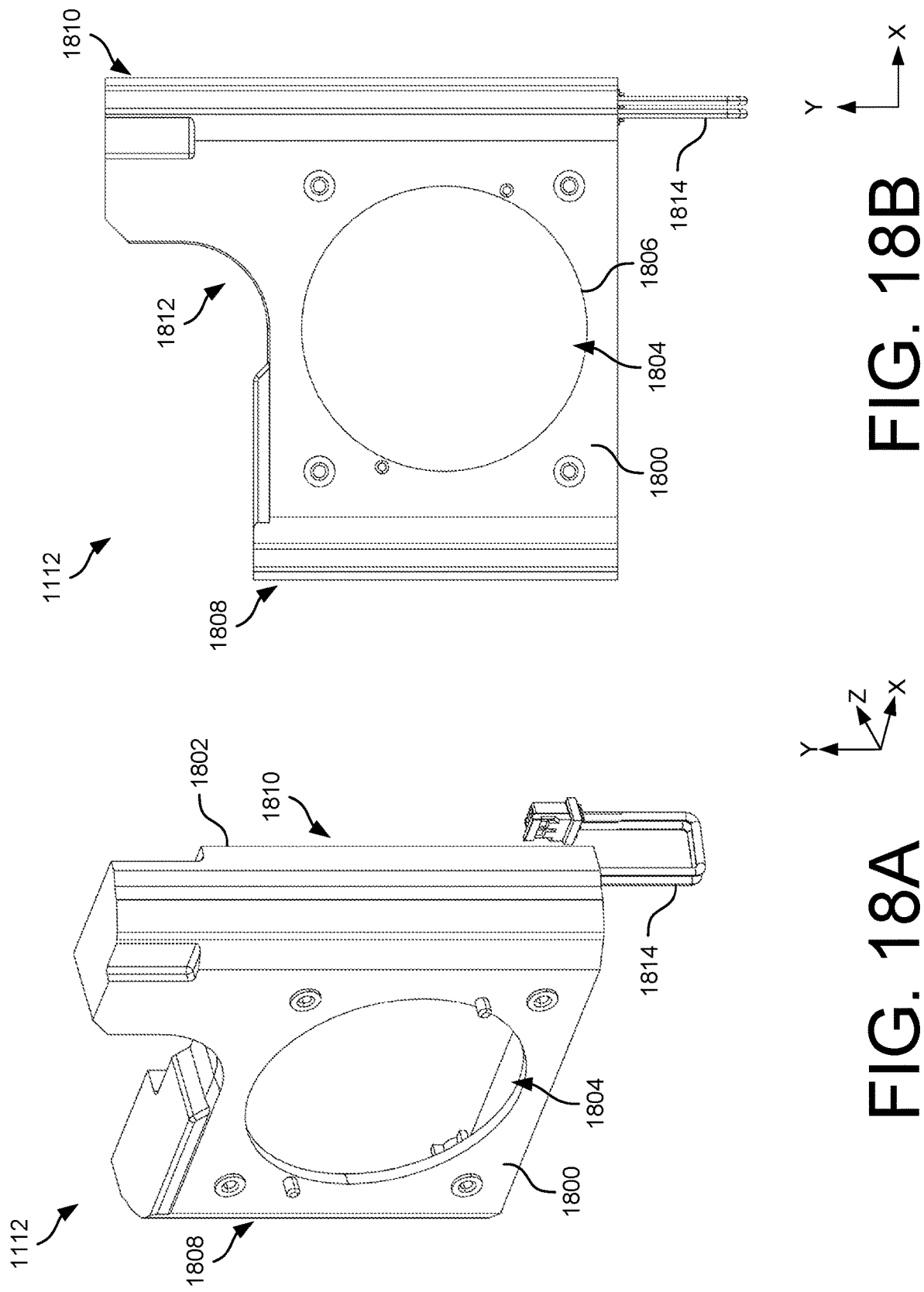

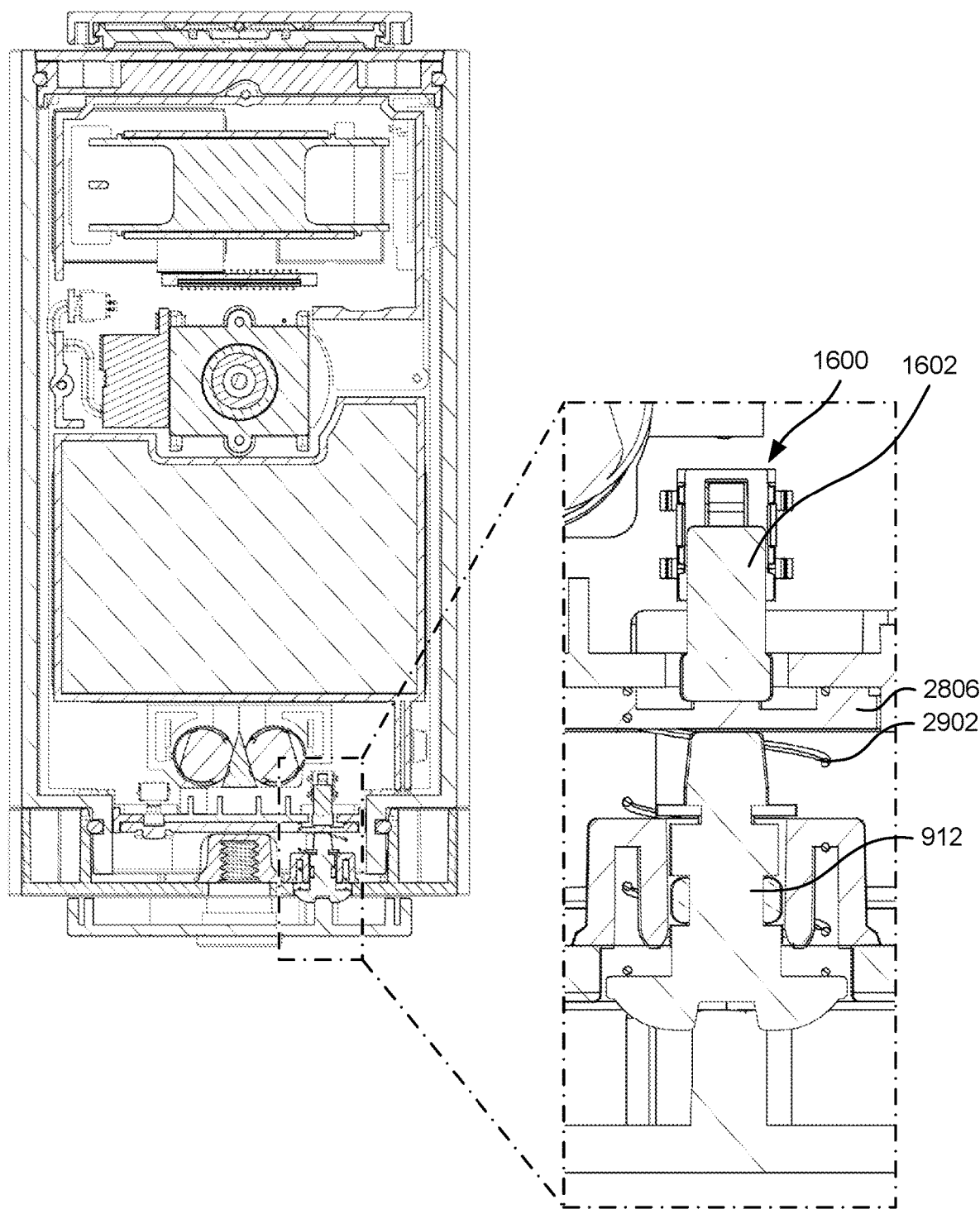
FIG. 29B
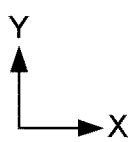

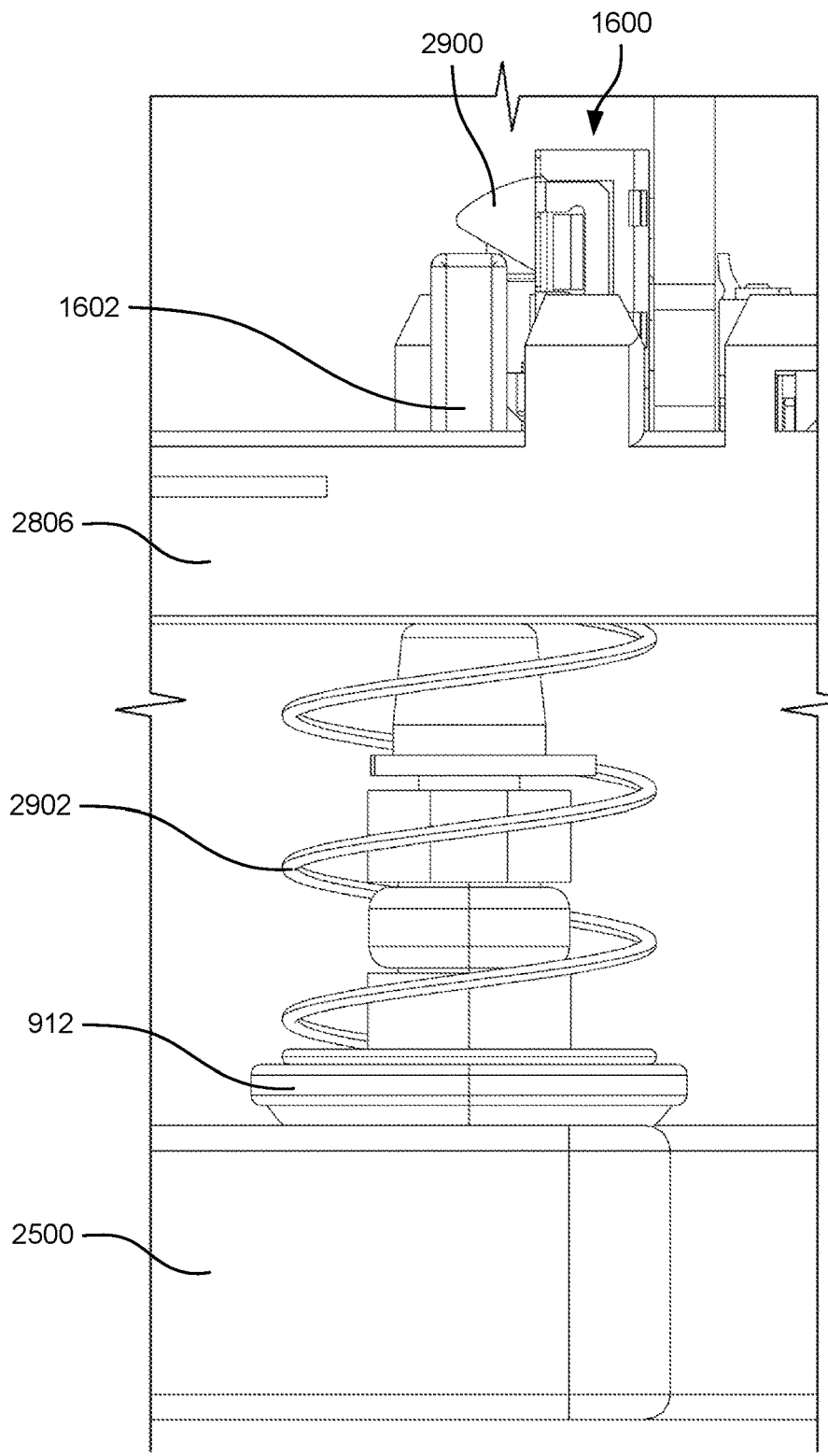
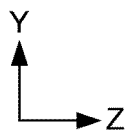
FIG. 30C

DEVICE WITH ROTATABLE PRIVACY COVER

BACKGROUND

Security is a concern for many homeowners, businesses, and the like. In some examples, those seeking to protect or monitor their homes or place of business may wish to have video and audio communications. Devices, for example, may be placed adjacent to an external door or entryway. However, conventional devices may be unaesthetically appealing, have large form factors, and/or have suboptimal audio and/or video characteristics. Additionally, current devices may not be conveniently deactivated to provide privacy.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features. The components, devices, and/or apparatuses depicted in the accompanying figures are not to scale and components within the figures may be depicted not to scale with each other.

FIG. 1 illustrates a front perspective view of an example device, showing an example privacy cover of the device in a first position to obstruct a camera of the device, according to an example of the present disclosure.

FIGS. 18A and 18B illustrate an example speaker box of the device of FIG. 1, according to an example of the present disclosure.

FIG. 29B illustrates a cross-sectional view of the device of FIG. 1, taken along line B-B of FIG. 7B, according to an example of the present disclosure.

FIGS. 30A-30D illustrate an operation of an example button and switch of the device of FIG. 1 for controlling an operation one or more components of the device, according to an example of the present disclosure.

DETAILED DESCRIPTION

Figure 2:
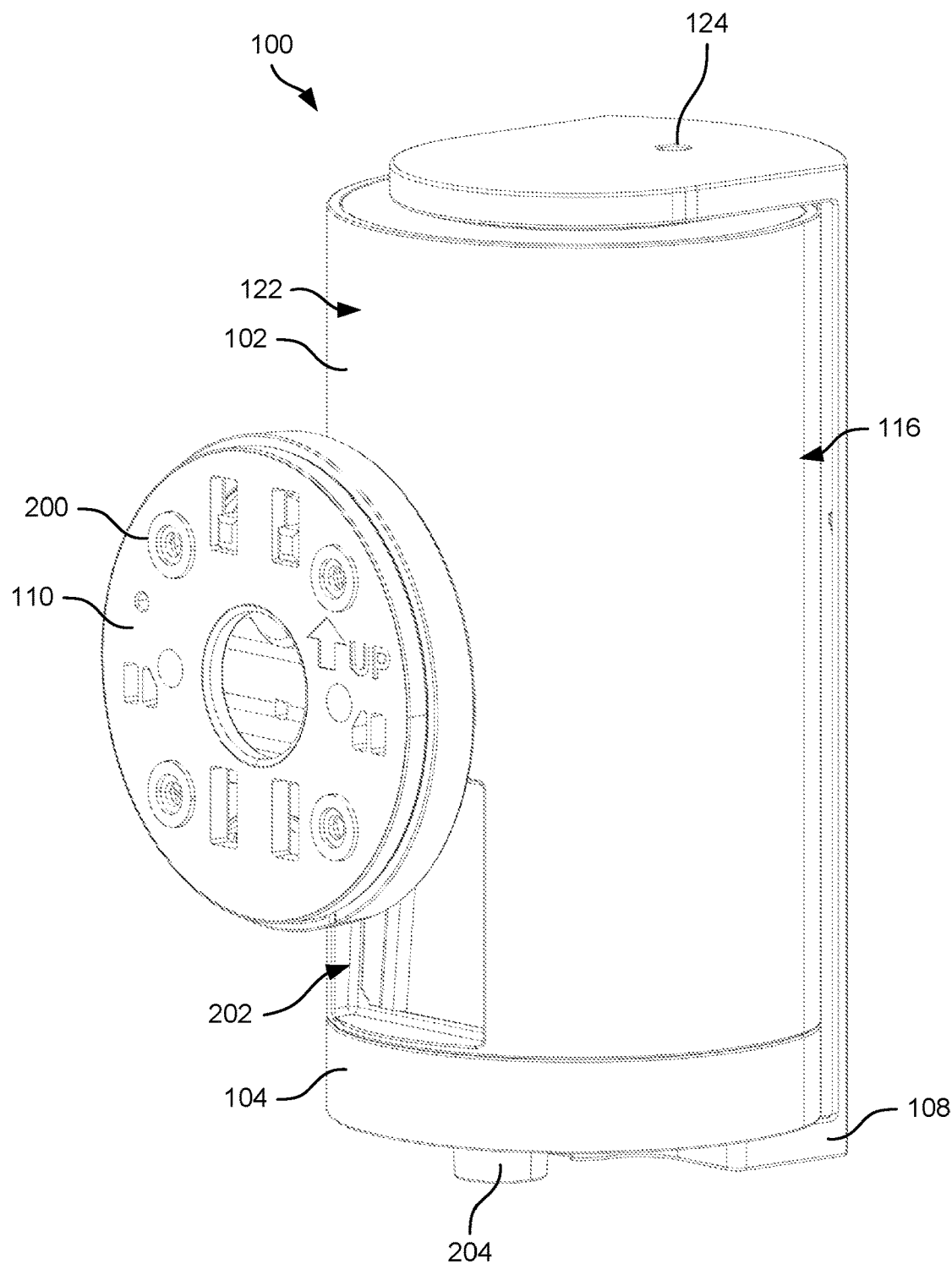
FIG. 2 illustrates a rear perspective view of the device of FIG. 1, according to an example of the present disclosure.

This application is directed, at least in part, to a device having a privacy cover that is configured to rotate between positions for obstructing and unobstructing a camera of the device. In some instances, the device includes a housing and a cover coupled to the housing. The privacy cover may couple to the housing at a top of the device and the cover at a bottom of the device. At a first position, the privacy cover may be disposed over a front of the device and obstruct the camera. At a second position and a third position, the privacy cover may be disposed alongside a first side and a second side of the device, respectively, and may not obstruct the camera. When unobstructed, the camera may capture image and/or video data within an environment of the device. The privacy cover may rotate between the first position, the second position, and the third position via a rotational coupling with the housing and the cover, respectively. As such, the privacy cover may transition to obstruct the camera for privacy and unobstruct the camera to monitor the environment.

In some instances, movement of the privacy cover may correspondingly engage and disengage a button that respectively actives and deactivates components of the device, such as the camera. For example, in the first position, a feature of the privacy cover, such as a protrusion or rib, may engage with a button extending from the cover. The engagement between the rib and the button causes the button to translate and activate a switch within the device. In some instances, the button extends from the cover and into the housing so as to engage with the switch. Activation of the switch disables the camera of the device. That is, in addition to the camera being occluded by the privacy cover in the first position, the camera may be deactivated. Additionally, activation of the switch may deactivate additional components of the device, such as microphones, speakers, and so forth. However, when the privacy cover moves to the second position and/or the third position, the rib of the privacy cover may no longer engage with the button. Correspondingly, the button may not engage with the switch, and in turn, the camera (as well as other components of the device) may be activated. A biasing member, such as a spring or actuator, may engage with the button to bias the button away from the switch when not engaged with the privacy cover.

The device may include indicators that provide notifications regarding an operational state of the device. For example, when the privacy cover is in the first position, visual elements or visual notifications may indicate that the camera is obstructed. Additionally, when the privacy cover is in the second position and the third position, visual notifications may indicate that the camera is unobstructed. In some instances, the visual indications may be visible through the privacy cover and/or on other portions of the device, such as the housing. In some instances, first indications may be visible from a top of the device, and a second indication may be visible from the front of the device. In some instances, the first indications may be a graphic (e.g., sticker), decal, and the like. The device may include more than one of the first indications to indicate whether the camera is activated or deactivated. In some instances, the second indication may be output by a status indicator (e.g., RGB LED) that illuminates to different colors of light, different patterns of light, and so forth depending on whether the camera is activated or deactivated. For example, the status indicator may indicate whether the camera(s) are capturing video, and so forth.

The privacy cover may include a first passageway through which the first indications are visible. In the first position, a first of the first indications may be visible through the first passageway. For example, the first of the first indication may include a symbol and/or color (e.g., red circle with diagonal line) indicating that the camera is deactivated. In the second position, a second of the first indications may be visible through the first passageway. For example, the second of the first indications may include a symbol and/or color (e.g., green circle) indicating that the camera is activated. In the third position, a third of the first indications may be visible through the first passageway. For example, the third of the first indications may include a symbol and/or color (e.g., green circle) indicating that the camera is activated. The third of the first indications may be the same as the second of the third indications.

The privacy cover may also include a second passageway within which a light pipe is disposed. The light pipe may be disposed within, and coupled to, the privacy cover. The light pipe may direct light from the lighting element that provides the second indication. For example, in the first position, the lighting element may be disposed beneath the privacy cover. To make the second indication visible, light emitted via the lighting element may travel through the light pipe to an exterior of the device. The light emitted via the lighting element may be red, for example, when the privacy cover is in the first position. When the privacy cover is in the second position and/or the third position, light emitted via the lighting element may be green, or may be blue when the camera is recording. In the second position and the third position of the privacy cover, however, the light emitted via the light element may not travel through the light pipe being as the privacy cover is not disposed over the lighting element.

In addition to the camera, the device may include additional computing components for carrying out an operation of the device. For example, the device may include light emitting elements (e.g., light emitting diodes (LEDs)), a radar sensor, passive infrared (PIR) sensor(s) for detecting motion, recording audio and/or video, and so forth within the environment. Additionally, the device may include a speaker (e.g., mid-range speaker, tweeter speaker, subwoofer speaker) for outputting sound within the environment, and one or more microphones for capturing audio (e.g., user speech). In some instances, the microphone(s) are arranged on or across the front of the device. In some instances, the microphone(s) may be located between the camera and the top of the device. As such, the microphone(s) may be located closer to the top of the device than the camera(s). Additionally, the microphone(s) may include at least two microphones for noise cancellation, directionality, and so forth. In some instances, the computing components may reside within the housing of the device.

The device may include a front, a back, a top, a bottom, and adjacent lateral sides. In some instances, the camera(s), the PIR sensor(s), and/or the radar sensors are oriented towards the front. In some instances, the camera(s) may be located closer to the top than the PIR sensor(s). In some instances, the radar sensor may be located closer to the top than the camera(s). In some instances, the microphone(s) may be located closer to the top than the radar sensor. In some instances, the camera(s), the PIR sensor(s), and/or the RADAR may serve to detect motion within the environment. For example, image processing on video data captured by the camera (e.g., when the camera is unobstructed) may be used to detect persons (or other objects of interest). The PIR sensor(s) detect or receive IR light emitted by persons (e.g., according to a temperature of the person). The radar sensor may be used to determine polar coordinates (or a position) of persons. In some instances, the radar sensor may enable the device to focus on object detection and capabilities to operation in low power modes. In some instances, the camera(s), the PIR sensor(s), and/or the radar sensor may be used in combination to detect persons, and in response, capture video and/or audio data. For example, motion being detected via the PIR sensor(s), the camera may begin recording video data.

The device may include various LEDs for illuminating the environment and for enabling the camera to capture video data and/or detect motion. In some instances, the LEDs may be disposed within the housing. In some instances, the LEDs may include first LEDs (e.g., wLEDs) arranged on the front of the device, and second LEDs (e.g., IR LEDs) arranged on the front of the device. The first LEDs may emit light upon motion being detected, while the second LEDs may enable the camera(s) to capture video data in low-light conditions (e.g., night time). In some instances, the first LEDs and/or the second LEDs are vertically above the camera(s) and/or the speaker, and/or vertically below the microphone(s). Any number of the first LEDs and the second LEDs may be included.

In some instances, one or more printed circuit boards (PCBs) or printed circuit board assemblies (PCBAs) are disposed within the housing. In some instances, the device includes a radar PCB, an LED PCB, and/or a main PCB. The radar sensor may be disposed on the radar PCB (or a first PCB) and the first LEDs and/or the second LEDs may be disposed on the LED PCB (or a second PCB). In some instances, the status indicator, the microphone(s), and/or the ambient light sensor are additionally disposed on the LED PCB. The camera, as well as other computing components of the device, such as network interfaces, the switch for deactivating the camera, power modules, and so forth are disposed on the main PCB (or a third PCB). The network interfaces (e.g., antenna(s)) wirelessly couple the device to one or more remote devices (e.g., mobile device, laptop, etc.) over one or more networks (e.g., Cellular, Wi-Fi, BLE, Bluetooth, etc.). The PCBs, as well as other computing components of the device may be communicatively coupled to one another via one or more flex circuits, wires, connectors, and so forth. For example, the PCBs may be communicatively coupled for distributing power to components of the device.

The device may include one or more windows or lenses disposed over the camera(s), PIR sensor(s), radar sensor, and/or the LEDs. For example, a camera lens may be disposed over the camera, a first cover may be disposed over the first LEDs, the second LEDs, and/or the radar sensor, and a second cover may be disposed over the PIR sensor(s). Additionally, a speaker grill and/or other membranes are disposed over the speaker. In some instances, the camera lens may be received within at least a portion of the first cover and/or the speaker grill For example, the camera lens may reside within openings or cutouts of the first cover and/or the speaker grill. In some instances, the cover and the speaker grill may couple to a housing, at the front of the device. The covers, lenses, and speaker grill may also conceal the camera(s), PIR sensor(s), radar sensor, the LED(s), and/or the speaker from view, respectively. The covers and lenses may include a material that is transparent or translucent to permit the PIR sensor(s) to detect motion and the cameras to record video, for example, respectively. Example materials may include glass, germanium, high density polyethylene (HDPE), polycarbonate, and so forth.

In some instances, the housing and the cover may couple together via a twist and lock mechanism. Attachment mechanisms of the housing and the cover may form the twist and lock mechanism. For example, the housing may include first attachment mechanisms that engage with second attachment mechanism of the cover. In some instances, the first attachment mechanisms may angularly span around at least a portion of a perimeter, circumference, or periphery of the housing, while the second attachment mechanisms may span around at least a portion of an opening, annulus, or receptacle of the cover. The first attachment mechanisms and the second attachments mechanism may engage (e.g., interlock) via a rotation of the housing and/or the cover. For example, rotating the housing and/or the cover in a first direction (e.g., clockwise) may engage the first attachment mechanisms and the second attachment. When engaged, the housing and the cover may be securely coupled together. Rotating the housing and/or the cover in a second direction (e.g., counterclockwise) may disengage the first attachment mechanisms and the second attachment mechanisms such that the housing and the cover may be uncoupled. In some instances, the first attachment mechanisms may resemble tabs, hooks, protrusions, keys, keyways, slots, or other male/female connectors that are complimentary to engage with the second attachment mechanisms.

The housing may include cutouts, apertures, recesses, and the like for accommodating or otherwise receiving the lenses, cover, speaker grill, components of the device, and so forth, respectively. By way of example, the housing and/or the cover may include various frames, mounts, and brackets for receiving components of the device, or to which components of the device couple. For example, a frame of the housing may receive the camera, and/or housing may include a speaker box for receiving the speaker. In some instances, the covers couple to the frame. The frames may also include various alignment mechanisms, such as tabs, pins, slits, and so forth for aligning components within the device. Additionally, the housing may include a battery housing that defines one or more battery receptacles. For example, the battery housing may include a body that defines a battery receptacle for receiving a battery. In some instances, the battery receptacle may be accessible via a bottom of the housing, and by uncoupling the housing and the bottom cover. For example, the battery may be removed to interchange batteries or to charge the batteries.

In some instances, a mount may couple to the device to dispose the device on a vertical surface (e.g., wall) or a horizontal surface (e.g., shelf). In some instances, the mount may couple to the housing or the cover. In some instances, the mount couples to the housing for disposing the device on the vertical surface, and mount may couple to the cover for disposing the device on the horizontal surface. In some instances, the same mount used to dispose the device on the vertical surface may be the same mount used to dispose the device on the horizontal surface. For example, the mount may be removably coupled to the housing and the cover depending upon the configuration desired. When the mount couples to the housing and the vertical surface, the device may hang, and when the mount couples to the cover, the device may stand on the horizontal surface (via the mount).

In some instances, the engagement between the housing and/or the mount may permit the device the device to be reoriented, such as for changing a field of view (FoV) of the device. For example, the mount may include arms, members, etc. that extend for translating the device towards and away from the mount, and may include a ball and socket coupling for swiveling, rotating, or pivoting the device.

The device may also include heat dissipating elements are included to disperse heat generated by components of the device. By way of example and not limitation, the camera(s), LEDs, power supply, network interfaces, and so forth generate heat during use. Without effectively dispersing or dissipating this heat, the internal components, such as the camera, may be adversely effected and become uncappable of performing its intended function. To efficiently dissipate heat generated by the components, heat dissipating elements may be included within the housing to transmit heat away from generating sources toward an exterior of the device.

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are nonlimiting embodiments. The features illustrated or described in connection with one embodiment may be combined with the features of other embodiments. Such modifications and variations are intended to be included within the scope of the appended claims.

FIG. 1 illustrates a front perspective view of an example device 100, according to an example of the present disclosure. In some instances, the device 100 may represent an electronic device, audio/video (AV) device, and so forth. In some instances, the device 100 includes a housing 102, a bottom cover 104 coupled to the housing 102, a top cover 106 coupled to the housing 102, a privacy cover 108 rotatably coupled to the housing 102, and a mount 110 coupled to the housing 102.

As shown, and in some instances, the device 100 may generally include a cylindrical shape. However, other shapes are envisioned (e.g., square, hexagonal, etc.). The device 100 may include a top 112, a bottom 114 opposite the top 112 (e.g., spaced apart in the Y-direction), a first side 116, a second side 118 opposite the first side 116 (e.g., spaced apart in the X-direction), a front 120, and a back 122 opposite the front 120 (e.g., spaced apart in the Z-direction). In some instances, the privacy cover 108 rotatably couples to the housing 102 proximate to the top 112 (via the top cover 106) and the bottom 114 (via the bottom cover 104). In some instances, the mount 110 may couple to the housing 102 at the back 122. The bottom cover 104 may couple to the housing 102 at the bottom 114, and the top cover 106 may couple to the housing 102 at the top 112. As will be explained herein, the housing 102 and the bottom cover 104 may couple together via a twist and lock mechanism. For example, rotating the housing and/or the bottom cover 104 in a first direction may couple the housing 102 and the bottom cover 104 together, while rotating the housing 102 and/or the bottom cover 104 in a second direction (opposite the first direction) may uncouple the housing 102 and the bottom cover 104. The privacy cover 108 may be coupled to the housing 102 and the bottom cover 104 after the housing 102 and the bottom cover 104 are coupled together, and the privacy cover 108 may be removed before the housing 102 and the bottom cover 104 are uncoupled.

The privacy cover 108 is configured to rotate (e.g., swing, swivel, etc.) between the first side 116, the front 120, and the second side 118. In FIG. 1, the privacy cover 108 is shown being disposed alongside the front 120. At this position, which may be considered a first position of the privacy cover 108, the privacy cover 108 may prevent a camera of the device 100 capturing images and/or videos within an environment of the device 100. For example, in the first position in which the privacy cover 108 is disposed alongside the front 120 of the device 100, the privacy cover 108 may obstruct the camera. Additionally, in the first position, mechanisms (e.g., face, projection, protrusion, rib, etc.) of the privacy cover 108 may engage a switch of the device 100 to disable the camera and/or other components of the device 100 (e.g., microphones). As such, when in the first position, the privacy cover 108 may not only physically obstruct the camera, but a switch of the device 100 may be activated to disable the camera and/or other components of the device 100.

The privacy cover 108 is configured to rotate (e.g., about the Y-axis) to the right (clockwise) to a second position and to the left (counterclockwise) to a third position. At the second position and the third position, the camera and/or other components may be activated (or permitted to be activated such as when motion is detected). During rotation, and when in the second position and the third position, the privacy cover 108 may remain coupled to the housing 102. The privacy cover 108 may therefore rotate between the first position, the second position, and the third position, and may be staged at any position therebetween. As the privacy cover 108 rotates, the privacy cover 108 may traverse over the housing 102 and the bottom cover 104, such as an exterior surface thereof of the housing 102 and the bottom cover 104.

The privacy cover 108 may include a first passageway 124 that provides an user of the device to view an operational state of the device 100. For example, when in the first position, a first visual element or indication (e.g., red light, red graphic, red decal, etc.) may be visible through the first passageway 124. The first indication may indicate that the components of the device 100 are deactivated. When rotated to the second position and the third position, a second visual element or indication (e.g., green light, green graphic, green decal, etc.) may be visible through the first passageway 124. The second indication may indicate the components of the device 100 are activated. The first passageway 124 therefore serves to provide indications to users of the device 100 as to whether the camera, as well as other components, are activated or deactivated.

In some instances, the mount 110 may couple to a surface (e.g., wall) for disposing the device 100 on the surface. In some instances, the mount 110 rotatably, pivotably, or translationally couples to the housing 102. For example, a ball and socket joint may couple the housing 102 and the mount 110. Additionally, or alternatively, the mount 110 may extend (e.g., in the Z-direction) to translate the housing 102 away from the surface. Regardless, the coupling between the housing 102 and the mount 110, or the mount 110 itself, may adjust a FoV of the device 100 (e.g., camera(s), sensor(s), etc.)). Further, although the mount 110 is shown coupled to the housing 102 at the back 122 of the device 100, the mount 110 may be coupled to other portions of the housing 102 and/or the bottom cover 104. For example, the mount 110 (whether the same mount or a different mount), may couple to the bottom cover 104.

The housing 102 includes at least partially forms an exterior surface of the device 100. For example, the housing 102 may be disposed along the front 120, the back 122, the first side 116, and/or the second side 118 of the device 100. The bottom cover 104 couples to the housing 102 is disposed along the front 120, the back 122, the bottom 114, the first side 116, and/or the second side 118 of the device. Additionally, the top cover 106 couples to the housing 102, opposite the bottom cover 104, and is disposed along the top 112 of the device 100. In some instances, seals or gaskets may be disposed at an interfaces between the housing 102 and the bottom cover 104, and/or the housing 102 and the top cover 106.

The privacy cover 108 may include a second passageway 126 that permits light emitted via a status indicator residing with the device 100 to be visible from an exterior of the device 100. A light pipe may reside within the second passageway 126, and light may travel through the light pipe for being visible on the exterior of the device 100. In some instances, the light pipe may be disguised on the privacy cover 108. For example, a layer of paint, or a thin layer of plastic material of the privacy cover 108, may be disposed over an end of the light pipe.

FIG. 2 illustrates a rear perspective view of the device 100, according to an example of the present disclosure. The mount 110 is shown coupled to the housing 102, at the back 122 of the device 100 (or a back of the housing 102). The mount 110 is shown including holes 200 for receiving fasteners (e.g., screws) that may couple the mount 110 to a surface (e.g., wall). For example, fasteners may be disposed through the holes 200 and secured into a surface for coupling the mount 110 to the surface.

The housing 102 includes a pocket 202 for coupling the device 100 to networks, mains power, other devices, and so forth. For example, port(s) (e.g., power socket, auxiliary jack, ethernet, etc.) may be disposed within the pocket 202. As such, cables, wires, or other connectors may be routed into the pocket 202 and into the port(s).

The bottom cover 104 may include a receptacle 204 for receiving the mount 110, such as in instances where the mount 110 couples to the bottom cover 104. In this scenario, the mount 110 may be removed from the housing 102, and instead, coupled to the bottom cover 104 via the receptacle 204. Here, the device 100 may rest on surface (e.g., shelf, countertop, etc.), as compared to being mounted to a surface. In instances in which the mount 110 couples to the bottom cover 104, the device 100 may still be capable of being reoriented (e.g., pivotable, translatable, etc.).

Figure 3:
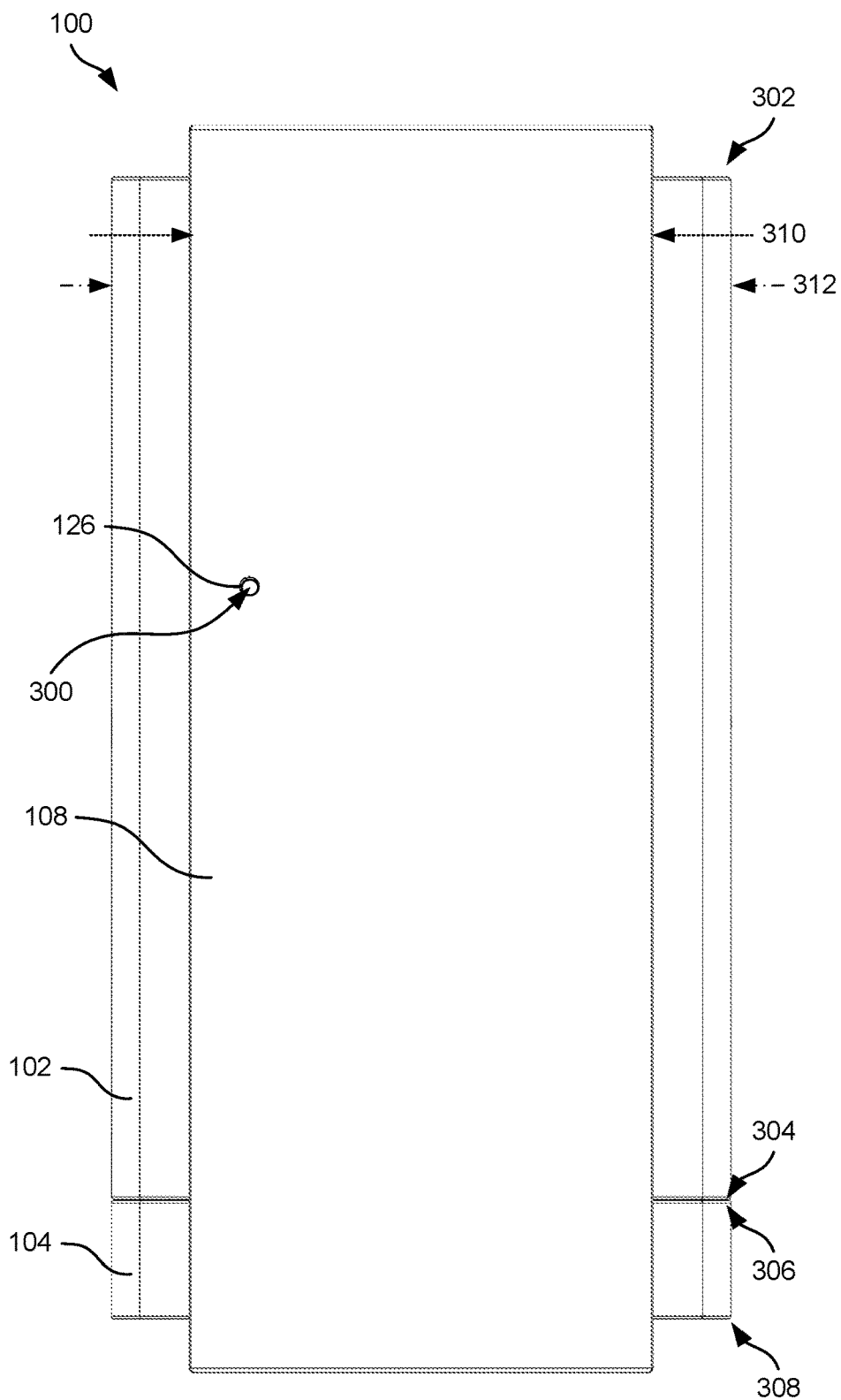
FIG. 3 illustrates a front view of the device of FIG. 1, according to an example of the present disclosure.

FIG. 3 illustrates a front view of the device 100, according to an example of the present disclosure. The privacy cover 108 is shown in the first position for obstructing the camera. The privacy cover 108 is shown including the second passageway 126 which, in some instances, extends through a thickness of the privacy cover 108. The second passageway 126 may receive a light pipe 300 of the device 100, where the light pipe 300 may direct light from an lighting element (e.g., status indicator) within the device 100. The light pipe 300 is disposed within the second passageway 126, and coupled to the privacy cover 108. The light pipe 300 may direct light emitted from the lighting element, which resides within the device 100, to an exterior of the device 100. In this sense, the lighting element may serve as a status indicator of the device 100, and may illuminate red in instances where the privacy cover 108 is in the first position to signify that the components of the device 100 are not activated. When the privacy cover 108 moves to the second position or the third position, the lighting element may illuminate green to indicate that the components of the device 100 are activated, and/or in response to sensing motion (e.g., blue). However, in the first position, the light pipe 300 directs light from the LED to the exterior of the device 100.

The housing 102 may include a top end 302 and a bottom end 304 spaced apart from the top end 302 (e.g., in the Y-direction). Likewise, in some instances, the bottom cover 104 may include a top end 306 and a bottom end 308 spaced apart from the top end 306 (e.g., in the Y-direction). The top end 306 of the bottom cover 104 may couple to the bottom end 304 of the housing 102. In some instances, the coupling between the top end 306 of the bottom cover 104 and the bottom end 304 of the housing 102 may resemble a twist and lock mechanism. For example, the bottom cover 104 may be rotated to couple the bottom cover 104 to the housing 102, where rotation in a first direction (e.g., clockwise) engages first attachment mechanism of the housing 102 (e.g., keyways, slots, etc.) with second attachment mechanisms of the bottom cover 104 (e.g., tabs, prongs, etc.). Rotation of the bottom cover 104 in an opposite second direction (e.g., counterclockwise) disengages the first attachment mechanisms of the housing 102 and the second attachment mechanisms of the bottom cover 104.

In some instances, the housing 102 and/or the bottom cover 104 includes a first width 310 (e.g., in the X-direction), and the privacy cover 108 includes a second width 312 (e.g., in the X-direction) that is less than the first width 310. Although the privacy cover 108 does not extend across the first width 310, the second width 312 of the privacy cover 108 may be sufficient to obstruct the camera.

Figure 4:
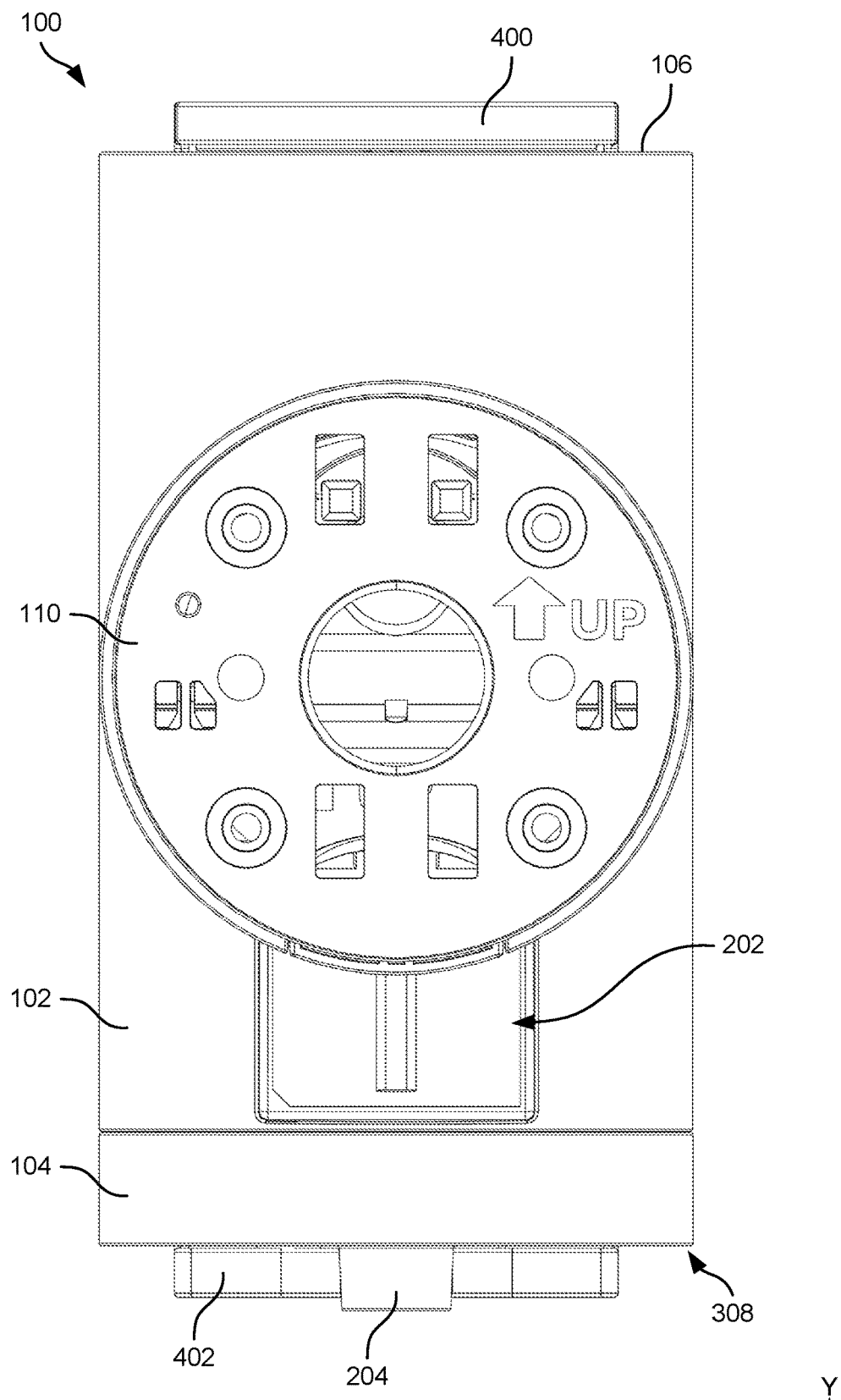
FIG. 4 illustrates a rear view of the device of FIG. 1, according to an example of the present disclosure.

FIG. 4 illustrates a back view of the device 100, according to an example of the present disclosure. The mount 110 is shown coupled to the back 122 of the device 100, and the pocket 202 is shown being formed within the housing 102. Additionally, the privacy cover 108 is shown including a first arm 400 and a second arm 402. The first arm 400 may extend at least partially onto and/or over the top end 302 of the housing 102 and/or over the top cover 106, while the second arm 402 may extend at least partially onto and/or over the bottom end 308 of the housing 102 and/or over the bottom cover 104. The receptacle 204 is further shown on the bottom cover 104 for receiving to the mount 110.

Figure 5:
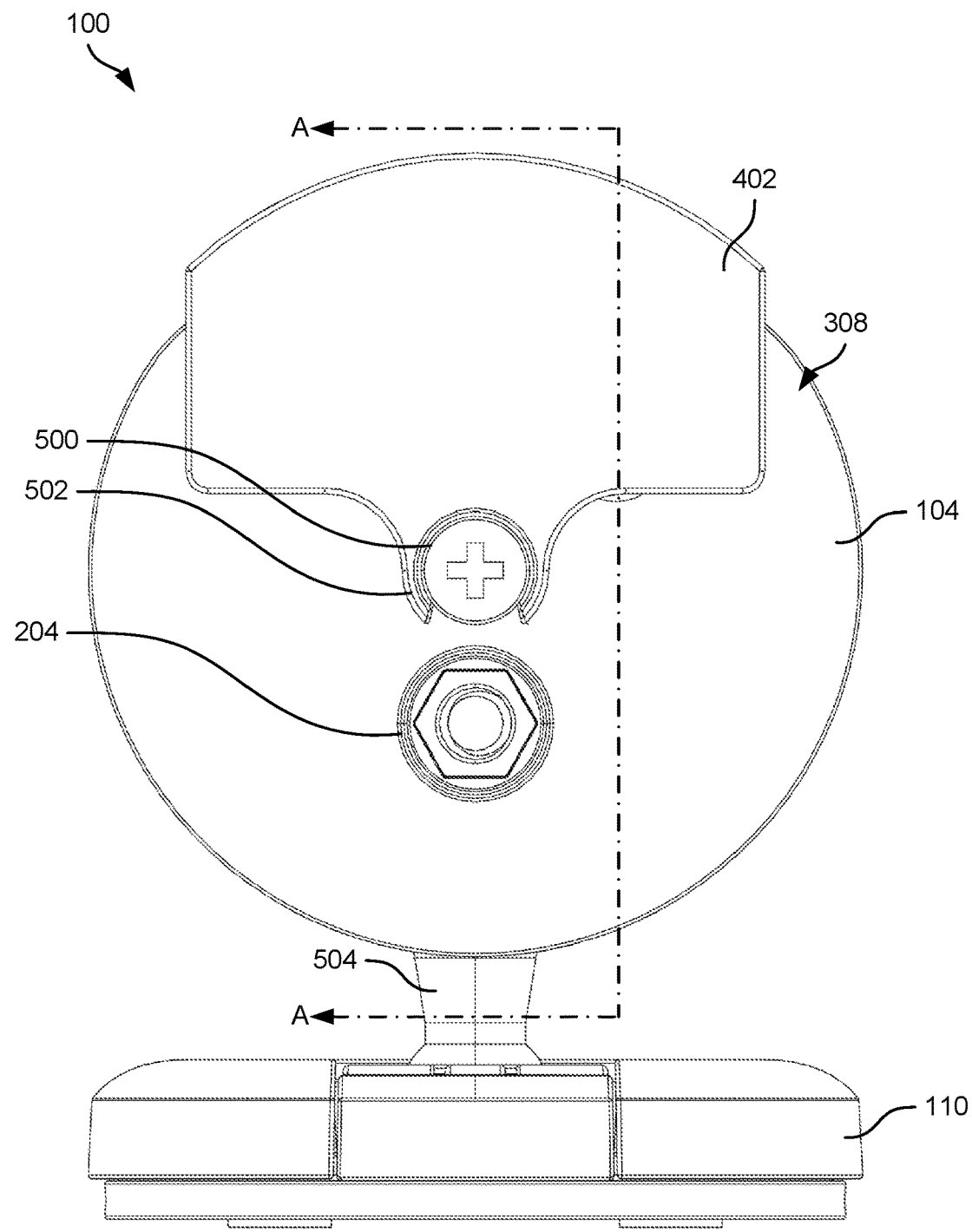
FIG. 5 illustrates a bottom view of the device of FIG. 1, according to an example of the present disclosure.

FIG. 5 illustrates a bottom view of the device 100, according to an example of the present disclosure. The second arm 402 of the privacy cover 108 is shown being disposed at least partially over the bottom end 308 of the bottom cover 104. In some instances, a fastener 500 secures the privacy cover 108 to the bottom cover 104. For example, the second arm 402 may include prongs 502 through which the fastener 500 is disposed. The bottom cover 104 (or the device 100) may include a receptacle into which the fastener 500 is secured. In doing so, the privacy cover 108 may be secured to the device 100. However, the prongs 502, or more generally the privacy cover 108, is configured to rotate about the fastener 500 for transitioning between the first position, the second position, and the third position. The fastener 500 may be removed such that the privacy cover 108 is removable from the device 100. In other instances, the prongs 502 may snap-over or snap around the fastener 500 for coupling to, and being removed from, the device 100.

The receptacle 204 is further shown disposed on the bottom cover 104, such as extending from the bottom end 308 of the bottom cover 104. The receptacle 204 may include an orifice for receiving the mount 110, for example, such that the mount 110 couples to the bottom cover 104. In some instances, the mount 110 may directly thread into the orifice.

The mount 110 include an support 504 that couples to the housing 102. In some instances, the support 504 may couple to translatable members of the mount 110 such that the device 100 is repositionable relative to a surface to a which the mount 110 is secured (e.g., in stances where the mount 110 couples to the housing 102).

Figure 29A:
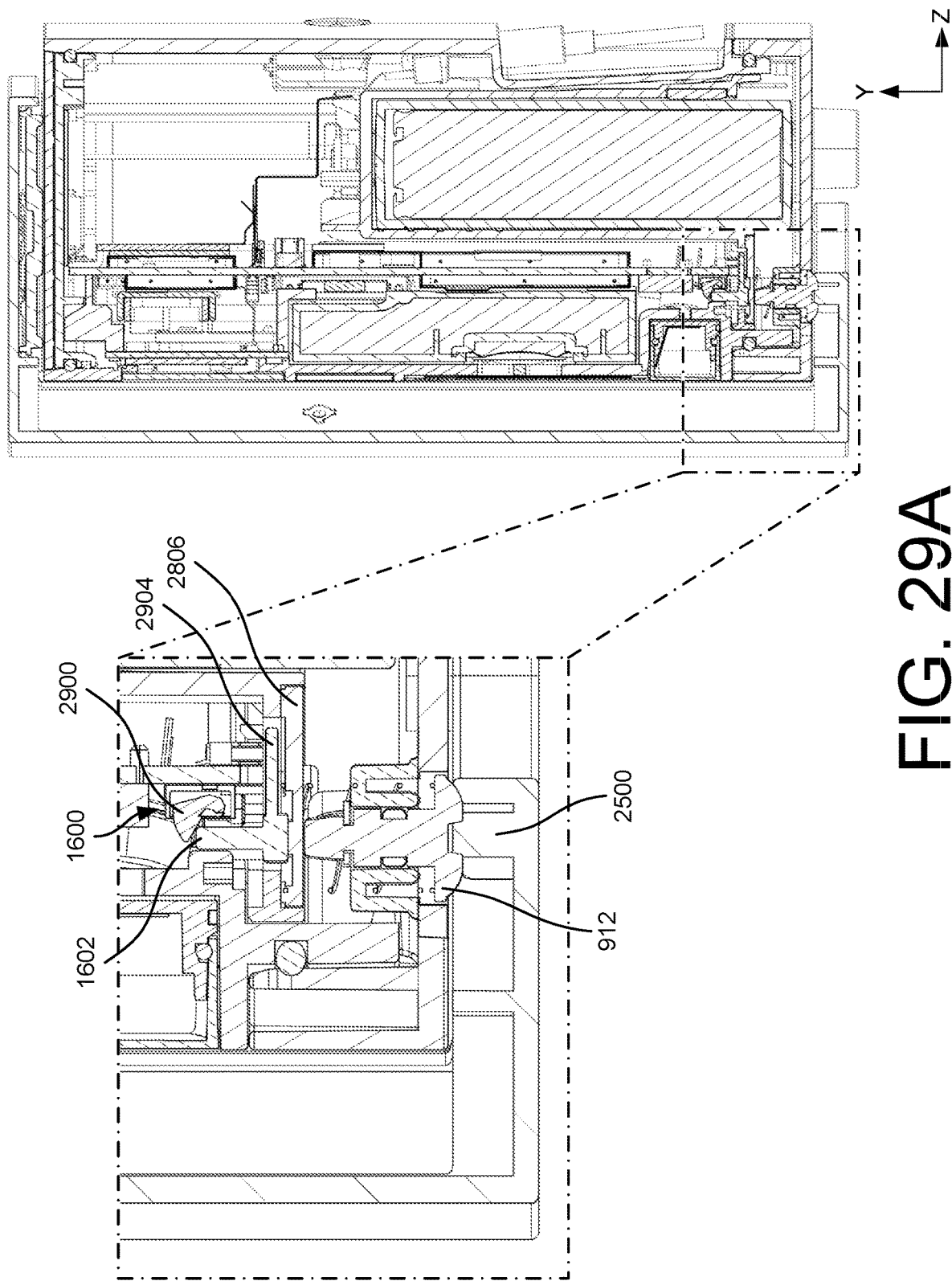
FIG. 29A illustrates a cross-sectional view of device of FIG. 1, taken along line A-A of FIG. 5, according to an example of the present disclosure.
Figure 30A:
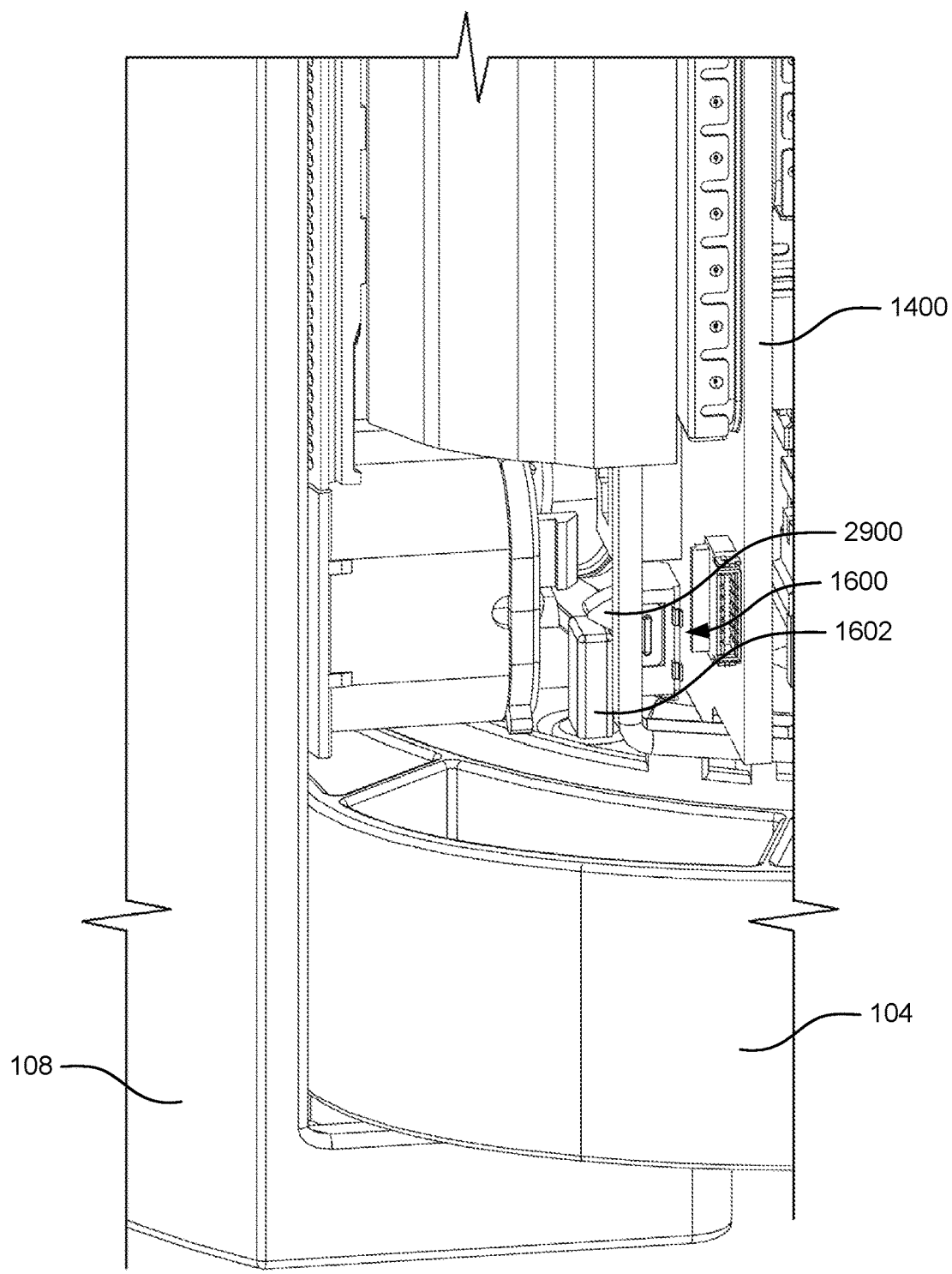
Figure 30B:
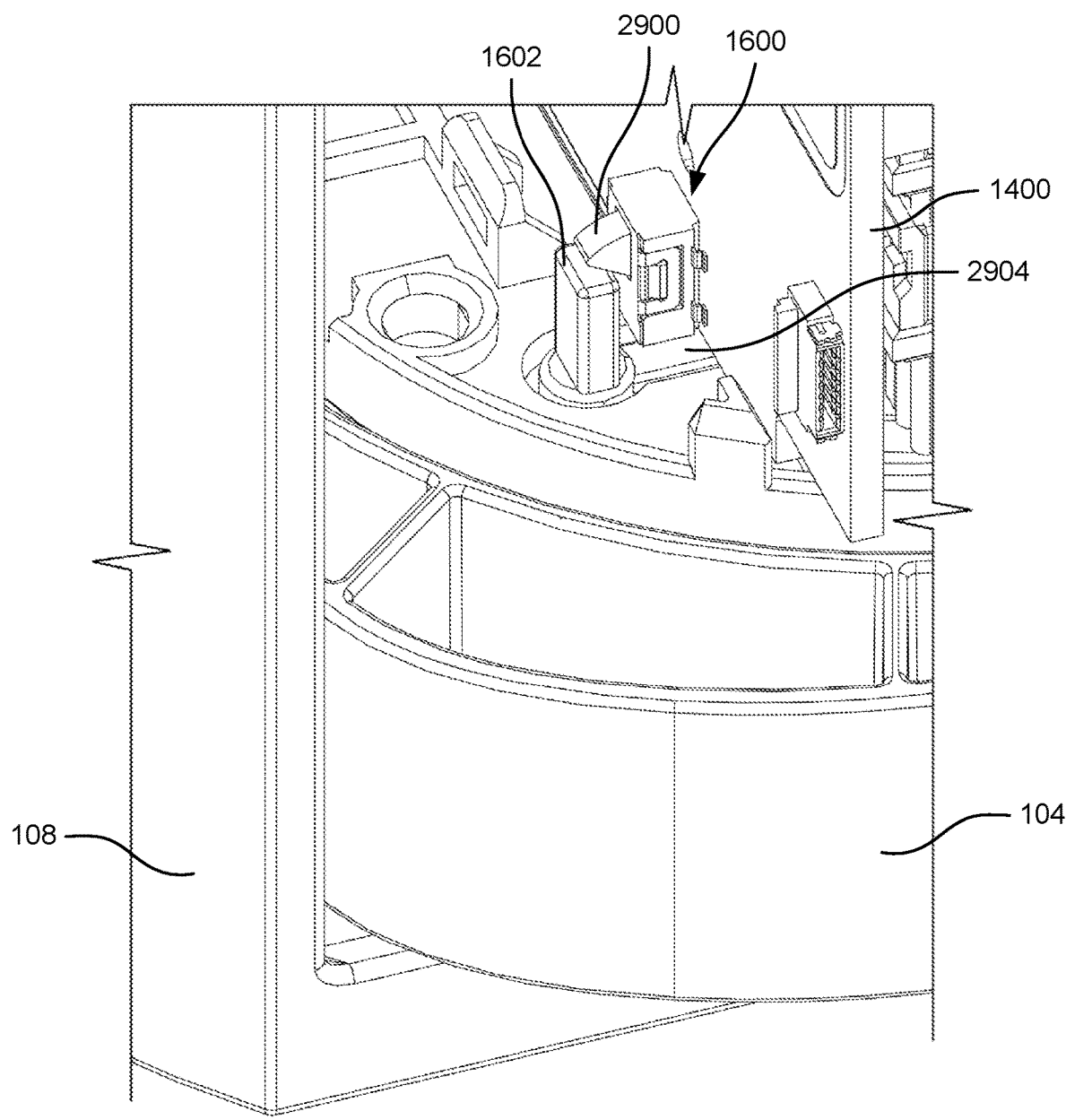
Figure 30D:
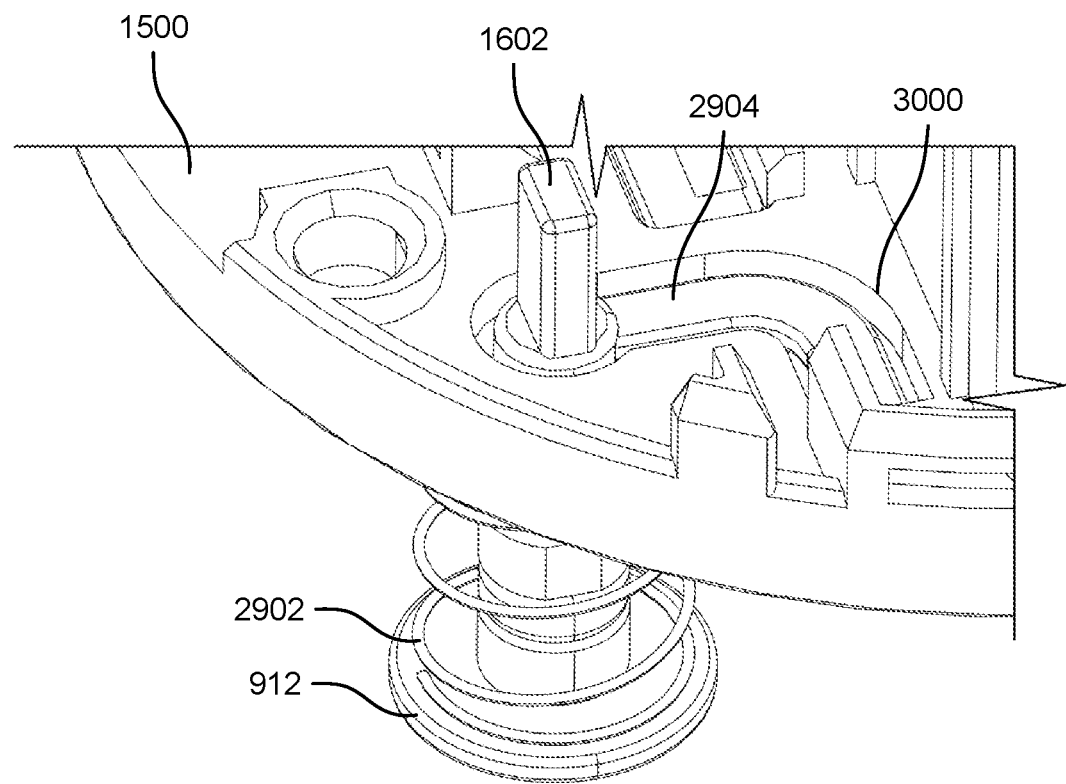

A line A-A is shown extending through the device 100, which is used to illustrate a cross-sectional view of the device 100 in FIG. 29A.

Figure 6:
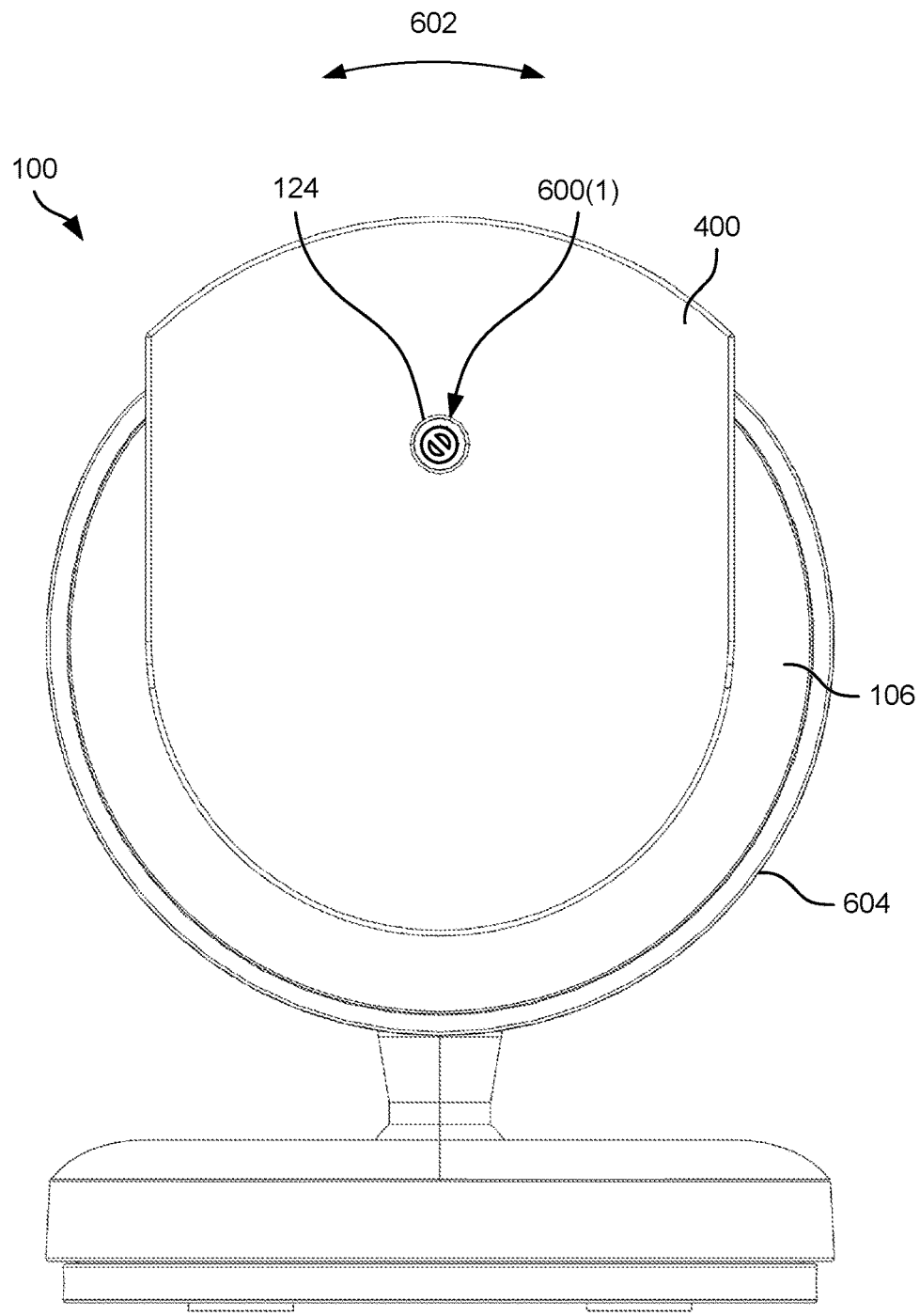
FIG. 6 illustrates a top view of the device of FIG. 1, according to an example of the present disclosure.

FIG. 6 illustrates a top view of the device 100, according to examples of the present disclosure. The privacy cover 108 is shown in the first position in which the camera is obscured. Additionally, in the first position, a first indication 600(1) is visible through the first passageway 124. As shown, the first indication 600(1) may indicate that the camera is obstructed. For example, the first indication 600 (1) may be a circle-backslash symbol. In some instances, the first indication 600(1) may be colored (e.g., red). However, the first indication 600(1) may include additional and/or alternative symbols (e.g., "X", "NO", etc.), and/or other colors (e.g., black).

The privacy cover 108 is rotatable in a rotational direction 602. In some instances, the privacy cover 108 rotates about an axis disposed through a center of the housing 102. When moved from the first position as shown in FIG. 6, the privacy cover 108 may rotate in the clockwise direction about the axis to the second position, or in the counterclockwise direction about the axis to the third position. When rotated in the rotational direction 602, the privacy cover 108 traverses over an exterior surface 604 of the housing 102 and the top cover 106.

Figure 7A:
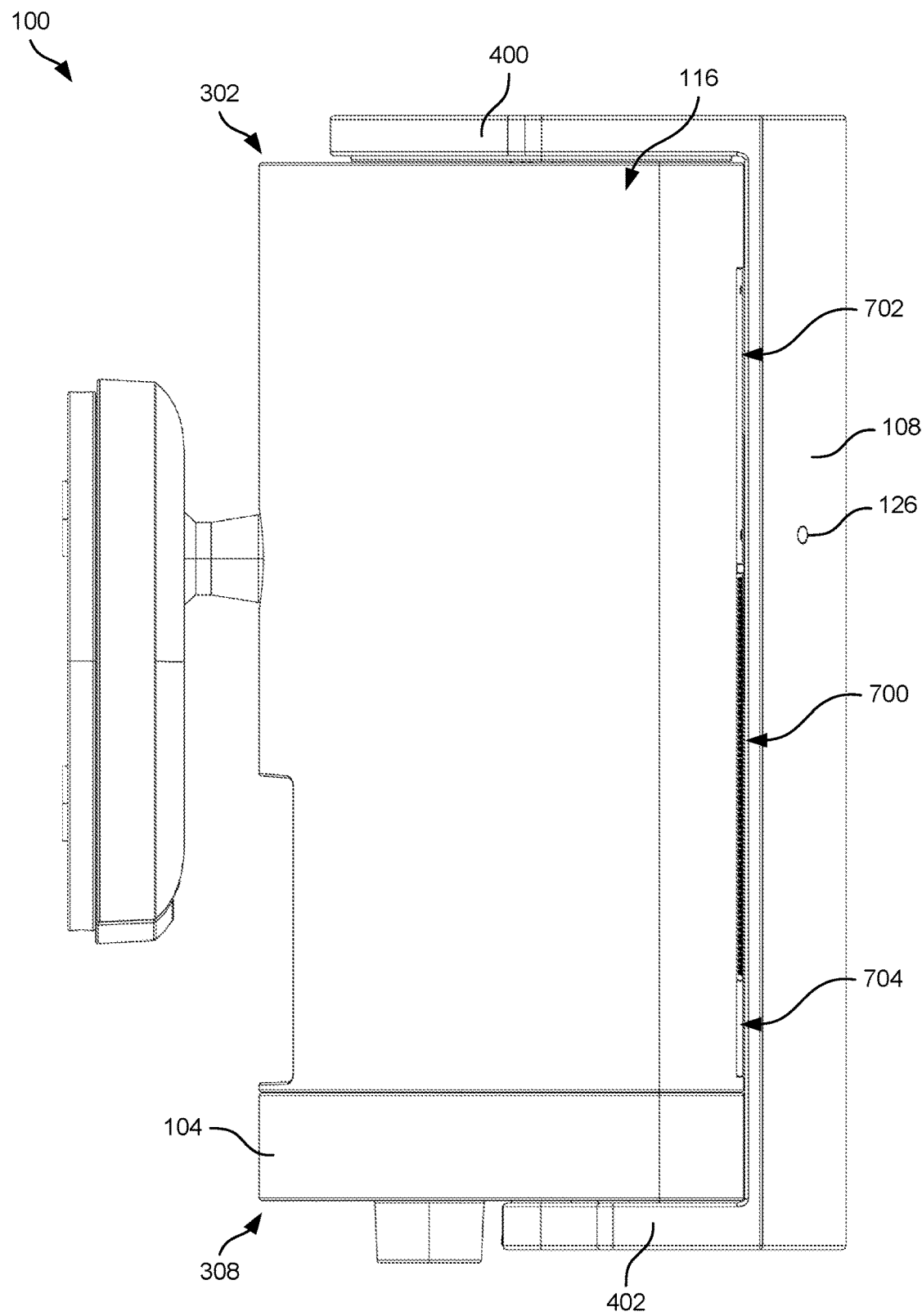
FIG. 7A illustrates a first side view of the device of FIG. 1, according to an example of the present disclosure.
Figure 7B:
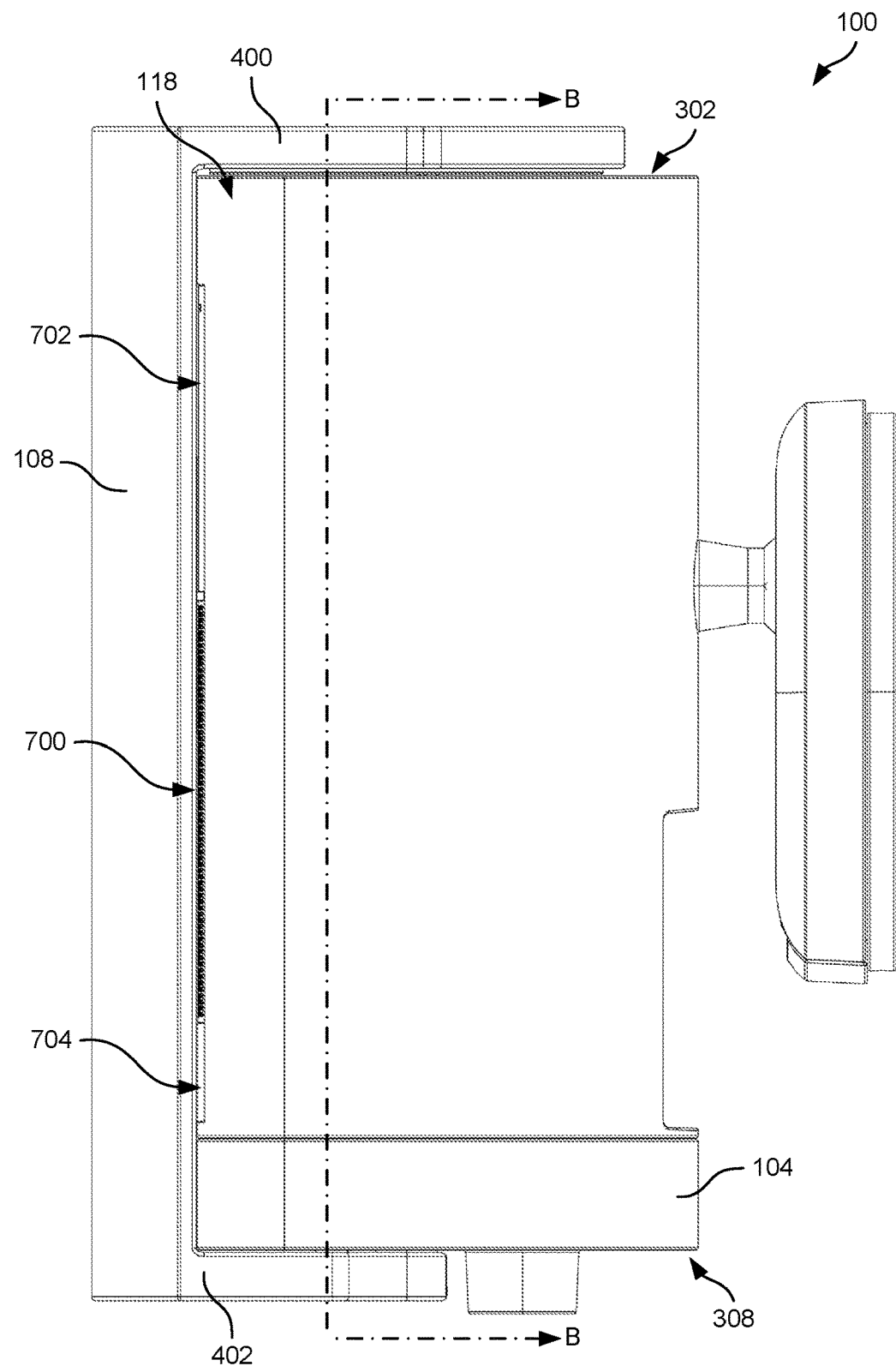
FIG. 7B illustrates a second side view of the device of FIG. 1, according to an example of the present disclosure.

FIGS. 7A and 7B illustrate a first side view and a second side view of the device 100, according to an example of the present disclosure. More particularly, FIG. 7A illustrates the first side 116 of the device 100, while FIG. 7B illustrates the second side 118 of the device 100.

The privacy cover 108 is shown including the first arm 400 that at least partially extends onto and/or over the top end 302 of the housing 102 and/or the top cover 106, and the second arm 402 that at least partially extends onto and/or over the bottom end 308 and/or the bottom cover 104. Additionally, the privacy cover 108 includes an interior surface oriented towards the device 100, such as the housing 102 and the bottom cover 104. The interior surface is spaced apart from the exterior surface 604 of the housing 102 and the bottom cover 104 to permit the privacy cover 108 to rotate in the rotational direction 602. The privacy cover 108 is further shown including the second passageway 126 for accommodating the light pipe 300. The light pipe 300 may direct light emitted from a status indicator (e.g., LED) within the device 100. For example, the LED may illuminate red in instances in which the privacy cover 108 is in the first position, so as to signify that the components of the device 100 are not activated. When the privacy cover 108 is moved to the second position or the third position, the LED may illuminate green to indicate that the components of the device 100 are activated, and/or in response to sensing motion (e.g., blue). However, in the first position, the light pipe 300 directs light from the LED to an exterior of the device 100.

As will be discussed herein, the device 100 includes one or more speakers oriented towards the front 120 and/or sensor(s), such as IR sensor(s), oriented towards the front 120. The speaker(s) may be disposed beneath (e.g., in the Z-direction) a speaker grill 700, which is disposed behind the privacy cover 108 in the first position. Additionally, the sensor(s) may reside beneath various covers, such as a first cover 702 and a second cover 704. The first cover 702 may be disposed above the speaker grill 700, while the second cover 704 may be disposed beneath the speaker grill 700. In some instances, both the first cover 702 and the second cover 704 are obstructed when the privacy cover 108 is in the first position.

A line B-B is further shown extending through the device 100, which is used to illustrate a cross-sectional view of the device in FIG. 29B.

Figure 8A:
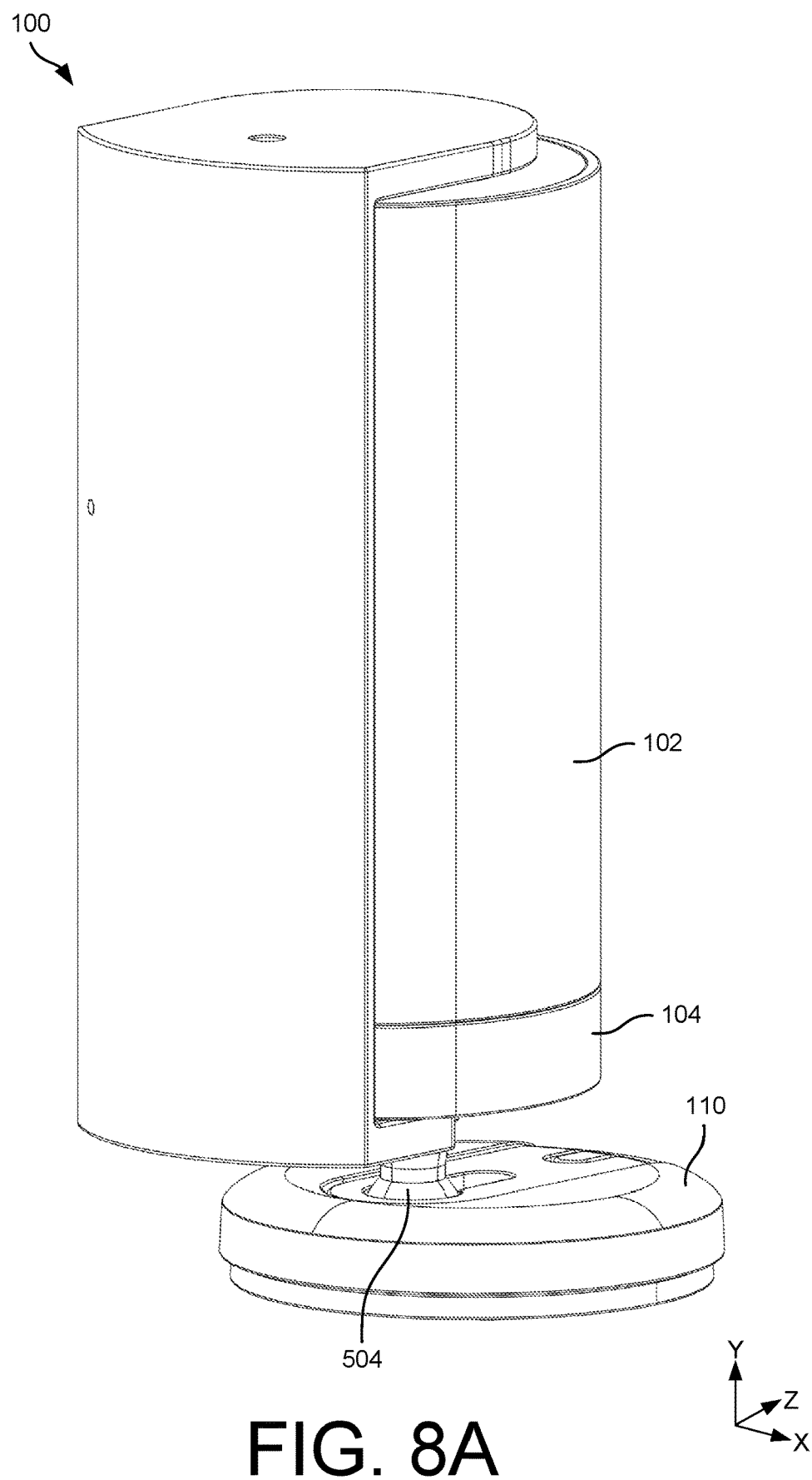
FIG. 8A illustrates a front perspective view of the device of FIG. 1, with an example stand coupled to a bottom of the device, according to an example of the present disclosure.
Figure 8B:
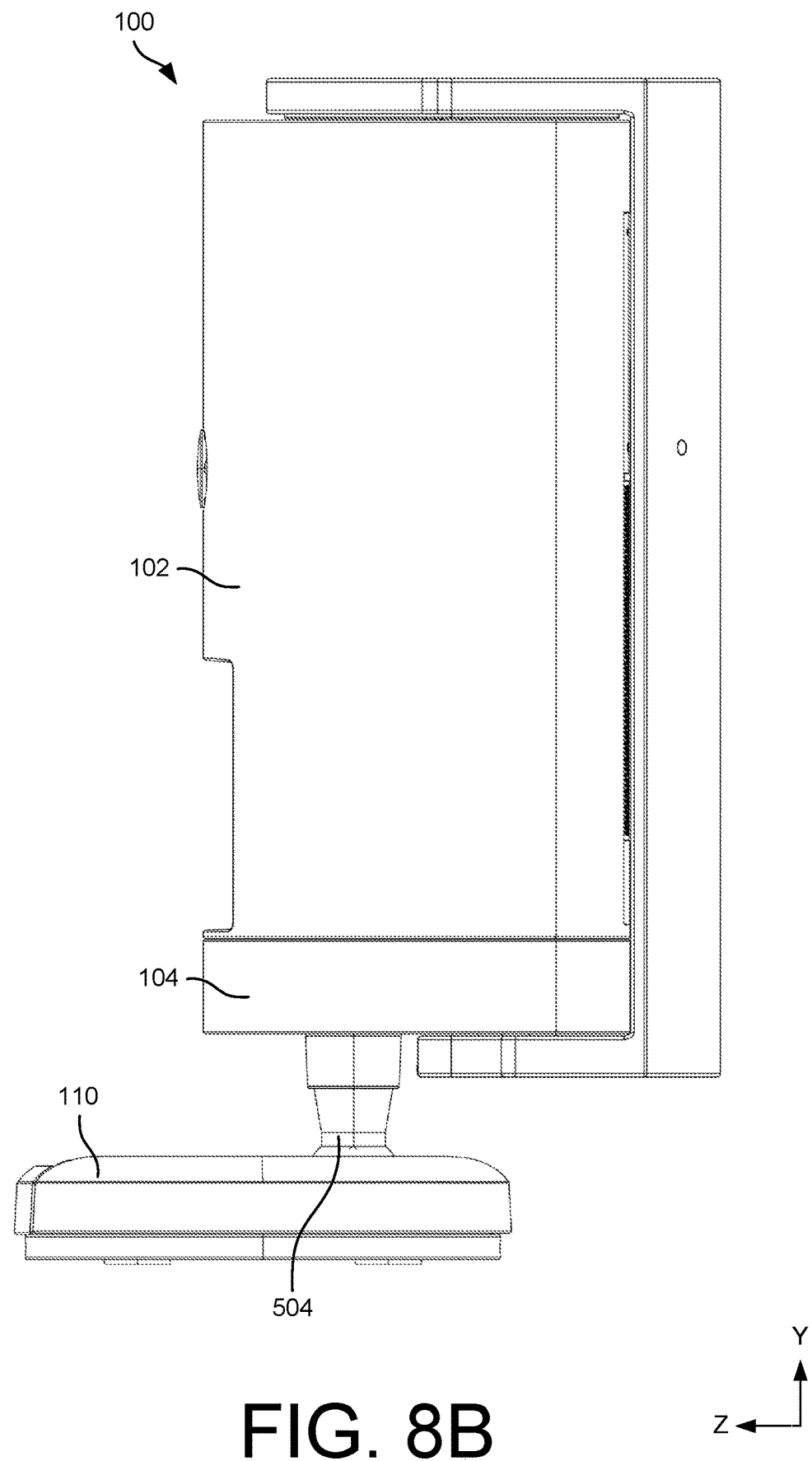
FIG. 8B illustrates a side view of the device of FIG. 1, with the stand of FIG. 8A, according to an example of the present disclosure.

FIGS. 8A and 8B illustrate a coupling of the mount 110 to the bottom cover 104, according to an example of the present disclosure. FIG. 8A illustrates a front perspective view of the device 100, while FIG. 8B illustrates a side view of the device 100 (e.g., first side 116).

As introduced above, the mount 110 may couple to the housing 102 (as shown in FIGS. 1-7), or the bottom cover 104 (as shown in FIGS. 8A and 8B). That is, the mount 110 may be removed from the housing 102, and instead, may couple to the bottom cover 104. For example, the support 504 of the mount 110 may be threaded into the orifice of the receptacle 204. Coupling the mount 110 to the bottom cover 104 may be used to dispose the device 100 above a surface, such as a countertop, shelf, and so forth. The mount 110 may permit translatable, rotational, and/or other movements of the device 100.

Figure 9:
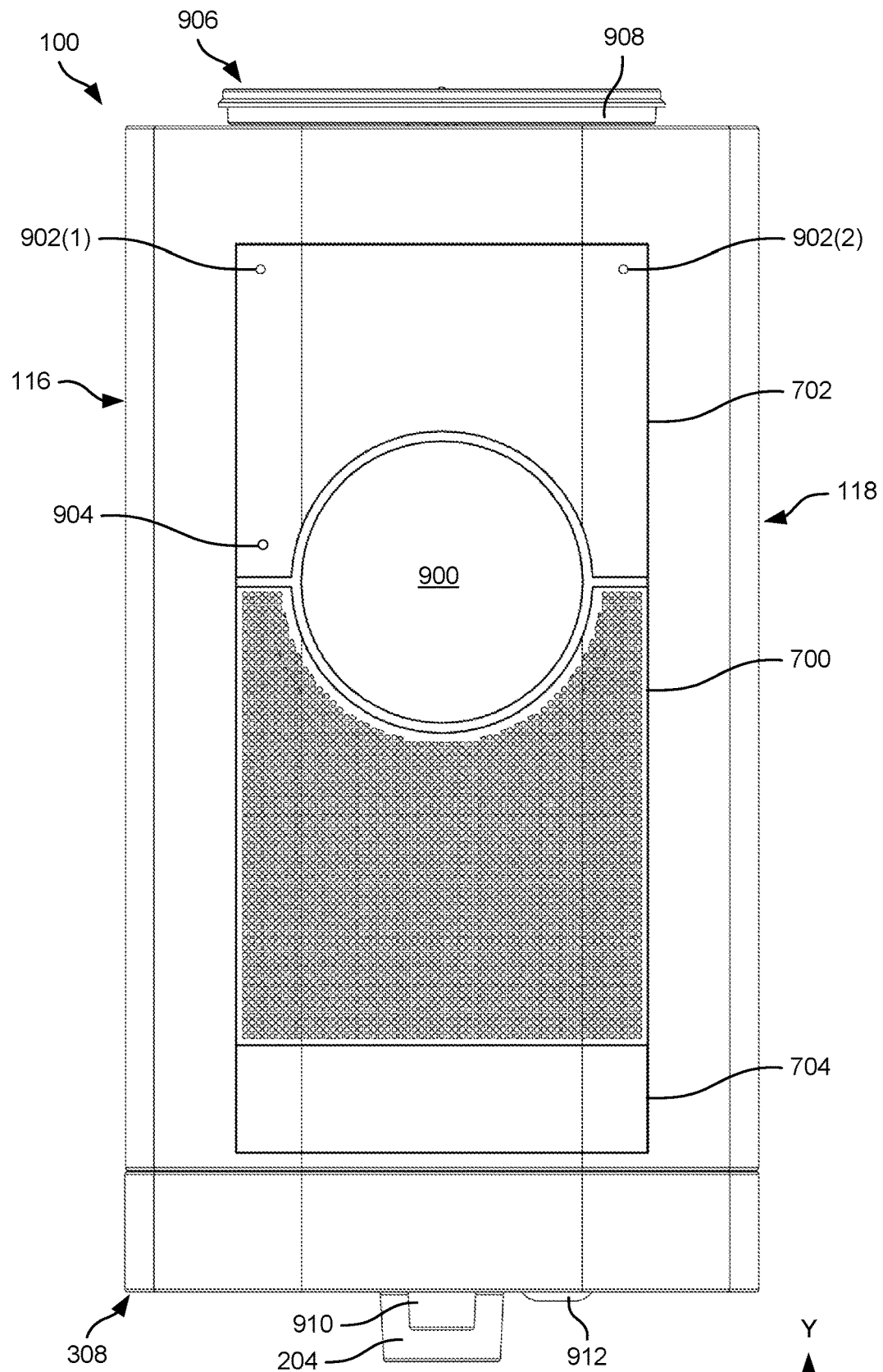
FIG. 9 illustrates a front view of the device of FIG. 1, showing the privacy cover removed, according to an example of the present disclosure.

FIG. 9 illustrates a front view of the device 100, showing the privacy cover 108 removed, according to examples of the present disclosure. The device 100 is shown including the speaker grill 700, the first cover 702 disposed vertically above the speaker grill 700, and a second cover 704 disposed vertically below the speaker grill 700. Additionally, the device 100 includes a camera lens 900. A camera of the device 100 may reside beneath (e.g., Z-direction) the camera lens 900. Additionally, as will be shown and explained herein, lighting elements and/or sensors (e.g., radar sensor) may be disposed beneath the first cover 702, and/or sensors (e.g., IR sensor(s)) may be disposed beneath the second cover 704.

The first cover 702 and the second cover 704 may be transmissible to light and/or other signals (e.g., translucent, transparent, etc.). For example, the first cover 702 and the second cover 704 may be manufactured from high density polyethylene (HDPE), germanium, zinc-sulfide, and so forth. The speaker grill 700 is shown including a mesh structure to permit sound generated by speaker(s) of the device 100 to project outward from the device 100. As shown, the first cover 702 and/or the speaker grill 700 may be formed at least partially around the camera lens 900. For example, the first cover 702 and the speaker grill 700 may include cutouts (e.g., half-circle) within which the camera lens 900 resides.

The first cover 702 is further shown including a first microphone port 902(1) and a second microphone port 902(2). As will be discussed herein, microphones may reside beneath the first microphone port 902(1) and the second microphone port 902(2), respectively. The microphone ports 902 respectively channel sound from an exterior of the device 100 to the interior of the device 100 for capturing by the microphones. As shown, the microphone ports 902 may be located vertically above the camera lens 900, and/or closer to the top end 302 of the housing 102 than the bottom end 304 of the housing 102. In some instances, the first microphone port 902(1) is located closer to the first side 116 of the device 100, and the second microphone port 902(2) is located closer to the second side 118 of the device 100.

The first cover 702 may also include an area 904 through which light is emitted via a status indicator. For example, a status indicator may reside beneath the first cover 702, and emit light through the area 904 of the first cover 702. In some instances, the status indicator (e.g., RGB LED) indicates an operational state of the device 100. When the privacy cover 108 is in the first position, the area 904 may align with the light pipe 300, vice versa, such that light may be transmitted through the light pipe 300.

In some instances, the speaker grill 700, the first cover 702, and the second cover 704 may include the same (or substantially the same) width (X-direction). The speaker grill 700, the first cover 702, and the second cover 704 may also be centered on the device 100 (X-direction). The speaker grill 700, the first cover 702, and the second cover 704 may couple to the housing 102 using adhesives, fasteners, snap-fit, and/or any combination thereof. Moreover, in some instances, an exterior surface of the speaker grill 700, the first cover 702, and the second cover 704, when coupled to the housing 102, may be flush with the exterior surface 604 of the housing 102 and/or the bottom cover 104.

The device 100 may include a bracket 906 coupled to the top end 302 of the housing 102. The bracket 906 may couple to the top end 302 of the housing 102, and the privacy cover 108 may be rotationally coupled to the bracket 906. For example, the bracket 906 is shown including a base 908 that engages with the privacy cover 108. In some instances, the first arm 400 of the privacy cover 108 includes tabs that snap over the base 908 for coupling the privacy cover 108 to the bracket 906. When rotated, the privacy cover 108 may traverse along or over the base 908. The bracket 906 may also include the first indication 600(s) on a top surface thereof for viewing through the first passageway 124. Additional details of the bracket 906 are discussed in FIGS. 26A-26D.

The bottom cover 104 includes the receptacle 204 and a projection 910 for receiving the fastener 500. For example, the fastener 500 may be fastened into the projection 910 to couple thereto and to couple the privacy cover 108 to the bottom cover 104. The receptacle 204 and the projection 910 are both shown extending from the bottom end 308 of the bottom cover 104. Further, the device 100 may include a button 912. The button 912 may extend past (e.g., proud of) the bottom end 308 of the bottom cover 104. The button 912 extends through the bottom cover 104 and into the housing 102 for actuating a switch that deactivates the camera and/or other components of the device 100 (e.g., microphones). The button 912 may be actuated via features of the privacy cover 108 when the privacy cover 108 is in the first position. For example, when the privacy cover 108 is in or rotated to the first position, features of the privacy cover 108 may press, or otherwise force, the button 912 in an upward direction (e.g., Y-direction). The movement of the button 912 engages the switch, which in turn, deactivates the components. However, when the button 912 is not pressed, the switch may not be activated and the components of the device 100 may be activated. Additional details of the button 912, and the engagement with the switch, are discussed in FIGS. 29A, 29B, and 30A-30D.

Figure 10:
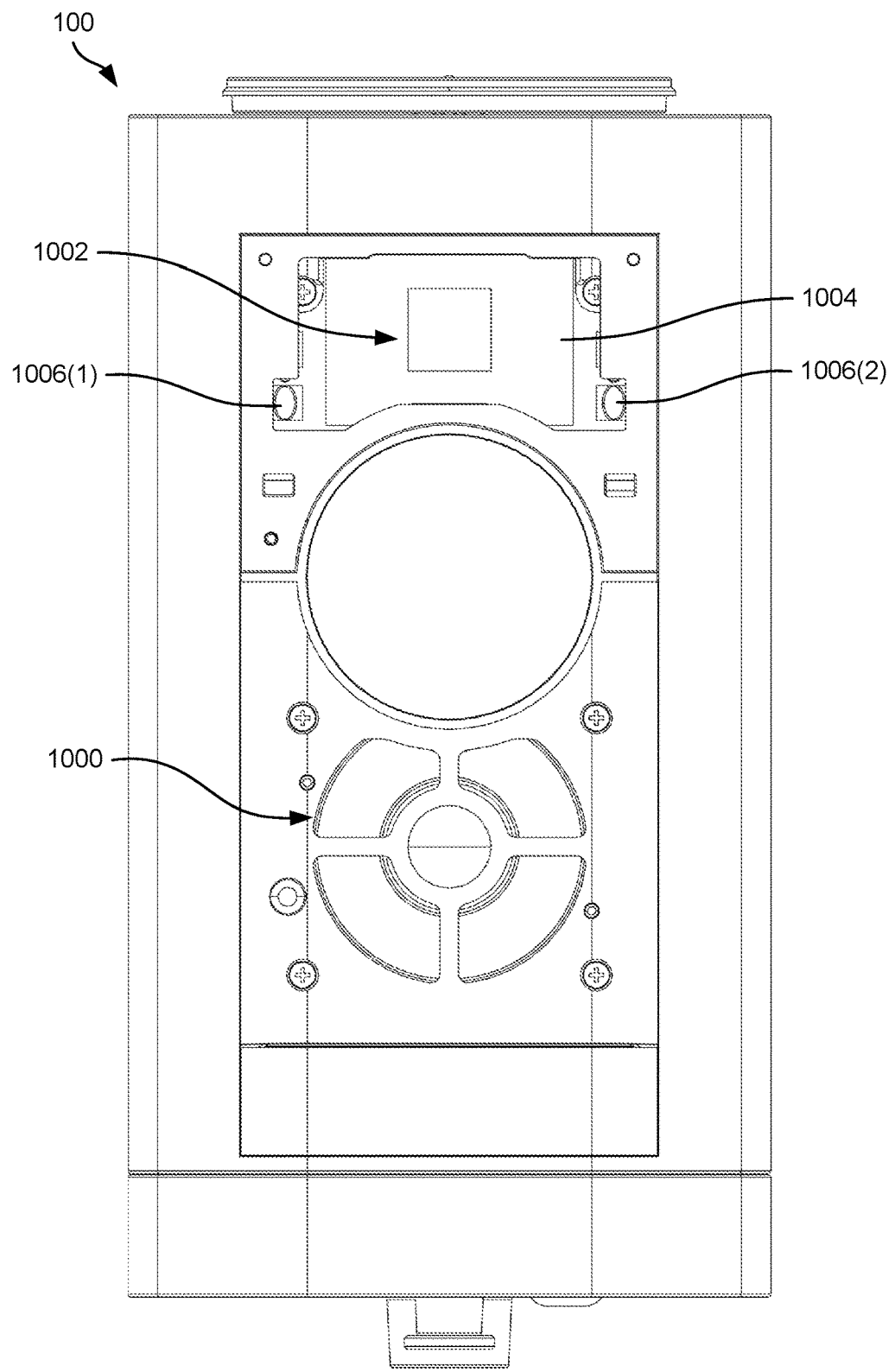
FIG. 10 illustrates example components of the device of FIG. 1, according to an example of the present disclosure.

FIG. 10 illustrates a front view of the device 100, showing the first cover 702 and the speaker grill 700 removed to illustrate components of the device 100, according to examples of the present disclosure. Removing the speaker grill 700 exposes a speaker 1000 of the device 100, which is oriented to output sound in a direction towards the front 120 of the device 100.

Removing the first cover 702 exposes a radar sensor 1002 of the device 100, which may be mounted to a radar PCB 1004. The radar sensor 1002 is oriented to emit signals (e.g., radio) outwards from the front 120 of the device 100. The device 100 also includes lighting elements 1006, such as a first lighting element 1006(1) and a second lighting element 1006(2). The lighting elements 1006 may include white light emitting diodes (wLEDs) that output visible light into an environment of the device 100. In some instances, the lighting elements 1006 may be activated in response to motion being detected within an environment of the device 100. Although two lighting elements 1006 are shown, the device 100 may include more than, or less than, two of the lighting elements 1006. Additionally, although the lighting elements 1006 are shown at a particular position, such as vertically above the camera lens 900 (and/or the camera), the lighting elements 1006 may be located differently than shown (e.g., closer to the top, closer to the bottom, etc.).

Figure 11:
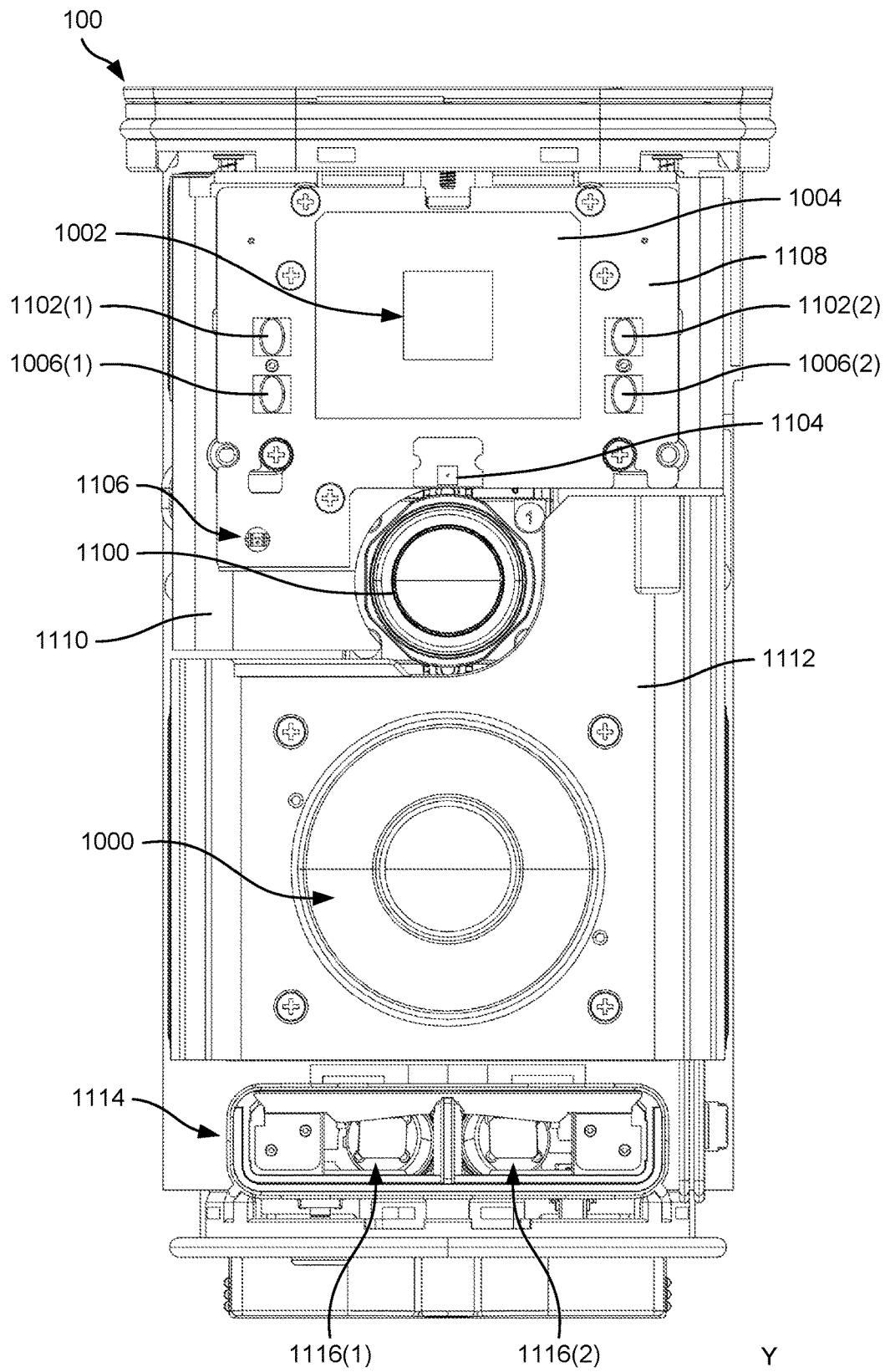
FIG. 11 illustrates example components of the device of FIG. 1, according to an example of the present disclosure.

FIG. 11 illustrates a front view of the device 100, showing components residing within the device 100, according to examples of the present disclosure. From FIG. 10, the camera lens 900 and the second cover 704 are shown removed.

A camera 1100 resides beneath, and is oriented towards, the camera lens 900. As shown, the camera 1100 is oriented towards the front 120 of the device 100, and positioned vertically between the speaker 1000 and the radar sensor 1002. In some instances, the speaker 1000, the radar sensor 1002, and the speaker 1000 are aligned along an axis (e.g., vertically aligned).

In some instances, the device 100 includes IR lighting elements 1102, such as a first IR lighting element 1102(1) and a second IR lighting element 1102(2). The IR lighting elements 1102 are shown being positioned vertically above (e.g., in the Y-direction) the lighting elements 1006, respectively. Although two IR lighting elements 1102 are shown, the device 100 may include more than, or less than, two of the IR lighting elements 1102. Additionally, although the IR lighting elements 1102 are shown at a particular position, the IR lighting elements 1102 may be located differently than shown (e.g., closer to the top, closer to the bottom, etc.). For example, in some instances, the first IR lighting element 1102(1) may be vertically aligned with the first lighting element 1006(1), and/or the second IR lighting element 1102(2) may be vertically aligned with the second lighting element 1006(2).

The device 100 may include an ambient light sensor 1104 located vertically above the camera 1100, as well as a status indicator 1106 (e.g., LED) located beside the camera 1100. The ambient light sensor 1104 may be used to determine lighting conditions of the environment of the device 100, for example, when switching between daytime and nighttime modes (or light and dark lighting conditions). In some instances, the camera 1100 and the ambient light sensor 1104 may be centrally aligned with one another (e.g., in the X-direction). The status indicator 1106 may output information associated with an operational state of the device 100, such as whether the microphone(s) are recording audio, whether the camera 1100 is capturing video, and so forth. In some instances, the lighting elements 1006, the IR lighting elements 1102, and/or the ambient light sensor 1104 may be positioned on an LED PCB 1108. Additionally, in some instances, the radar PCB 1004 maybe coupled to, or disposed on, the LED PCB 1108.

The device 100 may further include a frame 1110 to which components of the device 100 couple. For example, the LED PCB 1108 may be mounted to the frame 1110. The microphone(s) and/or the status indicator 1106 may additionally or alternatively be mounted to the frame 1110. The frame 1110 may at least partially wrap or extend around the camera 1100. The device may include a speaker box 1112 that houses the speaker 1000. The speaker box 1112 may provide a back volume to the speaker 1000, and as shown, may at least partially wrap or extend around the camera 1100.

The housing 102 may also include a PIR assembly 1114, which includes PIR sensor(s) 1116, such as a first PIR sensor 1116(1) and a second PIR sensor 1116(2). As shown, the PIR sensor(s) 1116 are located vertically below the radar sensor 1002, the camera 1100, the lighting elements 1006, the IR lighting elements 1102, and so forth. In some instances, the PIR sensor(s) 1116 are oriented to sense motion in front of the device 100, for example, via sensing IR light emitted by persons. Additional details of the PIR assembly 1114 are discussed herein with regard to FIGS. 17A and 17B.

Figure 12:
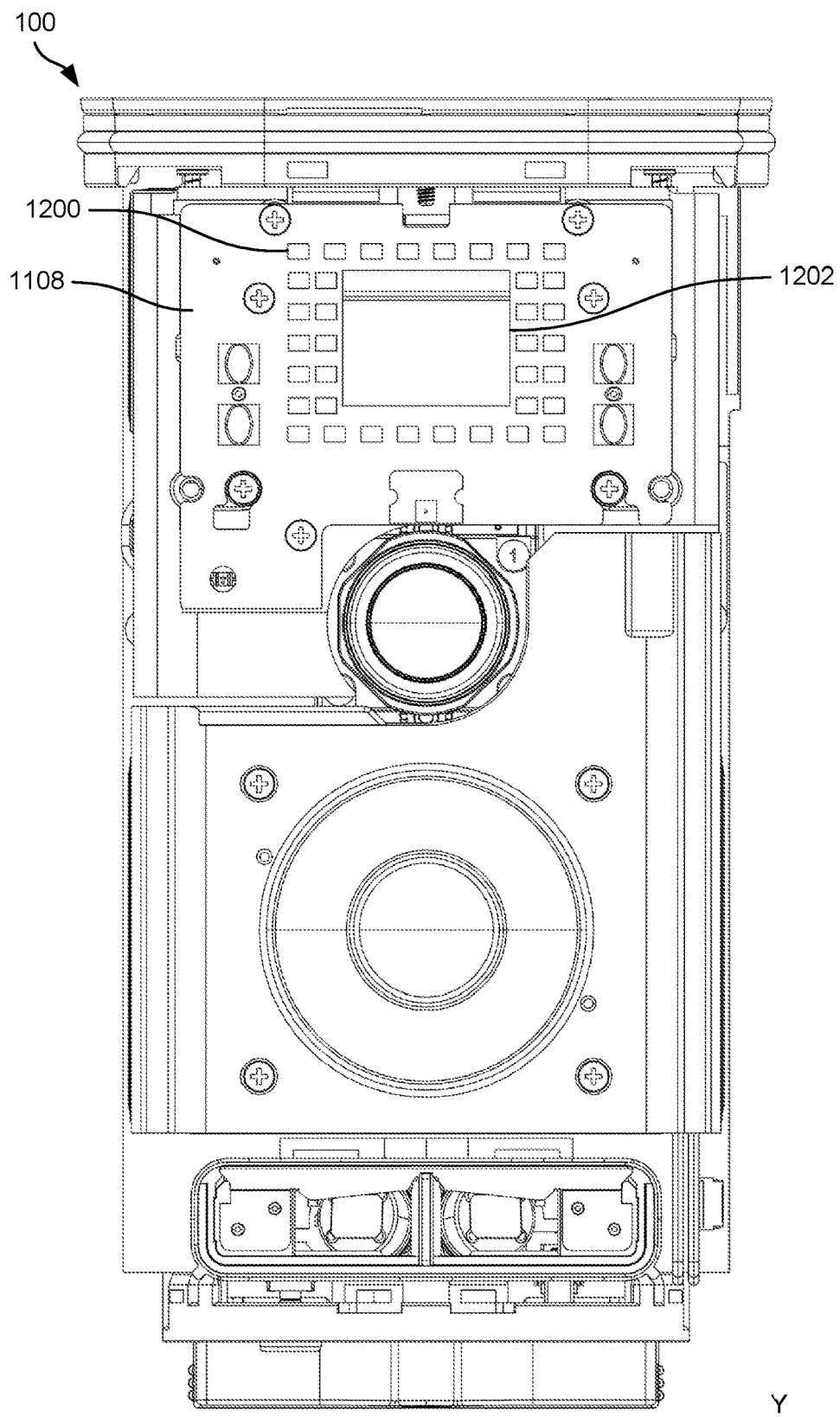
FIG. 12 illustrates example components of the device of FIG. 1, according to an example of the present disclosure.

FIG. 12 illustrates a front view of the device 100, showing components residing within the device 100, according to examples of the present disclosure. From FIG. 11, FIG. 12 illustrates the radar sensor 1002 and/or the radar PCB 1004 being removed.

The LED PCB 1108 is shown including a plurality of radar pad(s) 1200. The radar pad(s) 1200 may represent pads disposed beneath the radar PCB 1004. The radar pad(s) 1200 may receive radar signals emitted by the radar sensor 1002 for determining coordinates and/or a position of motion within the environment. Although a particular number of the radar pad(s) 1200 are shown, any number of radar pad(s) 1200 may be included. In some instances, the radar pad(s) 1200 may be arranged around an opening 1202 of the LED PCB 1108. For example, a flex circuit may route through the opening 1202 to communicatively couple to the radar sensor 1002 (and/or the radar PCB 1004).

Figure 13:
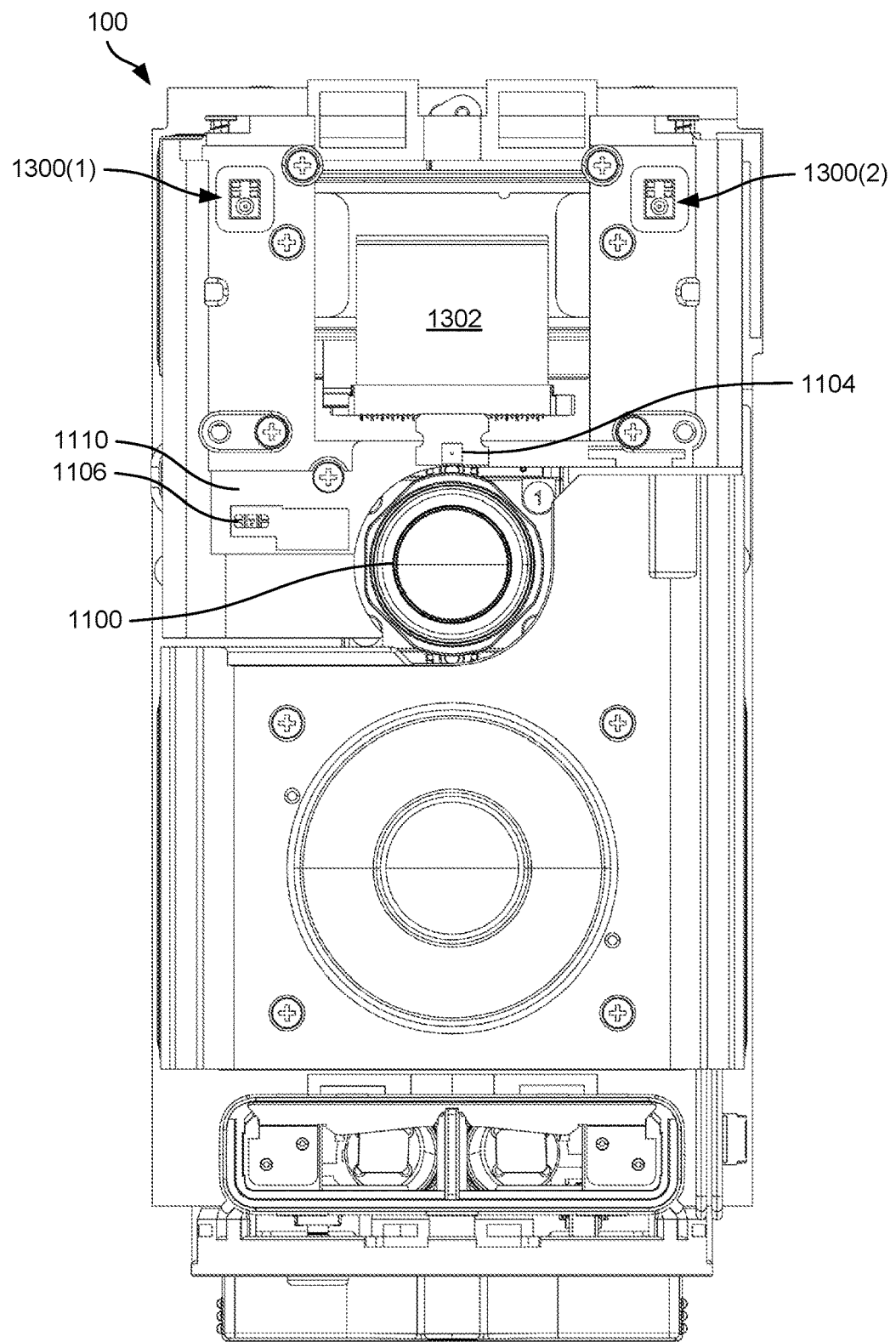
FIG. 13 illustrates example components of the device of FIG. 1, according to an example of the present disclosure.

FIG. 13 illustrates a front view of the device 100, showing components residing within the device 100, according to examples of the present disclosure. From FIG. 12, FIG. 13 illustrates the LED PCB 1108 and the top cover 106 being removed.

The device 100 includes microphones 1300, such as a first microphone 1300(1) and a second microphone 1300(2). The first microphone 1300(1) may be aligned with the first microphone port 902(1) and the second microphone 1300(2) may be aligned with the second microphone port 902(2). In doing so, the microphone ports 902 assist in transferring or directing sound that is external to the device 100 to the microphones 1300 located within the device 100. That is, the microphones 1300 may receive audio, for instance, user speech, via the microphone ports 902, respectively. In some instances, the first microphone 1300(1) and the second microphone 1300(2) are located vertically above the camera 1100 and/or the ambient light sensor 1104. Additionally, the microphones 1300 may be located vertically above the lighting elements 1006 and the IR lighting elements 1102, respectively. In some instances, the microphones 1300 and/or the microphone ports 902 may be encased with foam that acoustically seals the microphones 1300 to minimize sound received and/or generated via other portions of the device 100. For example, the foam may isolate the microphones 1300 from the speaker 1000 to minimize an intensity of audio received from the speaker 1000. In some instances, the microphones 1300 and/or the status indicator 1106 reside within pockets of the frame 1110.

In some instances, the radar sensor 1002 (as well as the radar PCB 1004), the lighting elements 1006, and the IR lighting elements 1102 reside on a first side of the LED PCB 1108, while the microphones 1300 and the status indicator 1106 reside on a second side of the LED PCB 1108. Additionally, in some instances, the ambient light sensor 1104 may reside on the first side of the LED PCB 1108. The device 100 is shown including a flex circuit 1302 that communicatively couples to the radar PCB 1004 and/or LED PCB 1108. In some instances, the flex circuit 1302 routes through the frame 1110, and communicatively couples to additional computing components of the device 100.

Figure 14:
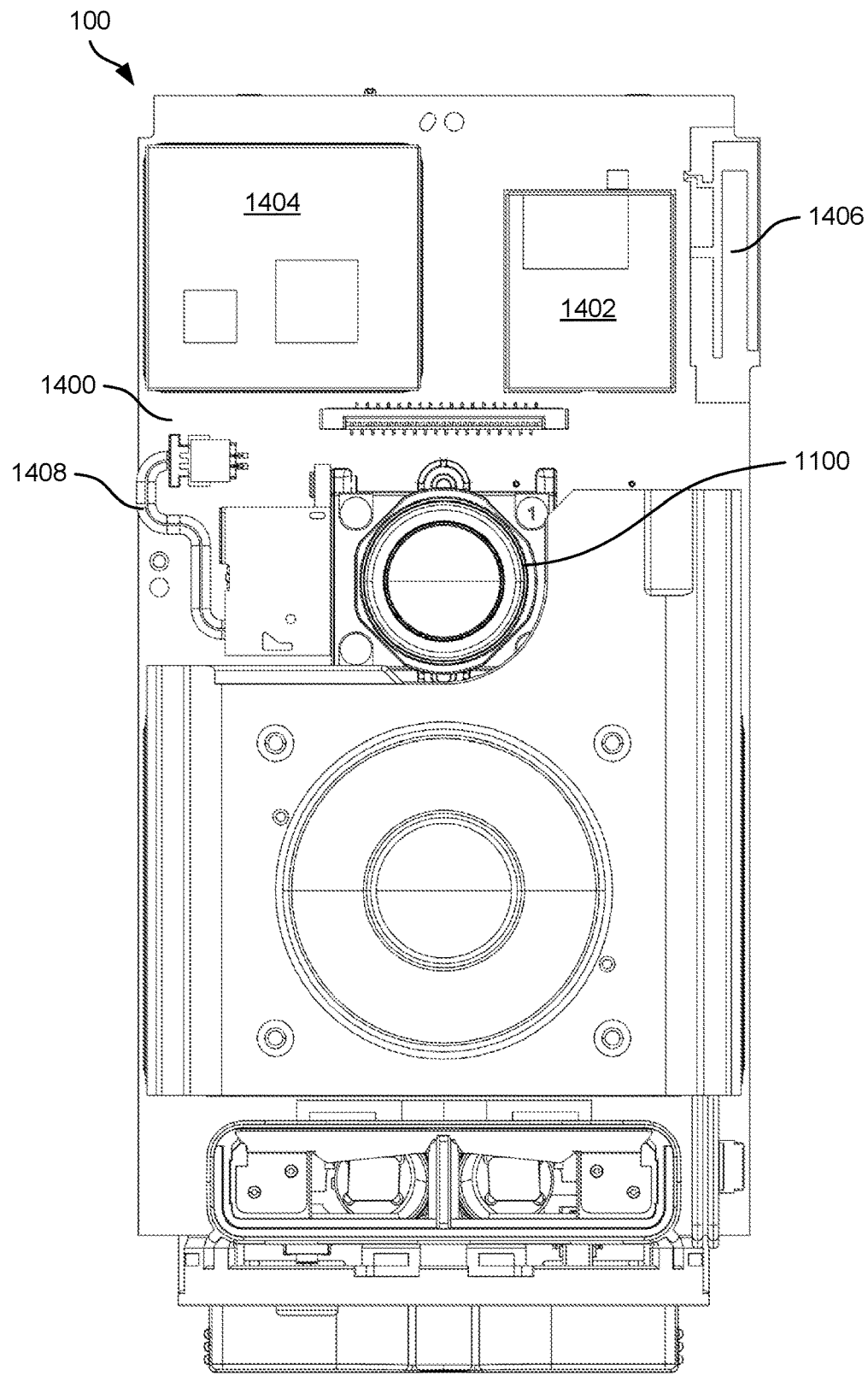
FIG. 14 illustrates example components of the device of FIG. 1, according to an example of the present disclosure.

FIG. 14 illustrates a front view of the device 100, showing components residing within the device 100, according to examples of the present disclosure. From FIG. 13, FIG. 14 illustrates the frame 1110, the microphones 1300, the ambient light sensor 1104, the status indicator 1106, and the flex circuit 1302 being removed.

The camera 1100 may mount or otherwise couple to a main PCB 1400. Various connections (e.g., flex circuits) may communicatively couple the radar PCB 1004, the LED PCB 1108, and other computing components of the device 100 to the main PCB 1400. For example, a connector 1408 may communicatively couple the camera 1100 to the main PCB 1400. The main PCB 1400 may also include a Wi-Fi module 1402 and/or LORA module 1404. The Wi-Fi module 1402 may communicatively couple to an antenna 1406 disposed adjacent to the Wi-Fi module 1402. The LORA module 1404 may communicatively couple to an antenna (e.g., LORA antenna) that may be located vertically below the top cover 106.

In some instances, the Wi-Fi module 1402 and/or the LORA module 1404 are disposed on a first side of the main PCB 1400. A Wi-Fi driver and/or a LORA driver may be disposed on a second side of the main PCB, opposite the first side. The main PCB 1400 may also include a DC-DC converter. In some instances, one or more heat dissipating element(s) are coupled to the main PCB 1400. Additionally, in some instances, various shielding plates and/or shielding foams may be disposed over components of the device 100, such as component circuitry (e.g., processor(s), memory, capacitors, resistors, etc.).

Figure 15:
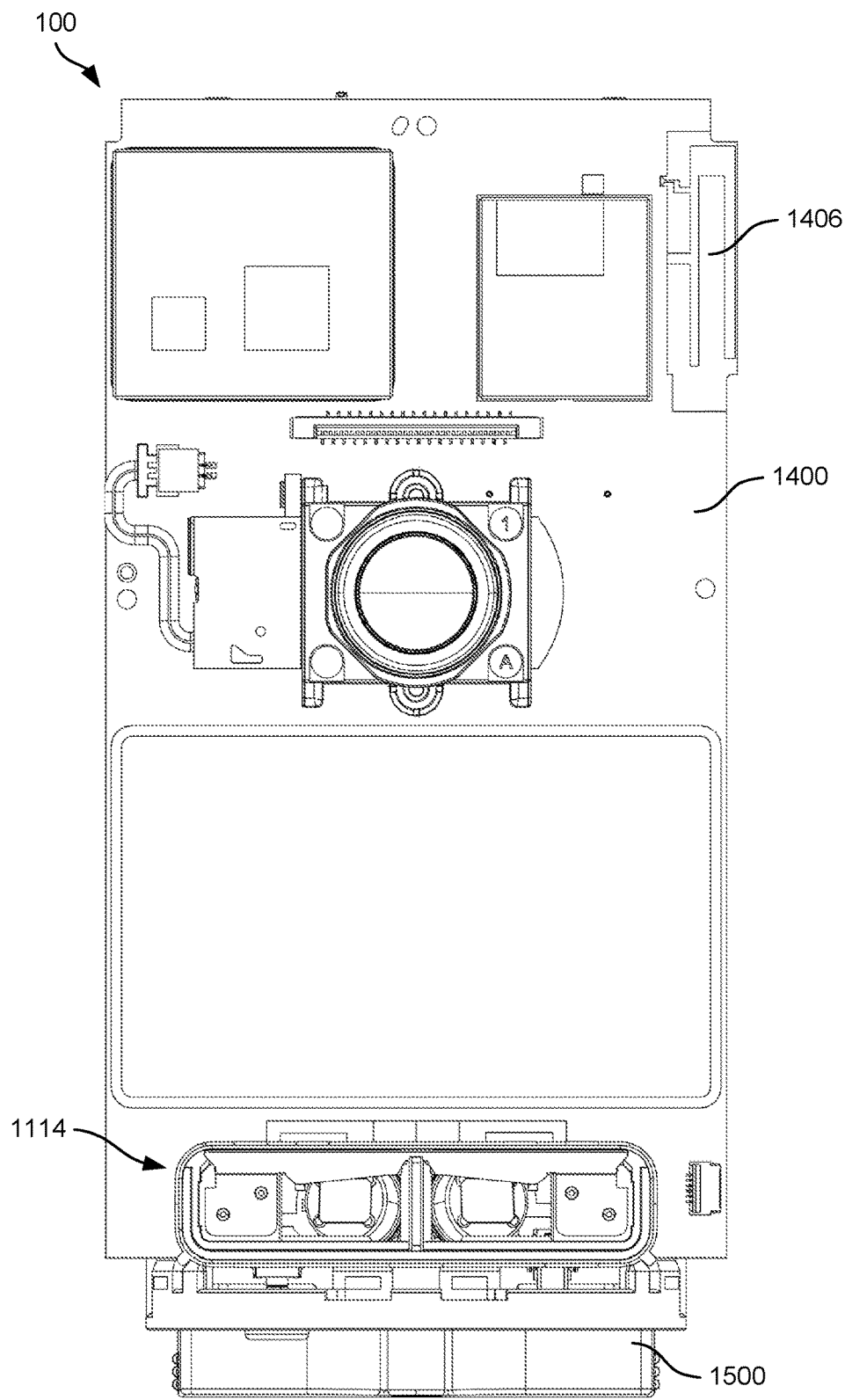
FIG. 15 illustrates example components of the device of FIG. 1, according to an example of the present disclosure.

FIG. 15 illustrates a front view of the device 100, showing components residing within the device 100, according to examples of the present disclosure. From FIG. 14, the speaker 1000 and the speaker box 1112 are shown removed. In some instances, the speaker box 1112 may couple to the main PCB 1400. Additionally, the PIR assembly 1114 may couple the main PCB 1400. In some instances, the main PCB 1400 couples to a battery housing 1500 that is configured to receive one or more batteries of the device 100.

Figure 16:
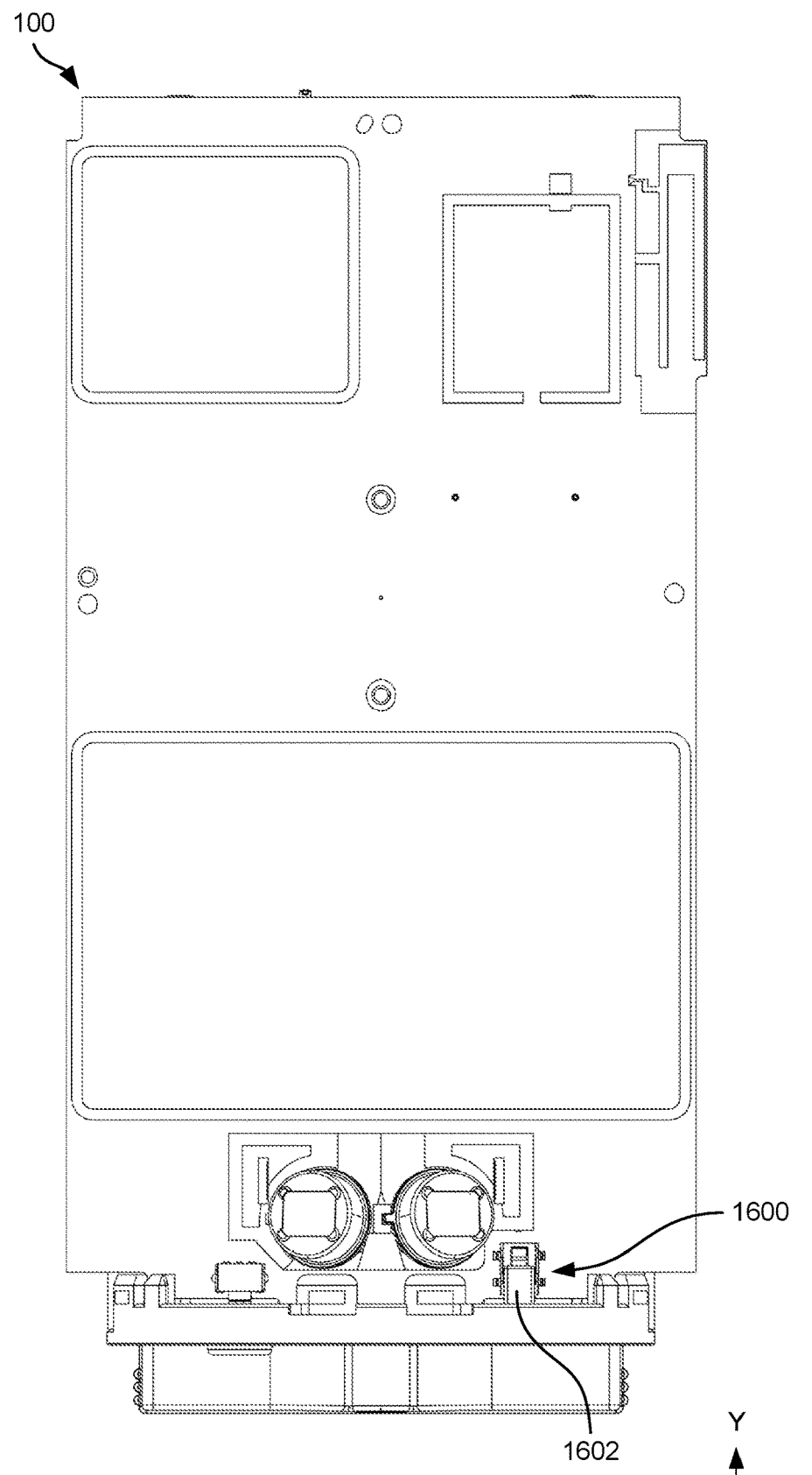
FIG. 16 illustrates example components of the device of FIG. 1, according to an example of the present disclosure.

FIG. 16 illustrates a front view of the device 100, showing components residing within the device 100, according to examples of the present disclosure. From FIG. 15, the camera 1100, portions of the PIR assembly 1114, and computing components are shown removed.

The device 100 may include a switch 1600 that deactivates and activates the camera 1100, as well as other components of the device 100, such as the microphones 1300. In some instances, the switch 1600 couples to the main PCB 1400. In FIG. 16, the switch 1600 is shown in a deactivated state. However, a leg 1602 of the battery housing 1500 is configured to engage with the switch 1600 by translating in the Y-direction. For example, when the button 912 is engaged via a rib of the privacy cover 108, the rib may engage with the leg 1602 and translate the leg 1602 upwards to contact the switch 1600 (or a lever of the switch 1600). Through a contact with the switch 1600, the camera 1100 may be deactivated. The leg 1602 may be a component of the battery housing 1500, wherein the leg 1602 is configured to be deflected from a resting state in order to engage the switch 1600.

Figure 17A:
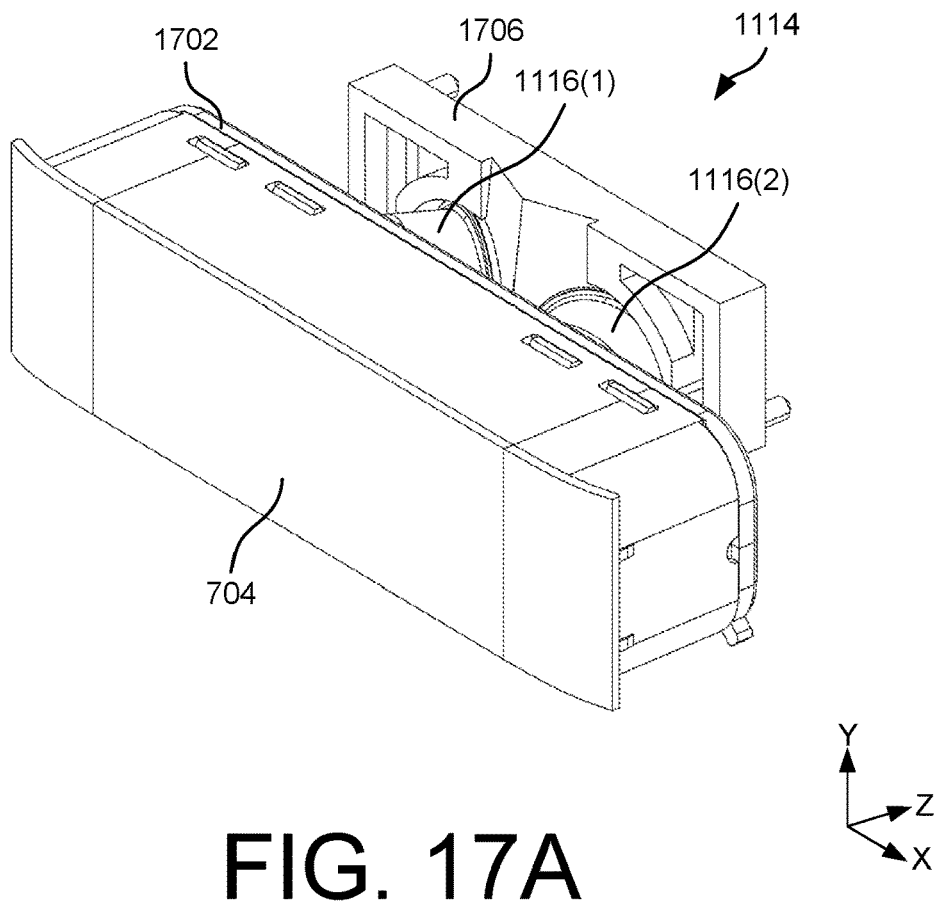
FIGS. 17A and 17B illustrate an example sensor assembly of the device of FIG. 1, according to an example of the present disclosure.
Figure 17B:
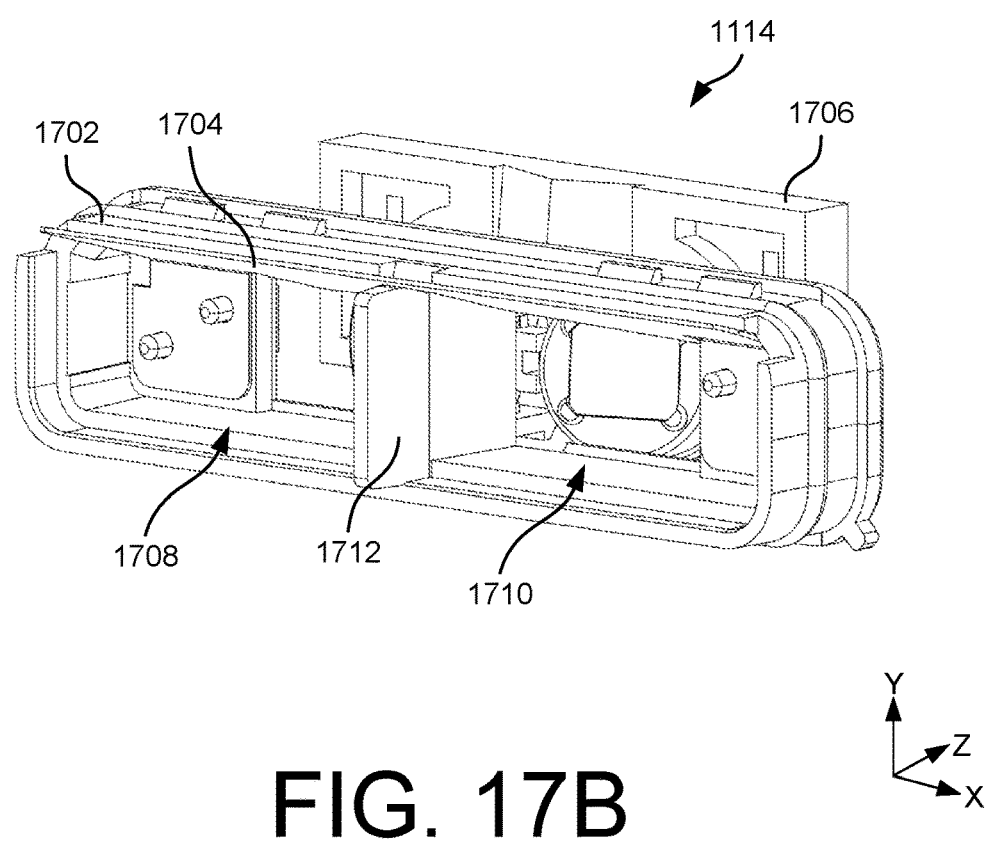

FIGS. 17A and 17B illustrate the PIR assembly 1114, according to examples of the present disclosure. FIG. 17A illustrates a front perspective view of the PIR assembly 1114, while FIG. 17B illustrates a perspective view of the PIR assembly 1114 with the second cover 704 removed.

In some instances, the PIR assembly 1114 includes a PIR frame 1702, a mirror 1704 (e.g., reflective surface), a PIR mount 1706, and the PIR sensor(s) 1116. The PIR frame 1702 may define a first cavity 1708 and a second cavity 1710, as well as a divider 1712 disposed between the first cavity 1708 and the second cavity 1710. The divider 1712 may represent a wall disposed between the first cavity 1708 and the second cavity 1710. The first PIR sensor 1116(1) is oriented to detect IR signals via the first cavity 1708 (through the second cover 704), and the second PIR sensor 1116(2) is oriented to detect IR signals via the second cavity 1710 (through the second cover 704). Collectively, however, the PIR sensor(s) 1116 have a field of view (e.g., monitored space) for detecting movements within the environment. The mirror 1704 may assist in generating the field of view of the PIR sensor(s) 1116. For example, the PIR sensor(s) 1116 may be oriented towards the mirror 1704, such that the mirror 1704 reflects signals towards the PIR sensor(s) 1116. The mirror 1704 couples to the PIR frame 1702 at a location within the first cavity 1708 and the second cavity 1710.

The PIR sensor(s) 1116 couple to the PIR mount 1706 for disposing or orienting the PIR sensor(s) 1116 in a direction towards the front 120 of the device 100, the first side 116 of the device 100, the second side 118 of the device 100, and towards the mirror 1704. Additionally, as shown, the second cover 704 may couple to the PIR frame 1702. In some instances, the PIR assembly 1114 couples to the main PCB 1400.

In some instances, the PIR sensors 1116 may include, for example, two pyroelectric sensing elements. Each pyroelectric sensing element comprises a pyroelectric crystal. Each pyroelectric sensing element generates an electrical charge in response to heat. Radiation (e.g. infrared light) received at a surface of a pyroelectric sensing element generates heat, which in turn generates an electrical charge. Put another way, an absorbing layer of a pyroelectric sensing element transforms radiation flux change into a change in temperature and a pyroelectric component performs a thermal to electrical conversion. One or more low-noise and low leakage current field-effect transistors (e.g. JFET) or operational amplifiers are used to convert charge into a signal voltage.

Additional details of the PIR assembly 1114, or PIR sensor(s) 1116, are described in, for example, U.S. patent application Ser. No. 17/855,752, filed Jun. 30, 2022, and/or U.S. patent applicant Ser. No. 17/953,780, filed Sep. 27, 2022. Each of these patent applications, as well as any publications thereof or patents issuing therefrom, are herein incorporated by reference.

FIGS. 18A and 18B illustrate the speaker box 1112, according to examples of the present disclosure. FIG. 18A illustrates a front perspective view of the speaker box 1112, while FIG. 18B illustrates a front view of the speaker box 1112.

The speaker box 1112 includes a front 1800 and a back 1802. The front 1800 may be oriented towards the front 120 of the device 100, while the back 1802 may be oriented towards the back 122 of the device 100. The speaker box 1112 may include a thickness that extends between the front 1800 and the back 1802. The speaker box 1112 includes a cavity 1804 that at least partially receives the speaker 1000. For example, an opening 1806 may provide access to the cavity 1804, and parts of the speaker 1000 (e.g., basket) may reside within the cavity 1804. The cavity 1804 provides a back volume to the speaker 1000. As such, the cavity 1804 may be hollow, or at least partially hollow. In some instances, the speaker 1000 couples to the front 1800 of the speaker box 1112.

The speaker box 1112 includes a first side 1808 and a second side 1810 opposite the first side 1808 (e.g., in the X-direction). In some instances, the first side 1808 may include a first height (e.g., in the Y-direction), while the second side 1810 may include a second height (e.g., in the Y-direction) that is greater than the first height. The shape of the speaker box 1112 may accommodate the camera 1100. For example, a groove 1812 of the speaker box 1112 may be positioned adjacent to the a body of the camera 1100. In this sense, at least a portion of the speaker box 1112 may wrap around, or be disposed alongside, the camera 1100.

Cables 1814 are further should routing into the speaker box 1112. The cables 1814 may provide power and/or signals to the speaker 1000. An end of the cables 1814 not coupled to the speaker 1000 may be coupled to other computing components of the device 100 (e.g., PCBs, etc.).

Figures 19A, 19B:
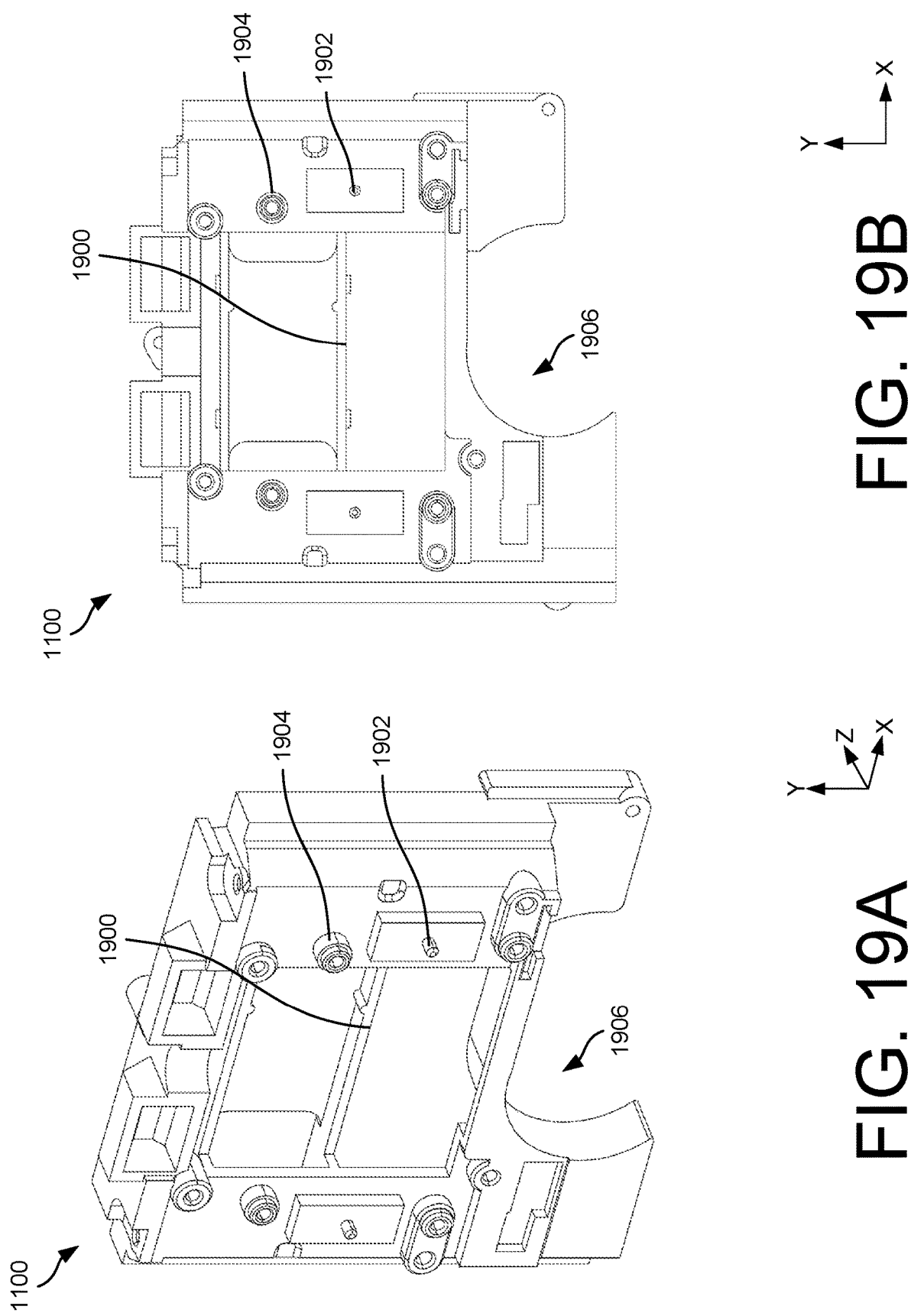
FIGS. 19A and 19B illustrate an example frame of the device of FIG. 1, according to an example of the present disclosure.

FIGS. 19A and 19B illustrate the frame 1110, according to examples of the present disclosure. FIG. 19A illustrates a front perspective view of the frame 1110, while FIG. 19B illustrates a front view of the frame 1110.

The frame 1110 may define, or otherwise include various features for receiving components of the housing 102 or which components of the housing 102 couple. For example, the frame 1110 may include an aperture 1900 through which the flex circuit 1302 routes. The frame 1110 may also include other features for receiving an orienting components of the housing 102, and/or to otherwise align the components within the housing 102. For example, the frame 1110 may include prongs 1902 for receiving and aligning the radar PCB 1004 and/or LED PCB 1108. The frame 1110 may also include receptacles 1904 into which fasteners are threaded for securing the radar PCB 1004 and/or LED PCB 1108 to the frame 1110.

The shape of the frame 1110 may accommodate the camera 1100. For example, a groove 1906 of the frame 1110 may be positioned adjacent to the a body of the camera 1100. In this sense, at least a portion of the frame 1110 may wrap around, or be disposed alongside, the camera 1100.

Figure 20A:
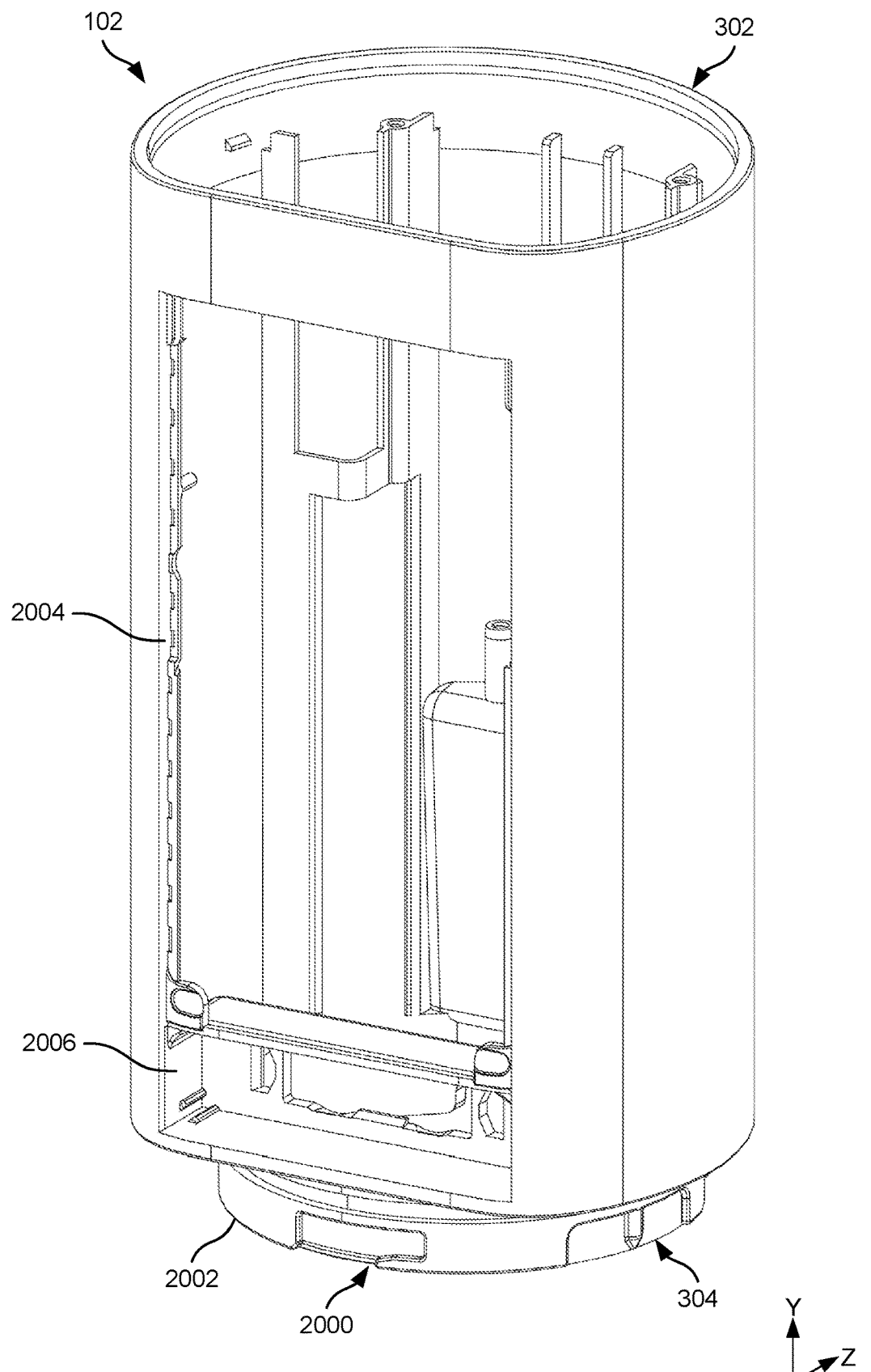
FIGS. 20A-20D illustrate an example housing of the device of FIG. 1, according to an example of the present disclosure.
Figure 20B:
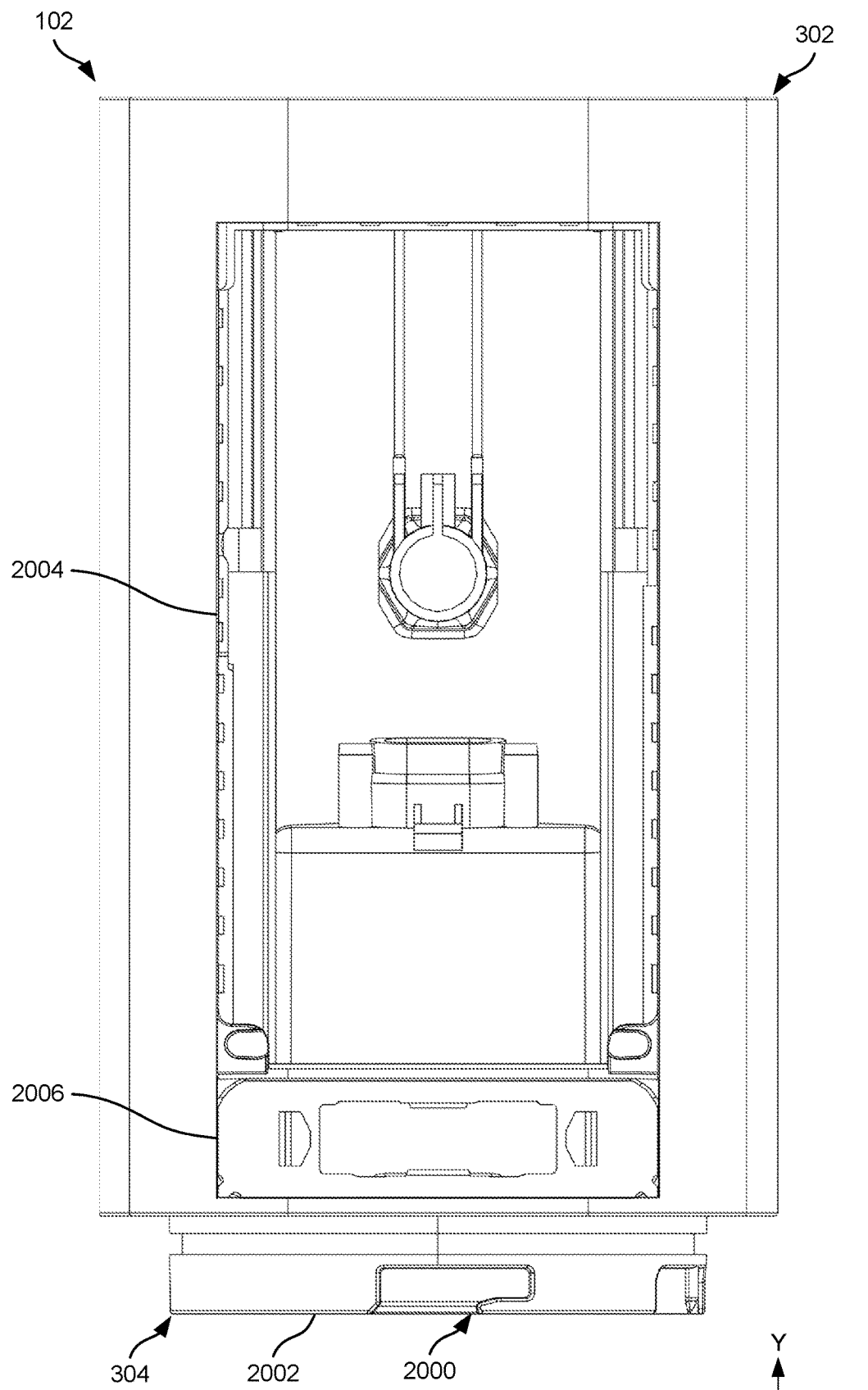
Figure 20C:
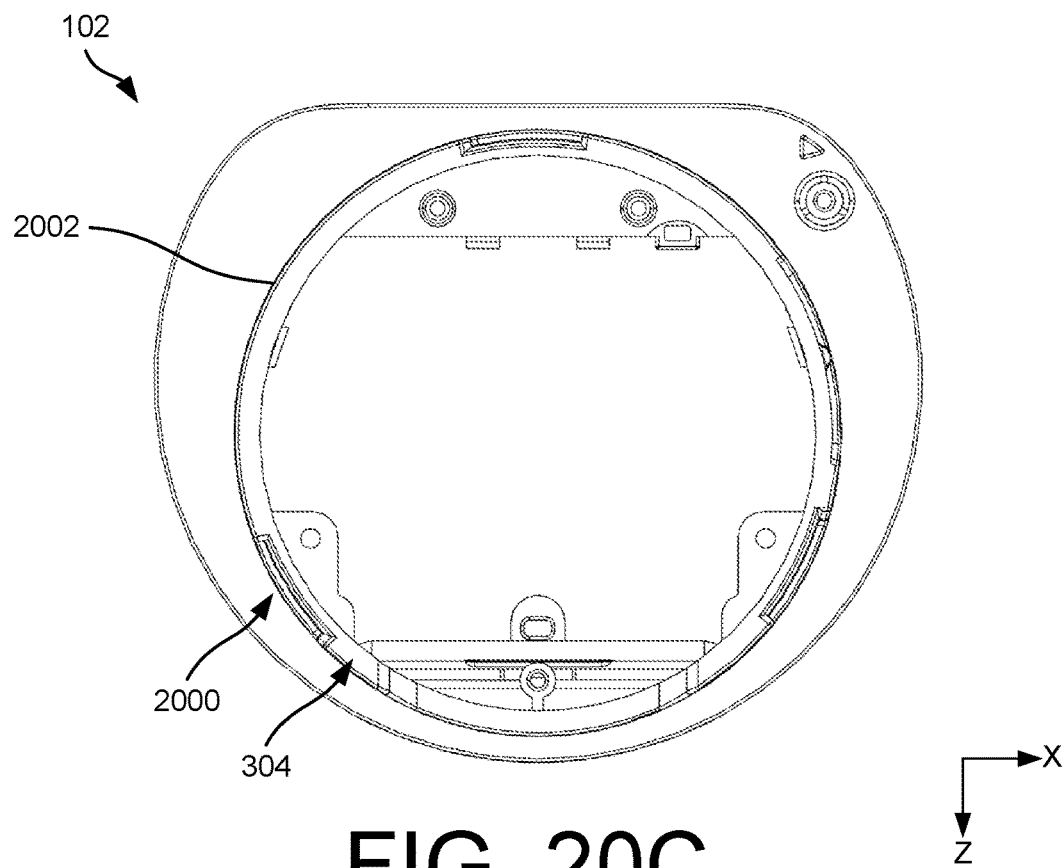
Figure 20D:
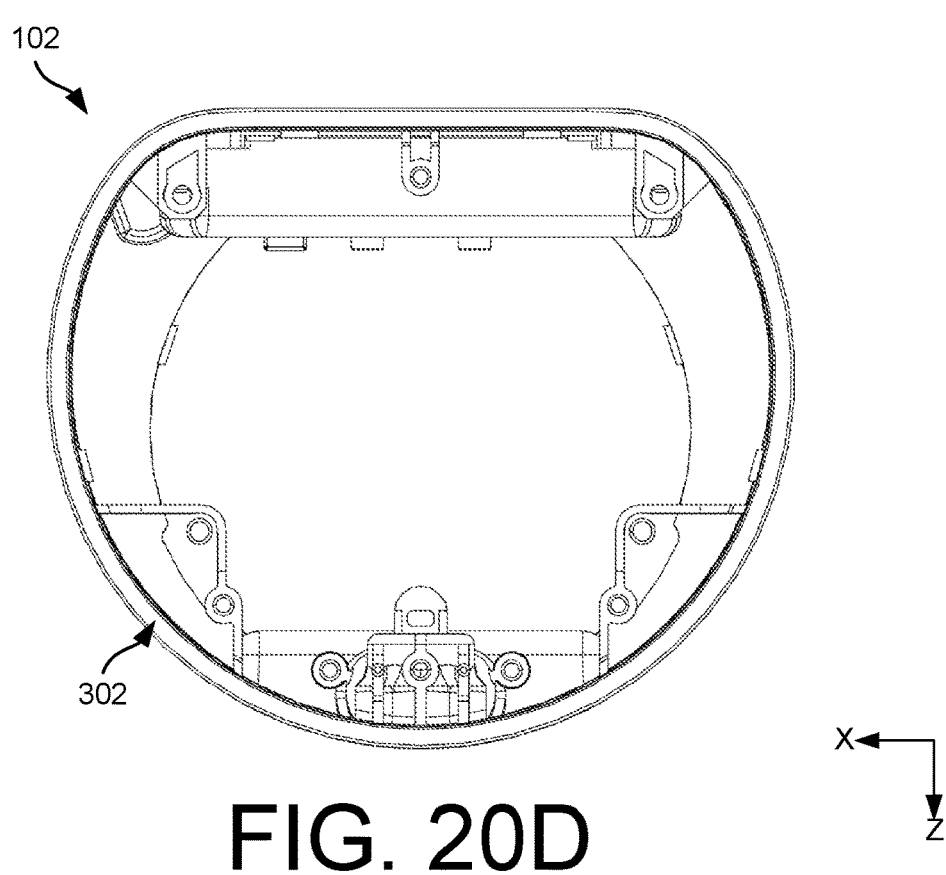

FIGS. 20A-20D illustrate the housing 102, according to examples of the present disclosure. FIG. 20A illustrates a front perspective view of the housing 102, FIG. 20B illustrates a front planar view of the housing 102, FIG. 20C illustrates a first end view of the housing 102, such as the bottom end 304, and FIG. 20D illustrates a second end view of the housing 102, such as the top end 302.

The housing 102 defines first attachment mechanisms 2000 arranged at the bottom end 304 of the housing 102 and which engage with second attachment mechanisms of the bottom cover 104. In some instances, the first attachment mechanisms 2000 may resemble tabs, hooks, protrusions, keys, keyways, slots, or other male/female connectors that are complimentary to engage with the second attachment mechanisms (e.g., tabs, hooks, protrusions, keys, keyways, slots, or other male/female connectors).

The first attachment mechanisms 2000 may engage with the second attachment mechanisms when the housing 102 and/or the bottom cover 104 is rotated. That is, the first attachment mechanisms 2000 may engage with and secure to the second attachment mechanisms when the housing 102 and/or the bottom cover 104 are rotated into contact with one another. As an example, the first attachment mechanisms 2000 may include a keyway, and the second attachment mechanisms may include a hook or a tab that is configured to engage with the keyway when rotated. In some instances, the bottom cover 104 may be rotated in a first direction (e.g., clockwise about the Y-axis) to engage the first attachment mechanisms 2000 and the second attachment mechanisms, while the bottom cover 104 may be rotated in a second direction (e.g., counterclockwise about the Y-axis) to disengage the first attachment mechanisms 2000 and the second attachment mechanisms.

In some instances, the first attachment mechanisms 2000 may be formed on and/or within the exterior surface 604 of the housing 102. The first attachment mechanisms 2000 may be disposed annularly around a perimeter 2002 at the bottom end 304 of the housing 102. The perimeter 2002 of the housing 102 is insertable into the bottom cover 104, or stated alternatively, a portion of the bottom cover 104 is configured to be disposed over the perimeter 2002 of the housing 102 for engaging the first attachment mechanisms 2000 and the second attachment mechanisms. Any number of the first attachment mechanisms 2000 and second attachment mechanisms may be included. For example, the housing 102 may include three of the first attachment mechanisms 2000 that engage with three of the second attachment mechanisms, respectively. However, more than or less than three of the first attachment mechanisms 2000 and the second attachment mechanisms may be included.

The top end 302 of the housing 102, opposite the bottom end 304, is open to receive the top cover 106. In some instances, the housing 102 is formed via a unitary body, or may be multiple bodies (e.g., halves) coupled together.

The housing 102 defines various receptacles for receiving the lenses, covers, and so forth. For example, a first receptacle 2004 of the housing 102 may receive the camera lens 900, first cover 702, and/or the speaker grill 700, while a second receptacle 2006 may receive the second cover 704. The first receptacle 2004 and the second cover 704 are sized and configured to receive the camera lens 900, the first cover 702, the second cover 704, and the speaker grill 700, respectively. The housing 102 may also define various keyways, slots, and so forth into which or within which the camera lens 900, the first cover 702, the second cover 704, and the speaker grill 700 engage. For example, the camera lens 900, the first cover 702, the second cover 704, and the speaker grill 700 may couple to the housing 102 via press and fit mechanisms, adhesives, and so forth. Such keyways and slots may also align the camera lens 900, the first cover 702, the second cover 704, and the speaker grill 700 on the housing 102, respectively. As shown, the first receptacle 2004 and the second receptacle 2006 may be located on a front of the housing 102.

The first receptacle 2004 and the second receptacle 2006 may represent cutouts within an exterior surface 604 of the housing 102 such that when the camera lens 900, the first cover 702, the second cover 704, and the speaker grill 700 couple to the housing 102, a smooth or continuous surface is formed. For example, the first receptacle 2004 and the second receptacle 2006 may include a depth that substantially corresponds to a thickness of the camera lens 900, the first cover 702, the second cover 704, and the speaker grill 700. Once the camera lens 900, the first cover 702, the second cover 704, and the speaker grill 700 couple to the first cover 702, the camera lens 900, the first cover 702, the second cover 704, and the speaker grill 700 may respectively align with the exterior surface 604.

Figure 21A:
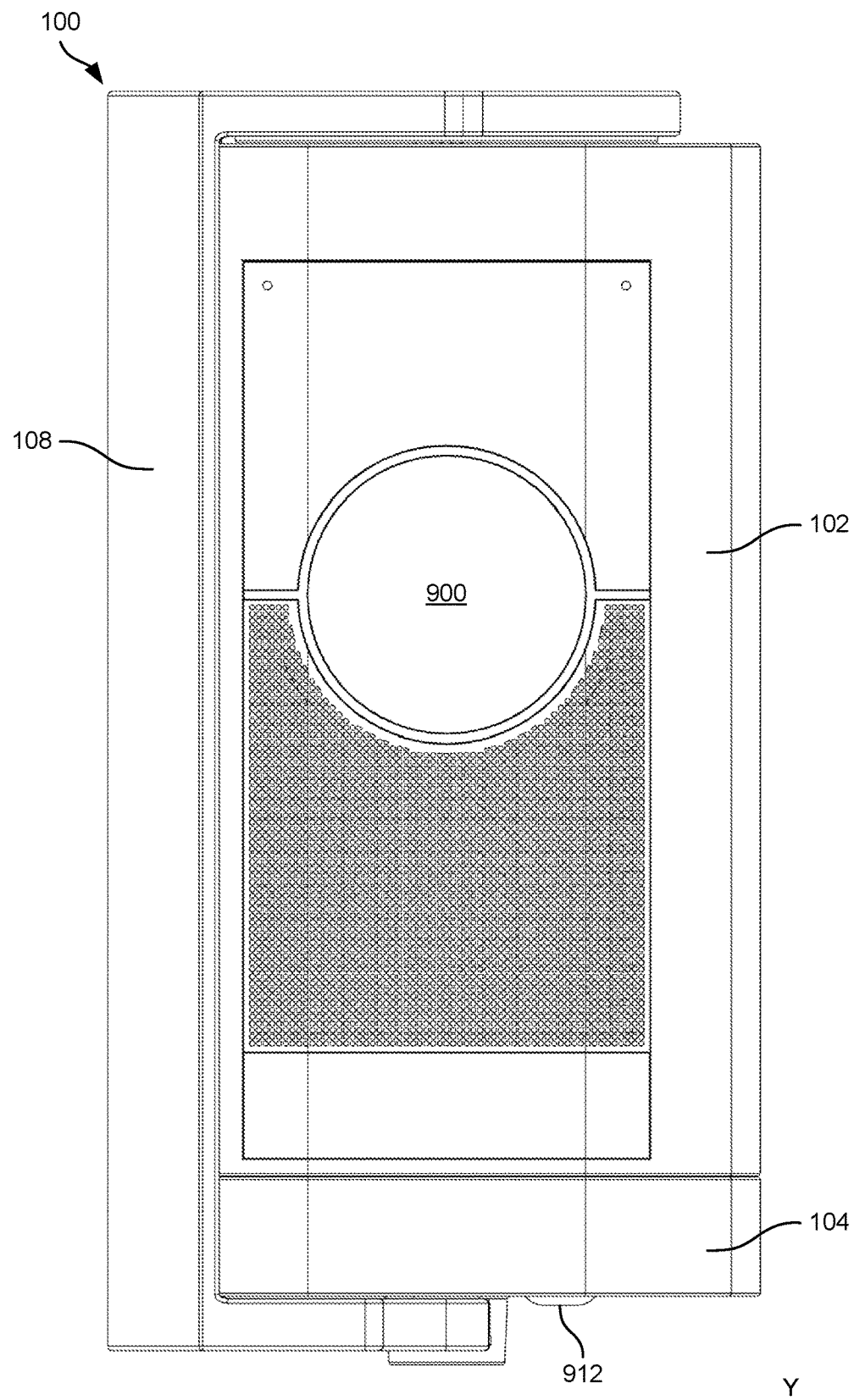
FIGS. 21A and 21B illustrate a rotational movement of the privacy cover of the device of FIG. 1, showing the privacy cover in a second position, according to an example of the present disclosure.
Figure 21B:
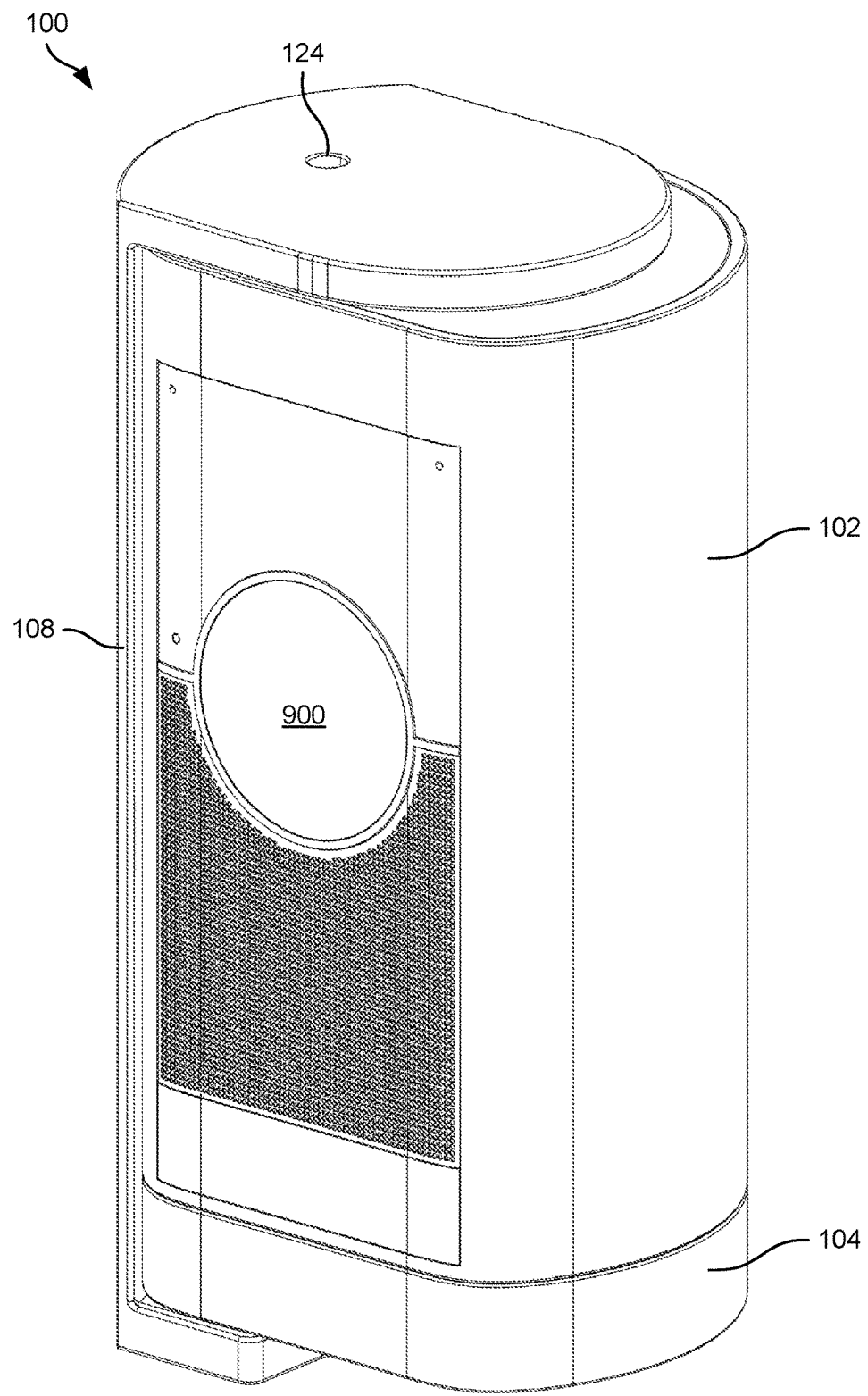

FIGS. 21A and 21B illustrate the privacy cover 108 in the second position, according to examples of the present disclosure. FIG. 21A illustrates a front planar view of the device 100 with the privacy cover 108 in the second position, while FIG. 21B illustrates a front perspective view of the device 100 with the privacy cover 108 in the second position. In FIGS. 21A and 21B, the mount 110 is shown uncoupled from the bottom cover 104. However, the privacy cover 108 may transition between the first position and the second position with the mount 110 coupled to the bottom cover 104 via the receptacle 204.

From the first position of the privacy cover 108, the privacy cover 108 may rotate (e.g., swing) in the clockwise direction to the second position. In some instances, the privacy cover 108 may rotate 90 degrees from the first position to the second position. At the second position, the camera 1100, the lighting elements 1006, the IR lighting elements 1102, and so forth are unobstructed by the privacy cover 108. Rotation of the privacy cover 108, to the second position, is accomplished at least in part via an engagement between the privacy cover 108 and the bracket 906, as well as the privacy cover 108 and the fastener 500. As will be explained herein, features of the privacy cover 108 and the bracket 906 may engage in the second position to provide a snap-like feel to a user of the device 100 to indicate that the privacy cover 108 is in the second position and/or to keep the privacy cover 108 in the second position. As further shown, in the second position, the privacy cover 108 does not engage with the button 912 on the bottom cover 104.

In the second position, the first passageway 124 of the privacy cover 108 aligns with another of the first indicators 600. Here, because the privacy cover 108 does not obstruct the camera 1100, for example, the first indicators 600 may indicate such. For example, in the second position, a green circle or other like indicator may be visible through the first passageway 124 in order to indicate that the camera 1100 is unobstructed.

Figure 22A:
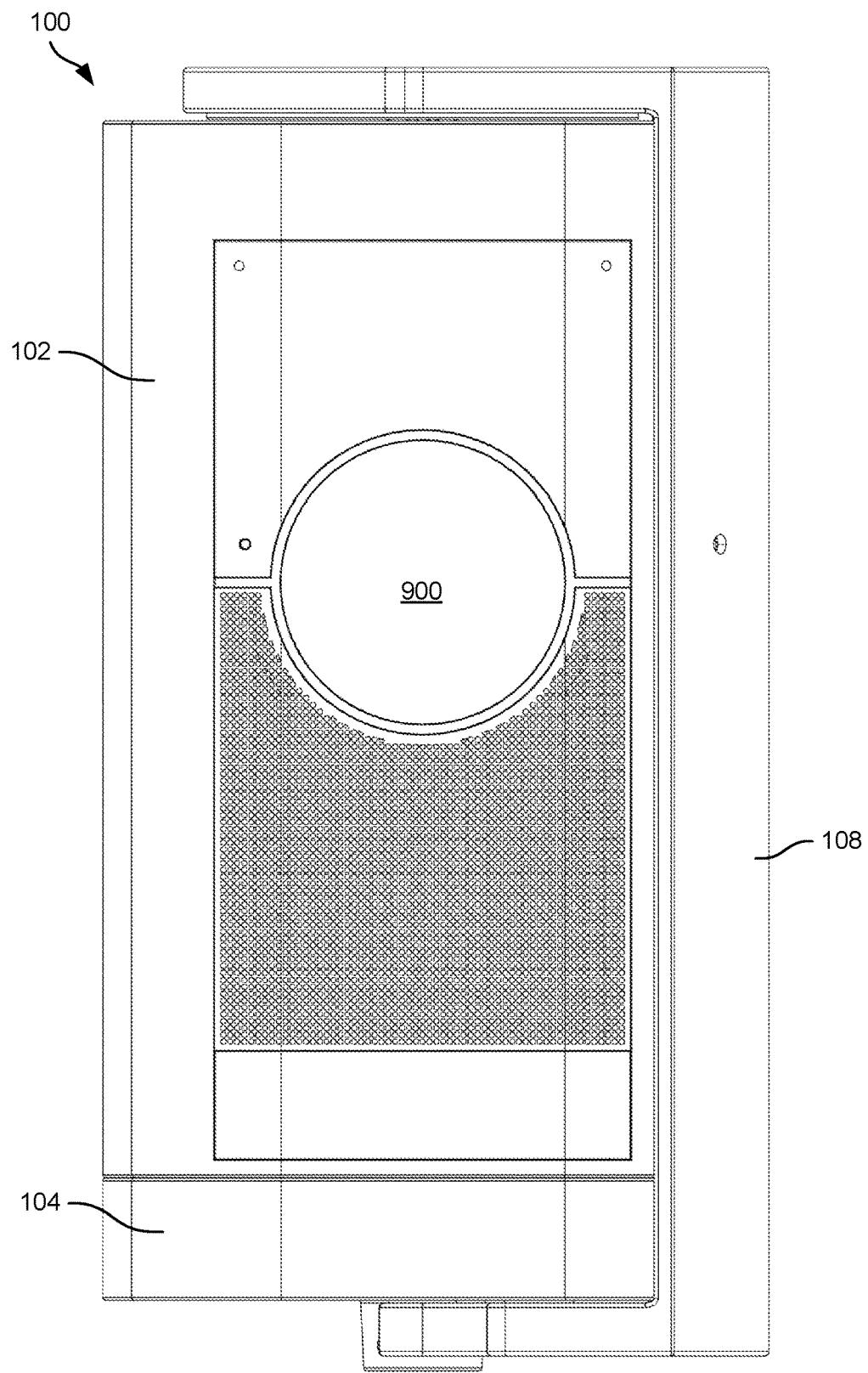
FIGS. 22A and 22B illustrate a rotational movement of the privacy cover of the device of FIG. 1, showing the privacy cover in a third position, according to an example of the present disclosure.
Figure 22B:
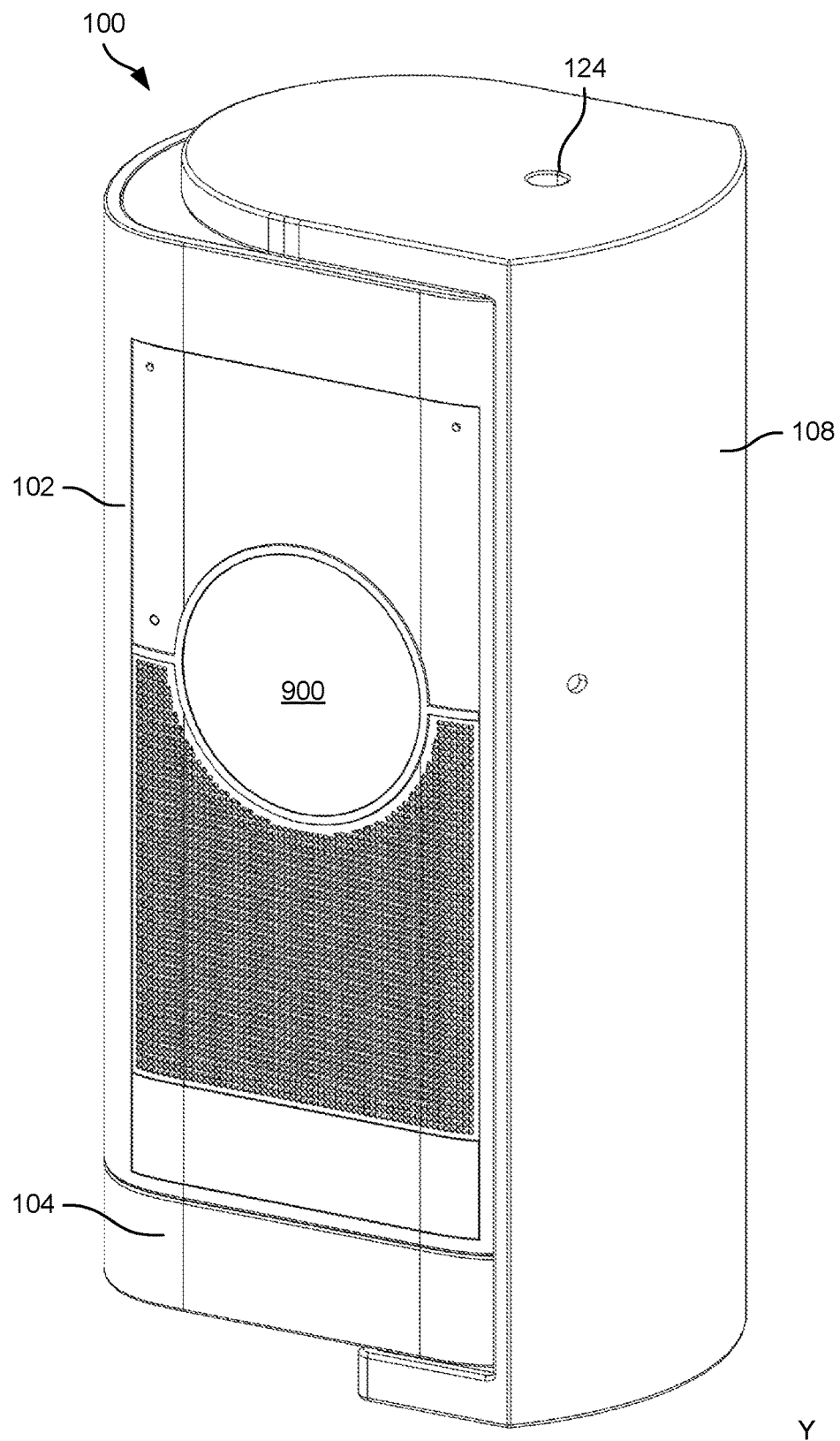

FIGS. 22A and 22B illustrate the privacy cover 108 in the third position, according to examples of the present disclosure. FIG. 22A illustrates a front planar view of the device 100 with the privacy cover 108 in the third position, while FIG. 22B illustrates a front perspective view of the device 100 with the privacy cover 108 in the third position. In FIGS. 22A and 22B, the mount 110 is shown uncoupled from the bottom cover 104. However, the privacy cover 108 may transition between the first position and the third position with the mount 110 coupled to the bottom cover 104 via the receptacle 204.

From the first position of the privacy cover 108 (or the third position), the privacy cover 108 may rotate (e.g., swing) in the counterclockwise direction to the third position. In some instances, the privacy cover 108 may rotate 90 degrees from the first position to the third position, or 180 degrees from the second position to the third position. At the third position, the camera 1100, the lighting elements 1006, the IR lighting elements, and so forth are unobstructed by the privacy cover 108. Rotation of the privacy cover 108, to the third position, is accomplished at least in part via an engagement between the privacy cover 108 and the bracket 906, as well as the privacy cover 108 and the fastener 500. As will be explained herein, features of the privacy cover 108 and the bracket 906 may engage in the third position to provide a snap-like feel to a user of the device 100 to indicate that the privacy cover 108 is in the third position and/or to keep the privacy cover 108 in the third position. In the third position, the privacy cover 108 does not engage with the button 912 on the bottom cover 104. For example, although not shown, the button 912 may be disposed within a cavity or vacant area on the interior surface of the privacy cover 108.

In the third position, the first passageway 124 of the privacy cover 108 aligns with another of the first indicators 600. Here, because the privacy cover 108 does not obstruct the camera 1100, for example, the first indicators 600 may indicate such. For example, in the third position, a green circle or other like indicator may be visible through the first passageway 124 in order to indicate that the camera 1100 is unobstructed. In some instances, the first indication that the privacy cover 108 is in the third position may be the same indication as when the privacy cover 108 is in the second position.

Although the privacy cover 108 is described as being moveable between the first position, the second position, and the third position, in some instances, the privacy cover 108 may be movable between two positions. At a first of these positions, the privacy cover 108 may obstruct the camera 1100 (e.g., the first position), while at a second of these position, the privacy cover 108 may not obstruct the camera 1100 (e.g., the second position or the third position). In other words, the privacy cover 108 is described herein as being rotated in both clockwise or counterclockwise directions from the first position, to either the second position or the third position, the privacy cover 108 may limited to moving to only one of the second position or the third position.

Figure 23A:
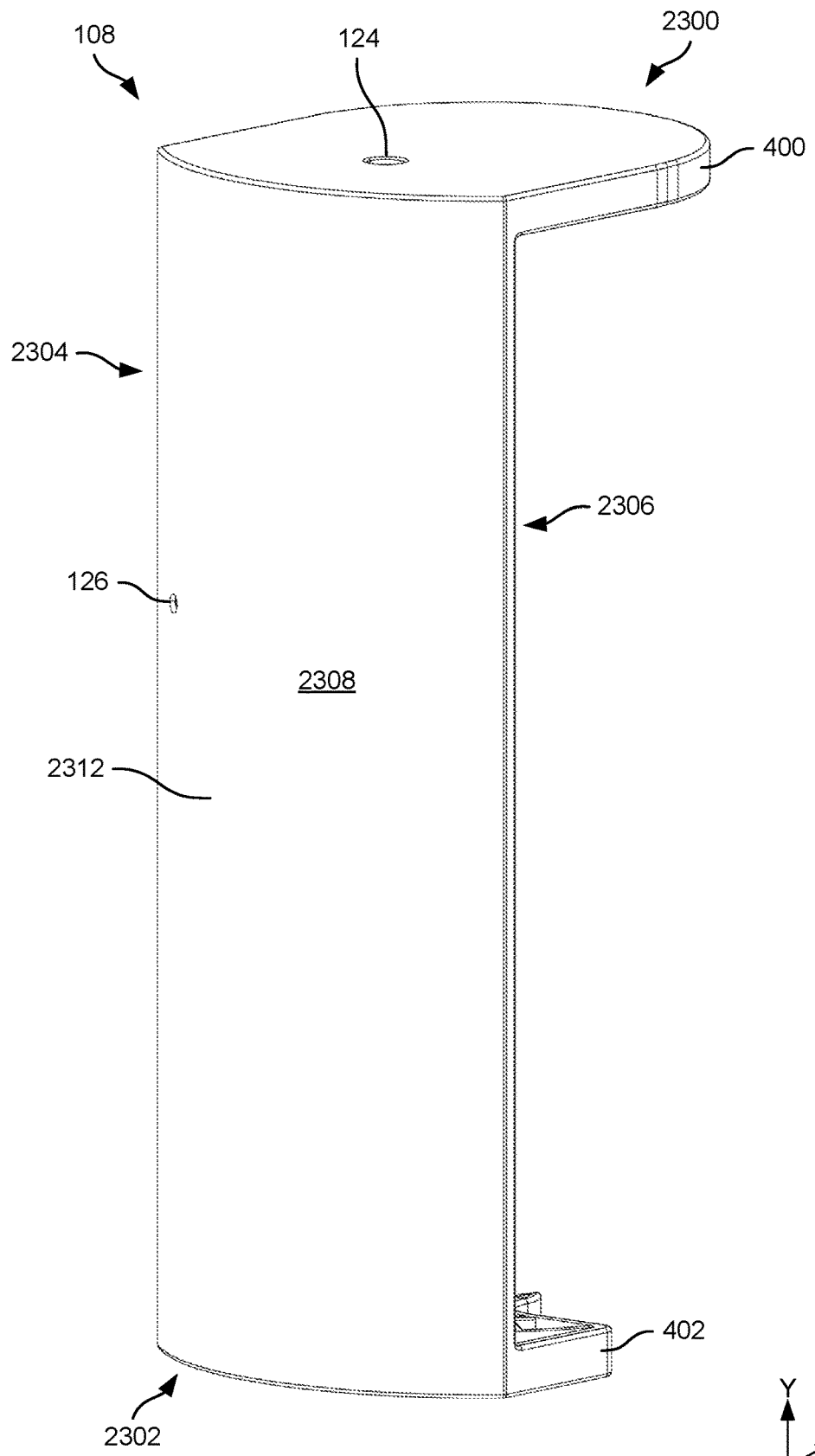
FIGS. 23A and 23B illustrate the privacy cover of the device of FIG. 1, according to an example of the present disclosure.
Figure 23B:
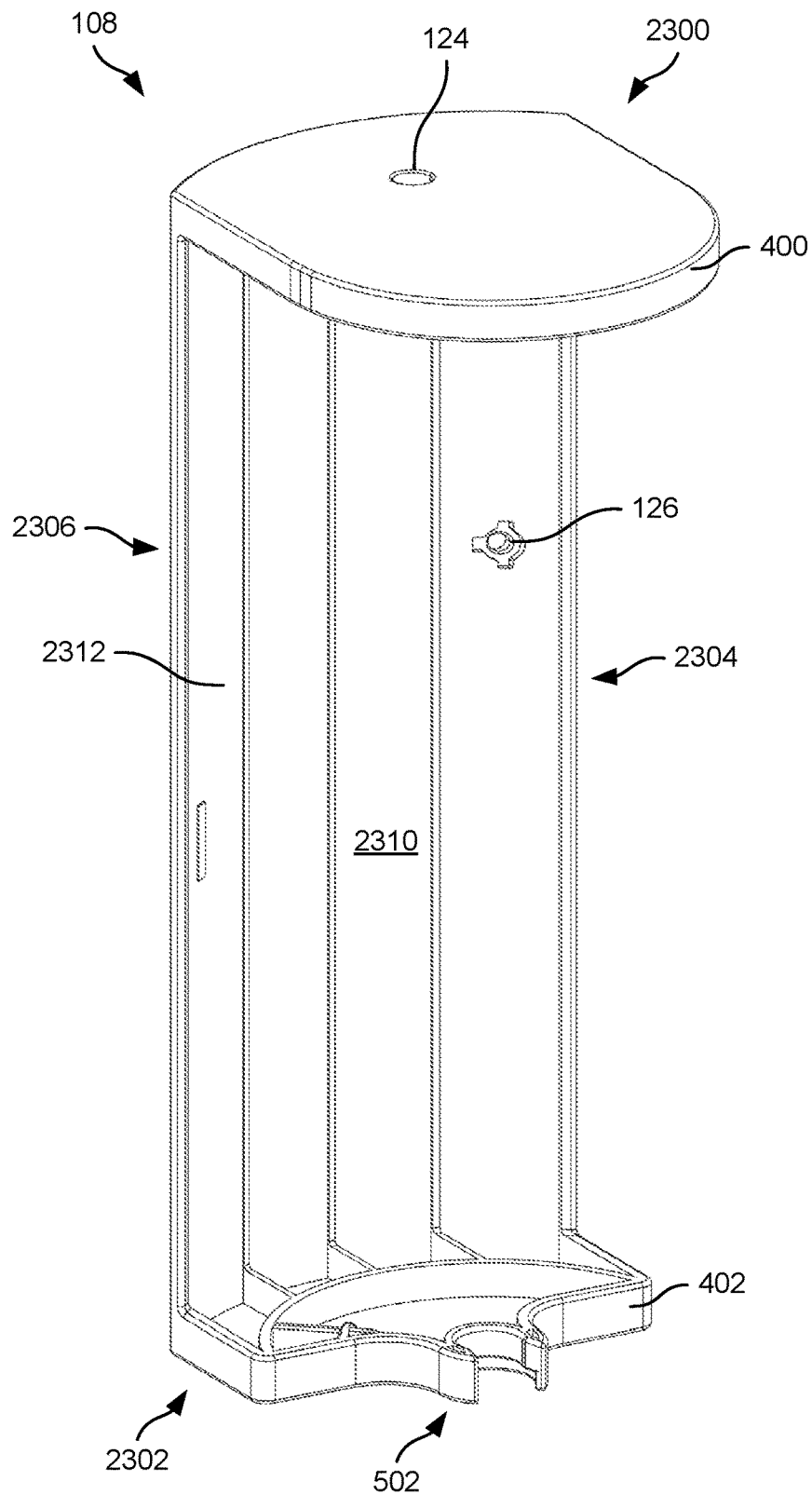

FIGS. 23A and 23B illustrate the privacy cover 108, according to examples of the present disclosure. FIG. 23A illustrates a front perspective view of the privacy cover 108, while FIG. 23B illustrates a rear perspective view of the privacy cover 108.

The privacy cover 108 may include a first end 2300 and a second end 2302 opposite the first end 2300 (e.g., spaced apart in the Y-direction). A height of the privacy cover 108 is disposed between the first end 2300 and the second end 2302. The privacy cover 108 also includes a first side 2304 and a second side 2306 opposite the first side 2304 (e.g., spaced apart in the X-direction). A width of the privacy cover 108 is disposed between the first side 2304 and the second side 2306. The privacy cover 108 also includes an exterior surface 2308 and an interior surface 2310. The exterior surface 2308 may be oriented in a direction away from the device 100, while the interior surface 2310 may be oriented in a direction towards the device 100 (when the privacy cover 108 couples to the device 100).

In some instances, the first arm 400 is located at the first end 2300, and the second arm 402 is located at the second end 2302. A body 2312 of the privacy cover 108 extends between the first end 2300 and the second end 2302. In some instances, the first arm 400 and the second arm 402 extend transverse to the body 2312. The first passageway 124 is disposed through the first arm 400 of the privacy cover 108, between the exterior surface 2308 and the interior surface 2310. As discussed above, the first passageway 124 permits the first indications 606 to be visible through the privacy cover 108 depending upon the position of the privacy cover 108. Likewise, the second passageway 126 is disposed through the body 2312 of the privacy cover 108, between the exterior surface 2308 and the interior surface 2310. The second passageway 126 is sized to receive the light pipe 300 such that light emitted via the status indicator 1106 is visible through the privacy cover 108, and when the privacy cover 108 is in the first position. The prongs 502 are shown located on the second arm 402 for engaging with the fastener 500.

Figure 24A:
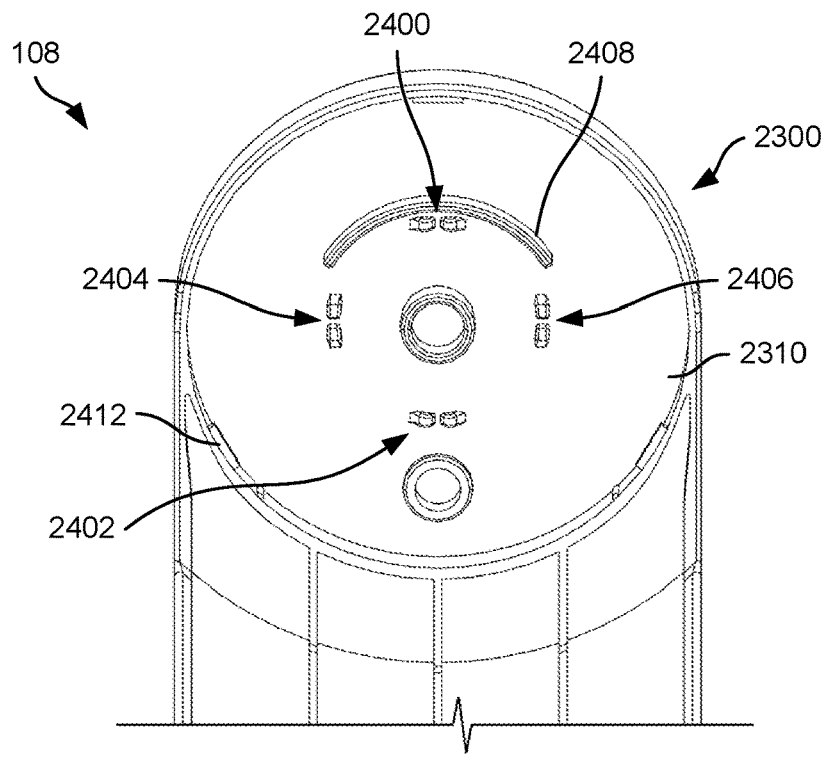
FIGS. 24A and 24B illustrate example mechanisms for controlling a rotational movement of the privacy cover of the device of FIG. 1, according to an example of the present disclosure.
Figure 24B:
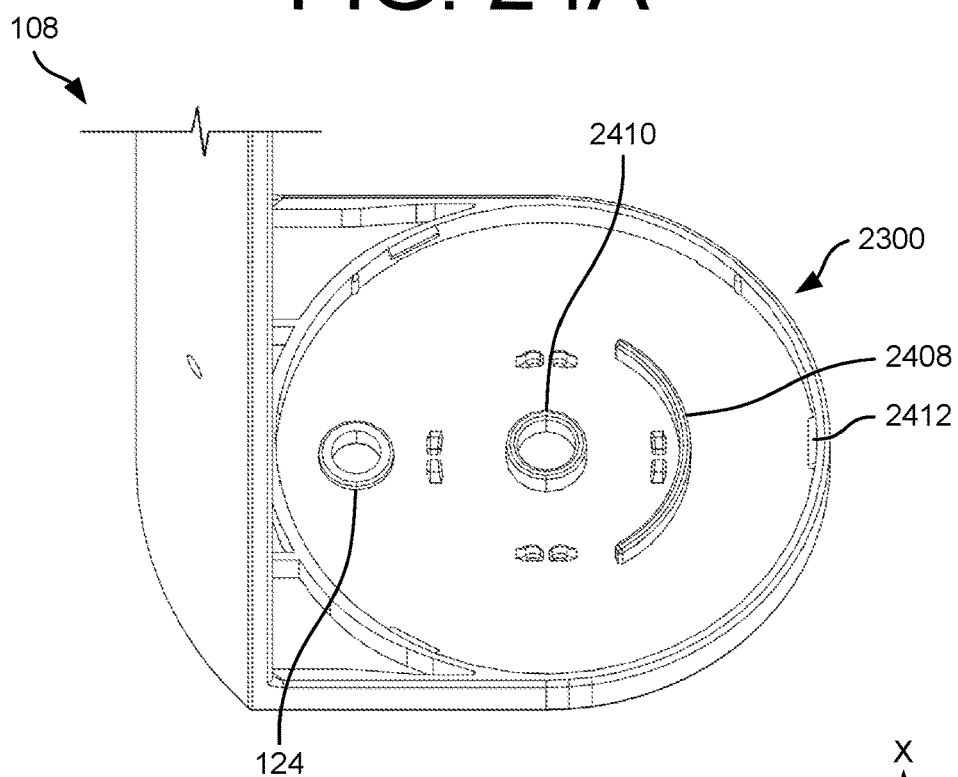

FIGS. 24A and 24B illustrate interior views of the first end 2300 of the privacy cover 108, showing features for engaging with the bracket 906 for controlling a rotational movement of the privacy cover 108, according to examples of the present disclosure.

The first end 2300 of the privacy cover 108 includes first protrusions 2400, second protrusions 2402, third protrusions 2404, and fourth protrusions 2406. In some instances, the first protrusions 2400, the second protrusions 2402, the third protrusions 2404, and/or the fourth protrusions 2406 represent bumps, lips, flanges, etc. that extend from the interior surface 2310 of the privacy cover 108. In some instances, the first protrusions 2400 are opposite the second protrusions 2402, and/or the third protrusions 2404 are opposite the fourth protrusions 2406. As will be explained herein, the first protrusions 2400, the second protrusions 2402, the third protrusions 2404, and/or the fourth protrusions 2406 may engage with features (e.g., prongs) of the bracket 906 for positioning the privacy cover 108 in the first position, the second position, and the third position, respectively. For example, in the first position of the privacy cover 108, the first protrusions 2400 and the second protrusions 2402 may engage with the features of the bracket 906. In the first position, the features may reside within adjacent ones of the first protrusions 2400 and the second protrusions 2402, respectively. For example, a first feature of the bracket 906 may reside within the first protrusions 2400, and a second feature of the bracket 906 may reside within the second protrusions 2402. This engagement may provide a snap-like feel to an operator of the device 100 and/or secure the privacy cover 108 in the first position.

However, the engagement between the first feature and the second feature with the first protrusions 2400 and the second protrusions 2402 may be overcome by rotating the privacy cover 108. Here, a threshold amount of rotational force may overcome such engagement, such that the first feature disengages the first protrusions 2400 and the second feature disengages the second protrusions 2402. In this instance, the first protrusions 2400 may roll over the first feature and the second protrusions 2402 may roll over the second feature, respectively. Further rotation of the privacy cover 108, from the first position to the second position or the third position, may cause the first feature and the second feature to become engaged with the third protrusions 2404 and the fourth protrusions 2406, respectively. Such engagement between the third protrusions 2404 and the fourth protrusions 2406 may provide a snap-like feel to an operator of the device 100 and/or secure the privacy cover 108 in the second position or the third position.

The privacy cover 108 may include an annular ridge 2408 that engages with a portion of the bracket 906, such as a groove. The annular ridge 2408 is shown extending from the interior surface 2310 at the first end 2300 of the privacy cover 108, such as at or along the first arm 400. The annular ridge 2408 may traverse along or over the groove to permit the rotational movement of the privacy cover 108, and/or to assist the privacy cover 108 in maintaining a rotational movement of the privacy cover 108 during movement between the first position, the second position, and the third position.

A post 2410 may extend from the interior surface 2310 on the first arm 400, and may engage with a receptacle of the bracket 906. The engagement between the post 2410 and the receptacle may align the privacy cover 108 on the bracket 906 (or the housing 102) as the privacy cover 108 rotates. For example, the post 2410 may reside within the receptacle of the bracket 906, and during rotation of the privacy cover 108, the post 2410 may rotate within the receptacle. As such, the engagement between the post 2410 and the receptacle may maintain an alignment between the privacy cover 108 and the bracket 906 during rotation of the privacy cover 108. In some instances, the post 2410 is centrally located between the first protrusions 2400, the second protrusions 2402, the third protrusions 2404, and/or the fourth protrusions 2406.

The privacy cover 108 may further include one or more tabs 2412 that engage with the groove of the bracket 906. In some instances, the one or more tabs 2412 may disposed annularly around the first arm 400. The one or more tabs 2412 may snap over the groove of the bracket 906, and assist in coupling the privacy cover 108 to the housing 102. The first passageway 124 is further shown extending through the privacy cover 108 for permitting the first indications 600 to be visible depending upon the position of the privacy cover 108.

Figure 25:
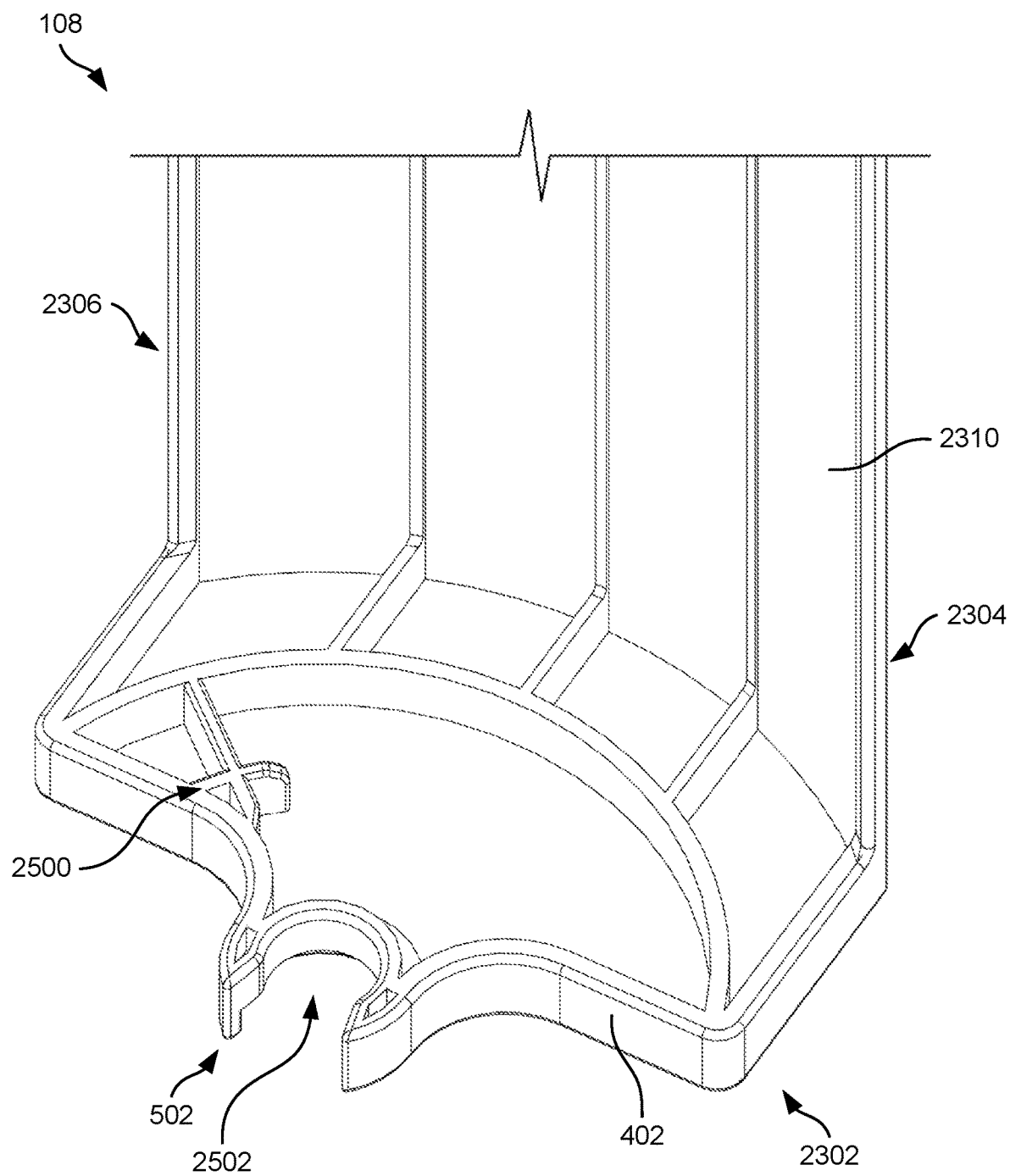
FIG. 25 illustrates an example portion of the privacy cover of the device of FIG. 1 for controlling an operation of one or more components of the device, according to an example of the present disclosure.

FIG. 25 illustrates an end view of the privacy cover 108, showing a rib 2500 that engages with the button 912, according to examples of the present disclosure. The rib 2500 is shown being located on the second end 2302 of the privacy cover 108, such as on the second arm 402 and along or within the interior surface 2310 of the privacy cover 108. The rib 2500 is positioned, or otherwise located, such that in the first position of the privacy cover 108, the rib 2500 engages within the button 912. The rib 2500 may be sized and shaped to provide a sufficient surface area to engage with the button 912, and to cause the button 912 to translate and engage the switch 1600 to deactivate the camera 1100. As shown, and in some instances, the rib 2500 may be located more proximate to the second side 2306 of the privacy cover 108 than the first side 2304 of the privacy cover 108.

The privacy cover 108 is further shown including the prongs 502 located at the second end 2302. The prongs 502 may be located on the second end 2302 of the privacy cover 108. The prongs 502 are configured to receive the fastener 500. For example, when the privacy cover 108 couples to the device 100, the fastener 500 may be disposed between the prongs 502. In some instances, a slot 2502 is defined between, or via, the prongs 502 and the fastener 500 resides at least partially within the slot 2502. The privacy cover 108 is configured to rotate about the fastener 500 as the privacy cover 108 transitions between the first position, the second position, and the third position.

Although the privacy cover 108 is shown including the prongs 502, other mechanisms and/or features may be used to couple the privacy cover 108 to the device 100. For example, rather than including the prongs 502, the privacy cover 108 may include a circular passageway (enclosed) through which the fastener 500 is disposed. In some instances, the use of the prongs 502 permits the privacy cover 108 to be removed from the device 100. For example, the prongs 502 may snap over the fastener 500 when the privacy cover 108 couples to the device 100.

Figure 26A:
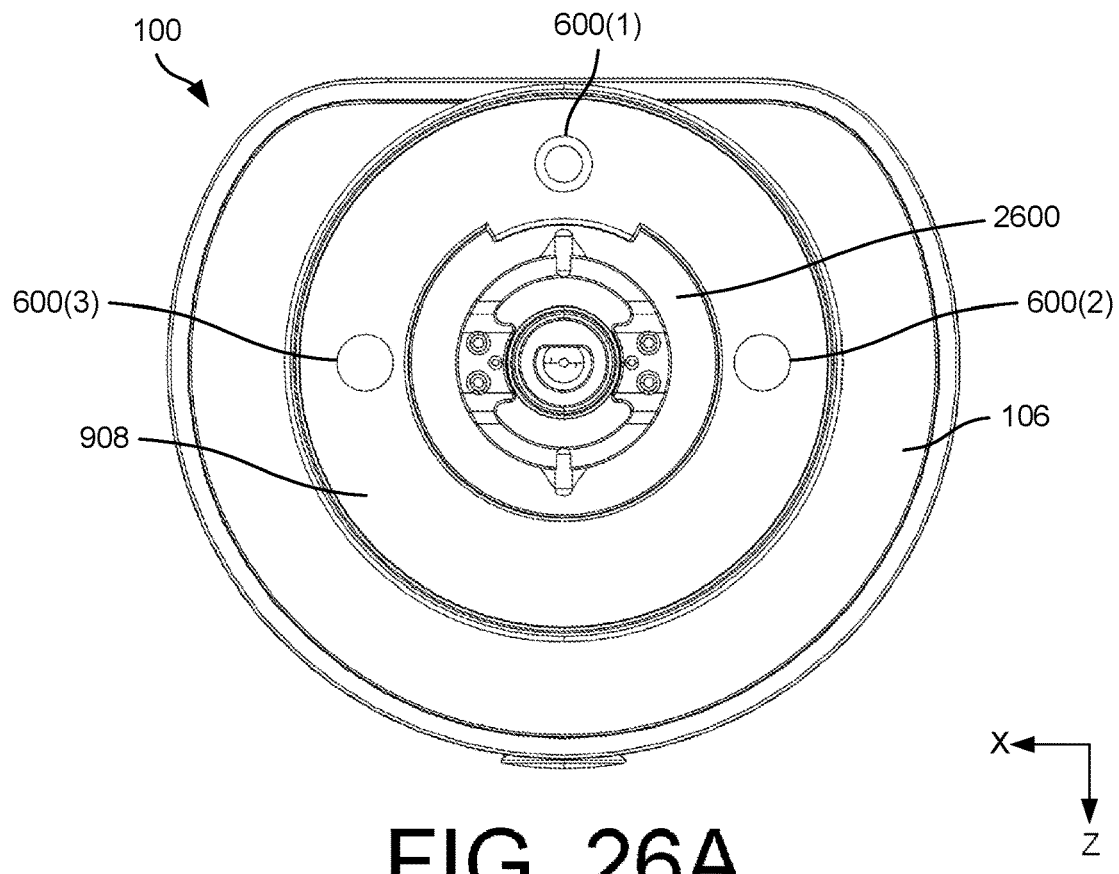
FIGS. 26A-26D illustrate an example bracket that engages with the mechanisms of FIGS. 24A and 24B for controlling a rotational movement of the privacy cover of the device of FIG. 1, according to an example of the present disclosure.
Figure 26B:
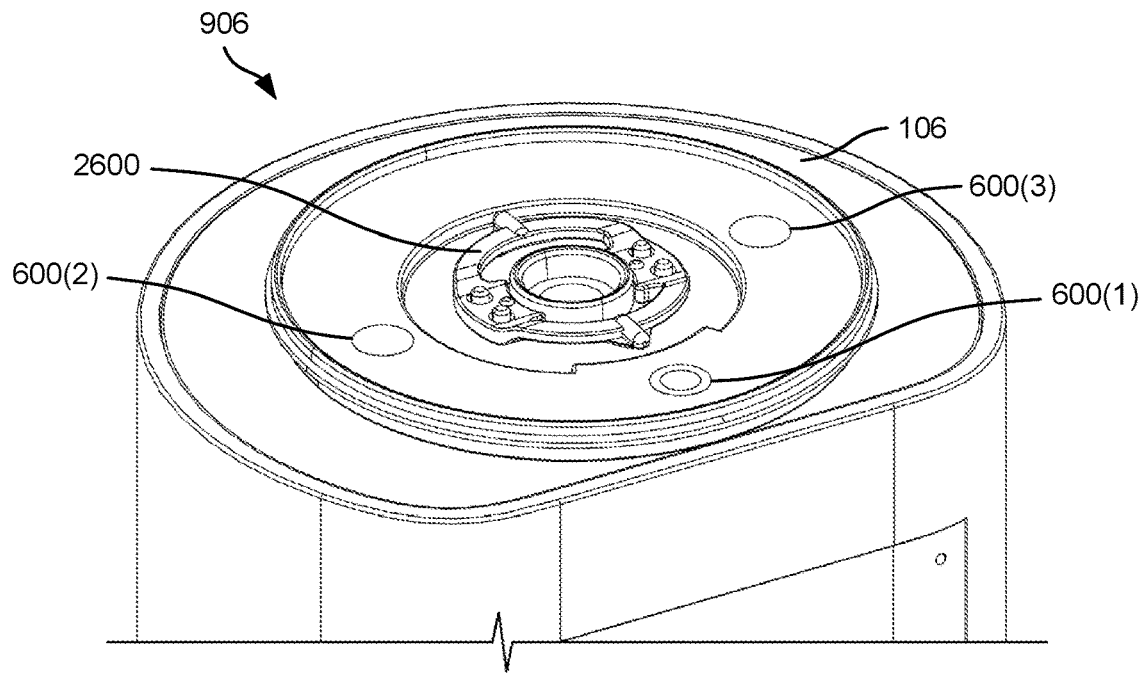
Figure 26C:
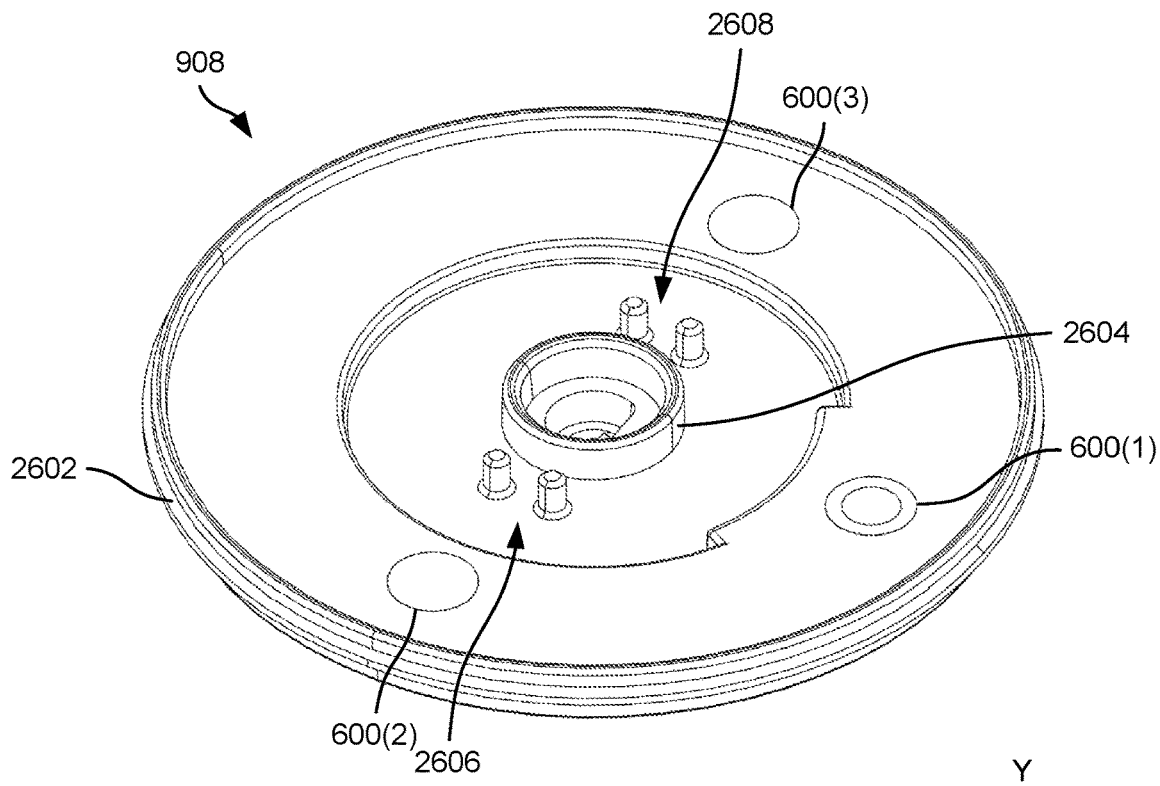
Figure 26D:
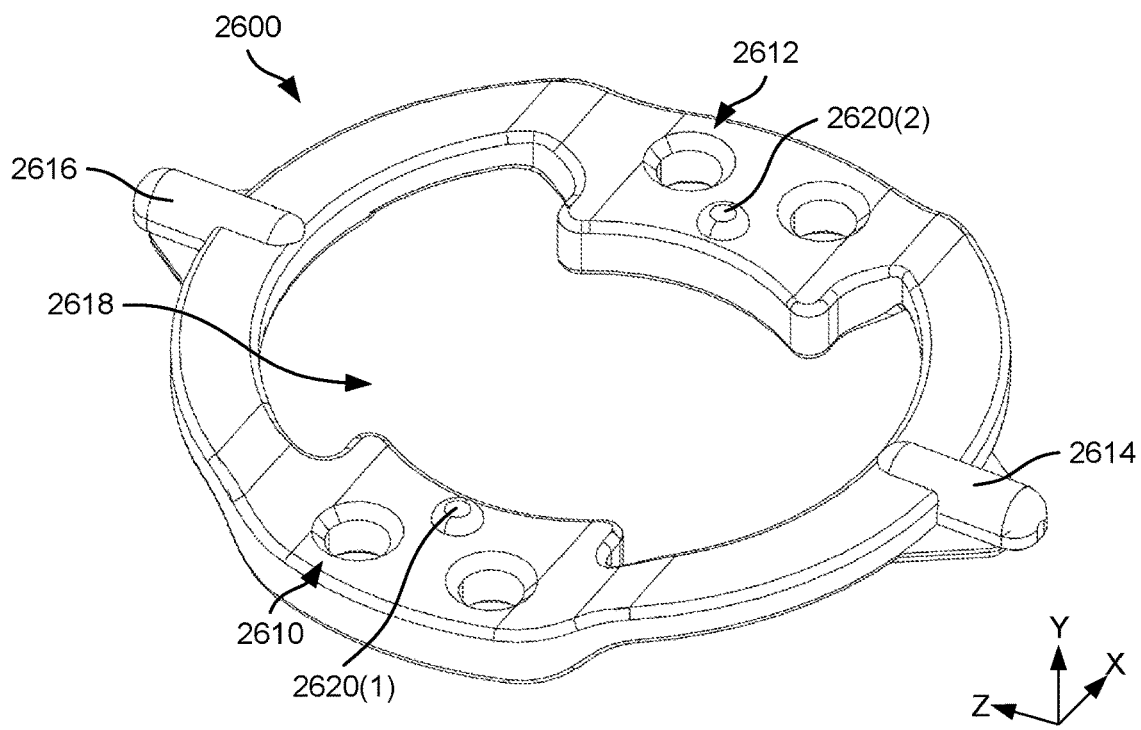

FIGS. 26A-26D illustrate the bracket 906, according to examples of the present disclosure. FIG. 26A illustrates a top view of the bracket 906 coupled to the housing 102, FIG. 26B illustrates a front perspective view of the bracket 906 coupled to the housing 102, FIG. 26C illustrates a front perspective view of the bracket 906, and FIG. 26D illustrates the insert 2600 of the bracket 906.

In some instances, the bracket 906 includes the base 908 and an insert 2600. The base 908 may couple to the top cover 106 (e.g., fasteners), while the insert 2600 may couple to the base 908. The base 908 includes a groove 2602 that engages with the privacy cover 108. For example, as introduced above, the one or more tabs 2412 may snap-over the groove 2602 to couple the privacy cover 108 to the housing 102. Additionally, the annular ridge 2408 of the privacy cover 108 may traverse along a perimeter of the base 908 during rotation of the privacy cover 108.

The base 908 includes the first indications 600(1)-(3). The first indication 600(1) may be visible through the first passageway 124 of the privacy cover 108 in the first position to indicate the obstruction and/or deactivation of the camera 1100. In some instances, the first indication 600(1) includes a first color (e.g., red), first symbol (e.g., "NO"), and/or other visualization (e.g., circle with diagonal line) to indicate that the camera 1100 is obstructed and/or deactivated. The first indication 600(2) may be visible through the first passageway 124 of the privacy cover 108 in the second position to indicate the unobstruction and/or activation of the camera 1100. The first indication 600(3) may be visible through the first passageway 124 of the privacy cover 108 in the third position to indicate the unobstruction and/or activation of the camera 1100. In some instances, the first indication 600(2) and/or the first indication 600(3) includes a second color (e.g., green), first symbol (e.g., "YES"), and/or other visualization (e.g., green circle) to indicate that the camera 1100 is unobstructed and/or activated.

The base 908 includes a receptacle 2604 for receiving the post 2410 of the privacy cover 108. For example, when the privacy cover 108 couples to the bracket 906, the receptacle 2604 may receive the post 2410 (e.g., the post 2410 resides within the receptacle 2604). The base 908 may also include first columns 2606 and second columns 2608 that engage with first openings 2610 and second openings 2612 of the insert 2600. For example, to align and/or otherwise couple the insert 2600 on the base 908, the first openings 2610 may slide over the first columns 2606, and the second openings 2612 may slide over the second columns 2608, respectively.

The insert 2600 is further shown including a first prong 2614 and a second prong 2616. The first prong 2614 and the second prong 2616 may represent features of the insert 2600 that engage with the first protrusions 2400, the second protrusions 2402, the third protrusions 2404, and/or the fourth protrusions 2406 depending upon the position of the privacy cover 108. As shown, the first prong 2614 and the second prong 2616 may be located on opposite sides of the insert 2600. In the first position of the privacy cover 108, the first prong 2614 may reside between/within the first protrusions 2400 and the second prong 2616 may reside between/within the second protrusions 2402. In the second position of the privacy cover 108, the first prong 2614 may reside between/within the third protrusions 2404 and the second prong 2616 may reside between/within the fourth protrusions 2406. In the third position of the privacy cover 108, the first prong 2614 may reside between/within the fourth protrusions 2406 and the second prong 2616 may reside between/within the third protrusions 2404.

The insert 2600 further includes a central slot 2618 through which the receptacle 2604 is disposed when the insert 2600 couples to the base 908. The insert 2600 may further include a first rubber knob 2620(1) and/or a second rubber knob 2620(2) that engage with the interior surface 2310 of the privacy cover 108.

Figure 27A:
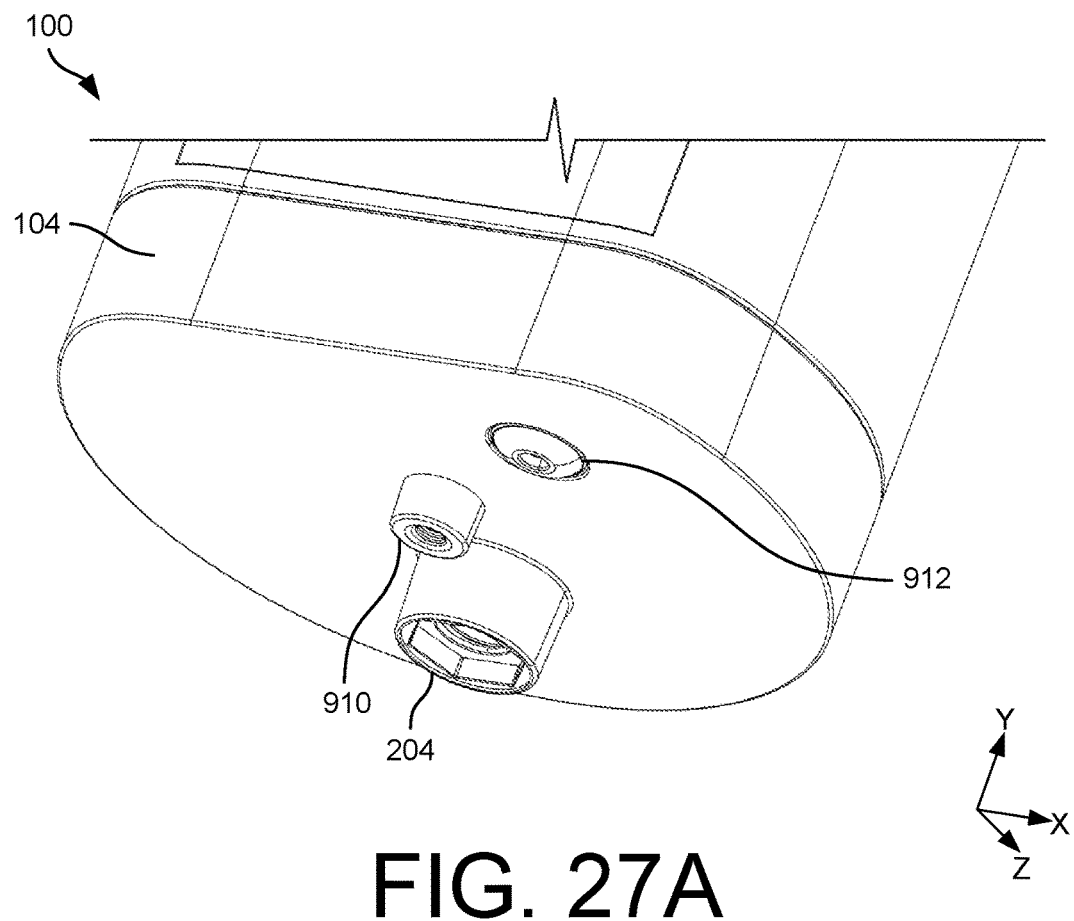
FIGS. 27A-27D illustrate an example bottom cover of the device of FIG. 1, according to an example of the present disclosure.
Figure 27B:
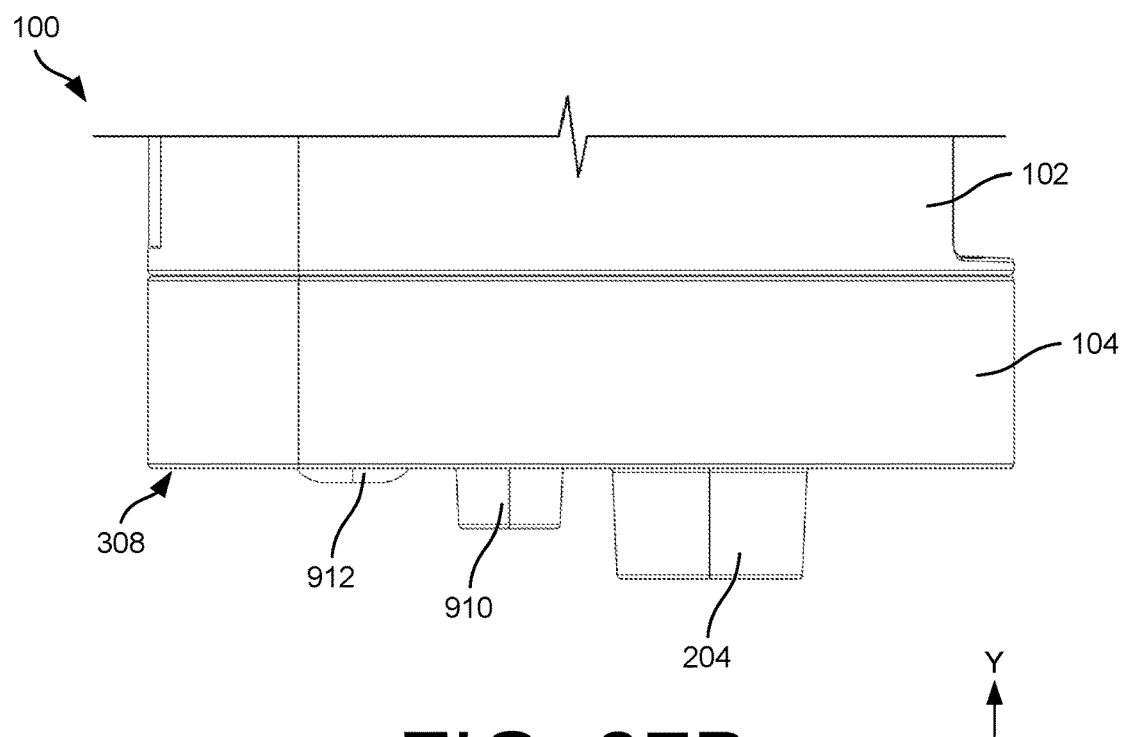
Figure 27C:
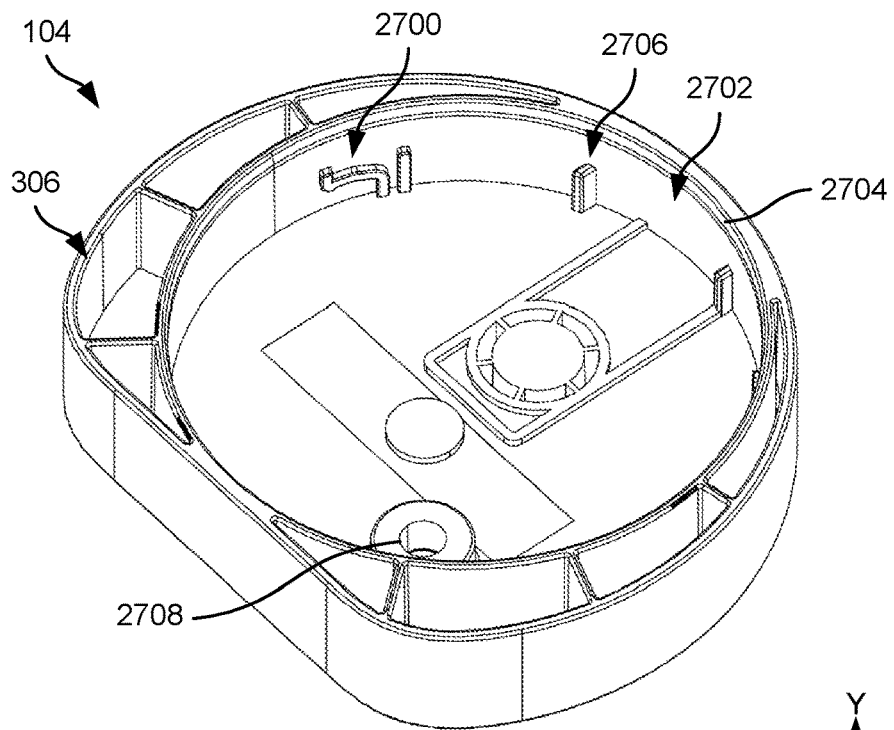
Figure 27D:
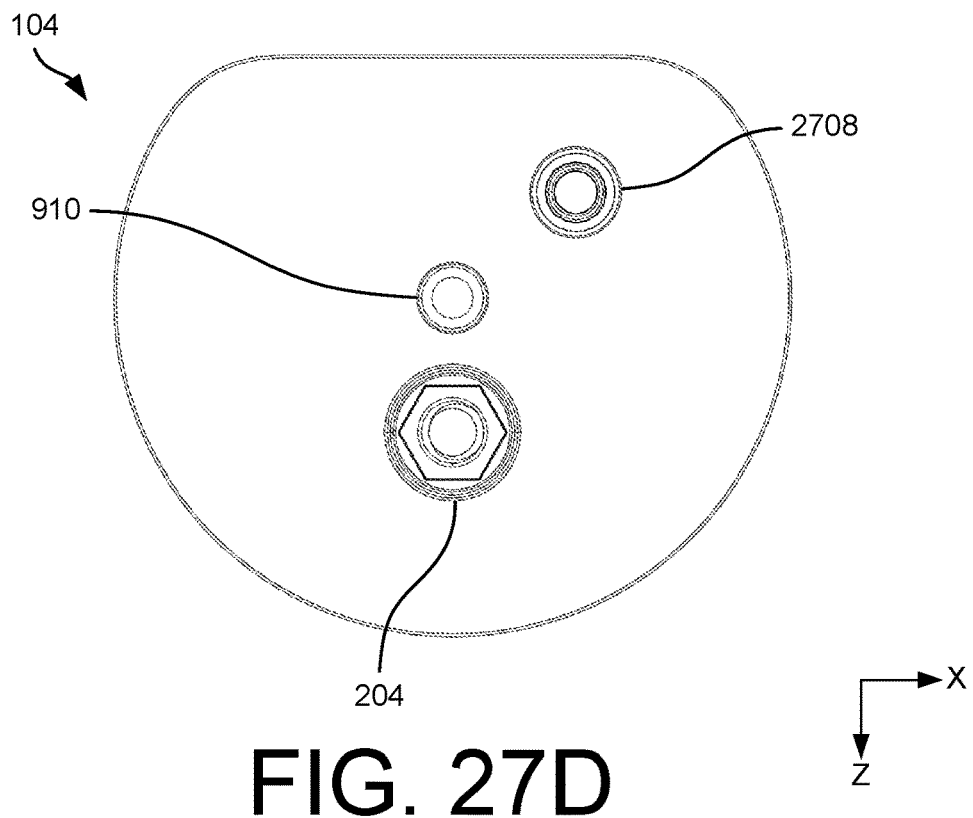

FIGS. 27A-27D illustrate the bottom cover 104, according to examples of the present disclosure. FIG. 27A illustrates a bottom perspective view showing the bottom cover 104 coupled to the housing 102, FIG. 27B illustrates a side view showing the bottom cover 104 coupled to the housing 102, FIG. 27C illustrates a top perspective view of the bottom cover 104, and FIG. 27D illustrates a bottom view of the bottom cover 104.

The bottom cover 104 is configured to couple to the housing 102. For example, the top end 306 of the bottom cover 104 may couple to the bottom end 304 of the housing 102. In some instances, the bottom cover 104 includes second attachment mechanisms 2700 that engage with the first attachment mechanisms 2000 of the housing 102. The second attachment mechanisms 2700 may be disposed within a receptacle 2702, where the receptacle 2702 receives the bottom end 304 of the housing 102. The receptacle 2702 may be defined at least in part by an annulus 2704. In some instances, the second attachment mechanisms 2700 may be defined by or within the annulus 2704 of the bottom cover 104. When the housing 102 and the bottom cover 104 couple together, the bottom end 304 of the housing 102 may be inserted through the annulus 2704 and into the receptacle 2702. Therein, the bottom cover 104 may be rotated to engage the first attachment mechanisms 2000 and the second attachment mechanisms 2700. Rotation in a first direction (e.g., clockwise) may engage the first attachment mechanisms 2000 and the second attachment mechanisms 2700, while rotation in a second direction (e.g., counterclockwise) may disengage the first attachment mechanisms and the second attachment mechanisms 2700.

In some instances, the bottom cover 104 may include alignment tabs 2706 that engage with features of the housing 102. The alignment tabs 2706 may serve to align the housing 102 and the bottom cover 104 such that the first attachment mechanisms 2000 and the second attachment mechanisms 2700 may engage with one another.

The bottom cover 104 is shown including the receptacle 204 and the projection 910. As introduced above, the receptacle 204 may receive the support 504 of the mount 110, and the projection 910 may receive the fastener 500 for coupling the privacy cover 108 to the device 100 (e.g., the bottom cover 104). As shown in FIGS. 27A and 27B, the button 912 (e.g., mechanical-type button) may engage within the bottom cover 104 for being actuated via the rib 2500 of privacy cover 108. In some instances, the receptacle 204 may extend from the bottom end 308 by a first distance, the projection 910 may extend from the bottom end 308 by a second distance that is less than the first distance, and the button 912 (in an unactuated state) may extend from the bottom end 308 by a third distance that is less than the second distance. Disposing the button 912 beyond (e.g., proud of) the bottom end 308 permits the rib 2500 of the privacy cover 108 to actuate the button for disabling components of the device 100.

The button 912 may be disposed through a slot 2708 within the bottom cover 104. The slot 2708 is open at the bottom end 308 and within the receptacle 2702, such that the button 912 may translate (e.g., in the Y-direction) for engaging with the switch 1600 in the device 100. In some instances, the button 912 couples to the bottom cover 104, but may extend into the housing 102 for engaging the switch 1600 that resides in the housing 102. Details of the operation of the button 912 for engaging with the switch 1600 to activate and deactivate components of the device 100 are described in FIGS. 29A and 29B, as well as FIGS. 30A-30D.

Figure 28A:
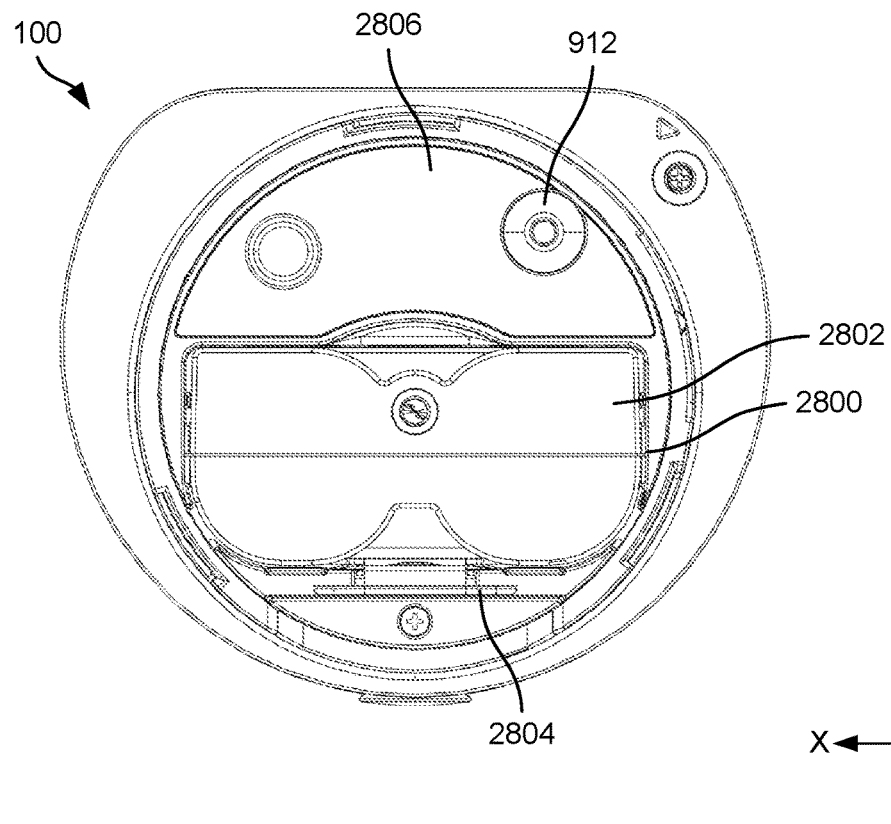
FIGS. 28A and 28B illustrate an example battery and an example battery receptacle of the device of FIG. 1, according to an example of the present disclosure.
Figure 28B:
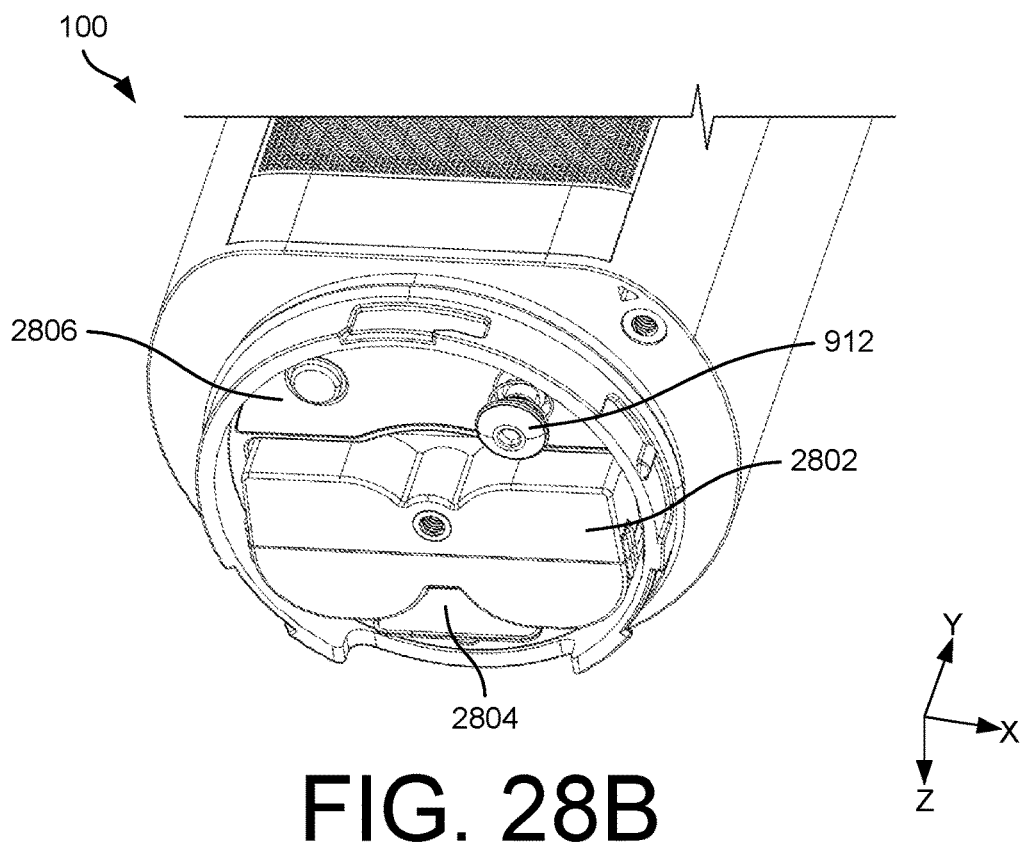

FIGS. 28A and 28B illustrate end views of the housing 102, according to examples of the present disclosure. FIG. 28A illustrates a planar view of the bottom end 304 of the housing 102, while FIG. 28B illustrates a front perspective view of the bottom end 304 of the housing 102.

The device 100 includes the battery housing 1500 that resides within the housing 102. The battery housing 1500 defines a battery receptacle 2800 that receives a battery 2802. The battery 2802 is removably coupled within the battery housing 1500 via an uncoupling of the housing 102 and the bottom cover 104. As such, the battery 2802 may be insertable into the battery housing 1500 via the bottom end 304 of the housing 102. In some instances, a tab 2804 may engage with the battery 2802 to secure the battery 2802 within the battery receptacle 2800. Pressing the tab 2804 (e.g., in the Z-direction and towards a center of the device 100) may permit the battery 2802 to be pulled out of the battery receptacle 2800. Although a single battery receptacle and battery are shown, the battery housing 1500 may include more than one battery receptacle and battery.

The device 100 may further include a membrane 2806 in which the button 912 is configured to engage. The membrane 2806 may environmentally seal an interior of the device 100 from the environment. However, an end of the button 912 may deflect a portion of the membrane 2806 for engaging with the leg 1602 to activate and deactivate the switch 1600.

FIGS. 29A and 29B illustrate cross-sectional views of the device 100, according to examples of the present disclosure.

FIG. 29A illustrates a side cross-sectional view of the device 100, taken along line A-A of FIG. 5, and FIG. 29B illustrates a front cross-sectional view of the device 100 taken along line B-B of FIG. 7B.

In FIGS. 29A and 29B, the privacy cover 108 is shown in the first position. Here, the rib 2500 of the privacy cover 108 engages with the button 912 disposed at least partially within the bottom cover 104 (e.g., within the slot 2708). As the rib 2500 contacts the button 912, the button 912 is vertically translated (e.g., in the Y-direction) to engage the leg 1602 of the battery housing 1500. In some instances, a seal (e.g., O-ring) may be disposed around the button 912 and engaged with sidewalls of the slot 2708. The button 912 may vertically translate within the slot 2708 of the bottom cover 104. As the button 912 translates, the button 912 contacts the leg 1602, which is in turn vertically translated (e.g., in the Y-direction) to engage a lever 2900 of the switch 1600. The lever 2900 is rotatably coupled within or to the switch 1600, such that as the leg 1602 contacts the lever 2900, the lever 2900 rotates (e.g., about the X-axis in the clockwise direction). This rotation of the lever 2900 is sensed via the switch 1600 and in turn, the camera 1100 and/or other components of the device 100 (e.g., the microphones) may be deactivated.

As the privacy cover 108 moves to the second position and the third position, the rib 2500 disengages the button 912 and the button 912 is retracted. For example, a spring 2902 is shown being disposed around the button 912, and the spring 2902 may bias the button 912 to a retracted state. In the retracted state, the leg 1602 also disengages with the lever 2900. The lever 2900 is also biased such that when the leg 1602 no longer contacts the lever 2900, the lever 2900 moves to a retracted state. For example, the lever 2900 may rotate (e.g., about the X-axis in the counterclockwise direction). At this state, the camera 1100 and/or other components of the device 100 may be activated (or permitted to be activated).

In some instances, the membrane 2806 may be interposed between the button 912 and the leg 1602. The membrane 2806 may environmentally seal an interior of the housing 102 from debris, liquid, and the like. However, the membrane 2806 is capable of being deflected or deformed such that as the button 912 is translated, such translation is carried through the membrane 2806 and to the leg 1602. For example, following a translation of the button 912, the membrane 2806 may be deflected and accordingly, the leg 1602 may be moved into engagement with the lever 2900.

In some instances, the leg 1602 is disposed on an end of an arm 2904 of the battery housing 1500. The arm 2904 may be biased via movement of the button 912 and as the button 912 and/or the membrane 2806 contacts the leg 1602. For example, the arm 2904 may defected such that the leg 1602 may contact the lever 2900.

FIGS. 30A-30D illustrate various views showing an engagement between the button 912 and the switch 1600 that deactivates components of the device 100, according to examples of the present disclosure.

As introduced above, an engagement between the rib 2500 of the privacy cover and the leg 1602 causes the leg 1602 to engage the lever of the switch 1600. As the leg 1602 engages the lever 2900, the lever 2900 rotates into to switch 1600 (e.g., clockwise about the X-axis) and causes the camera 1100 and/or other components of the device 100 to deactivate.

The leg 1602 is disposed on an end of the arm 2904 of the battery housing 1500. The arm 2904 may be disposed within a channel 3000 such that the leg 1602 is capable of being translated when the button 912 is actuated. The switch 1600 is further shown coupled to, or disposed on, the main PCB 1400. Further, the spring 2902 may be wound about the button 912, and disposed between the membrane 2806 and a face of the bottom cover 104. The face may reside within the receptacle of the bottom cover 104. An opposite end of the arm 2904 not including the leg 1602 may be coupled to the battery housing 1500. Although the button 912 is described as being a mechanical-type button, in some instances, the button 912 may be resistive-type button, a capacitive-type button, and so forth.

Figure 31:
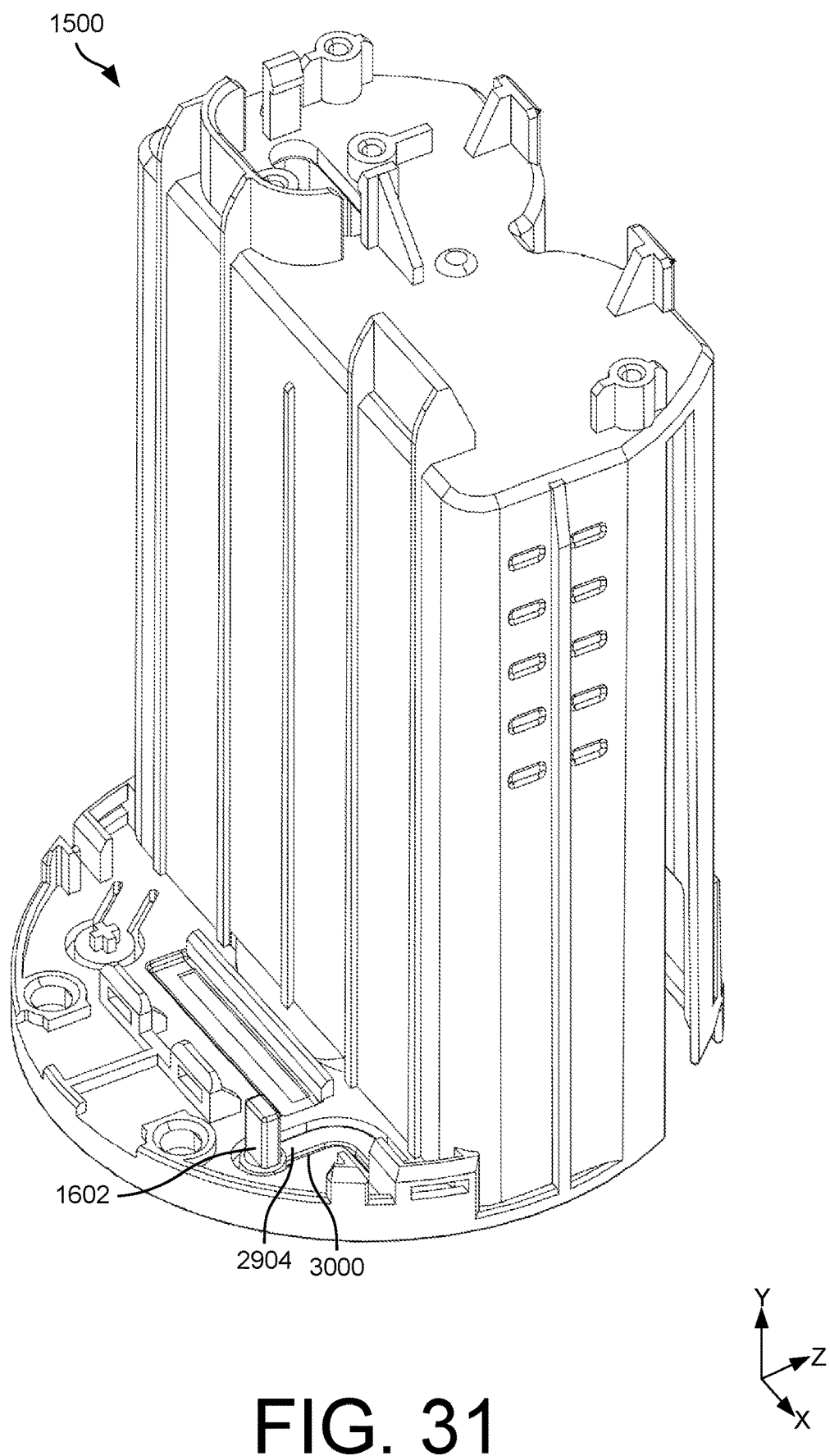
FIG. 31 illustrates an example battery housing of the device of FIG. 1, according to an example of the present disclosure.

FIG. 31 illustrates a front perspective view of the battery housing 1500, according to examples of the present disclosure. The battery housing 1500 defines the channel 3000 in which the arm 2904 translates, as well as the leg 1602 coupled to an end of the arm 2904.

Figure 32:
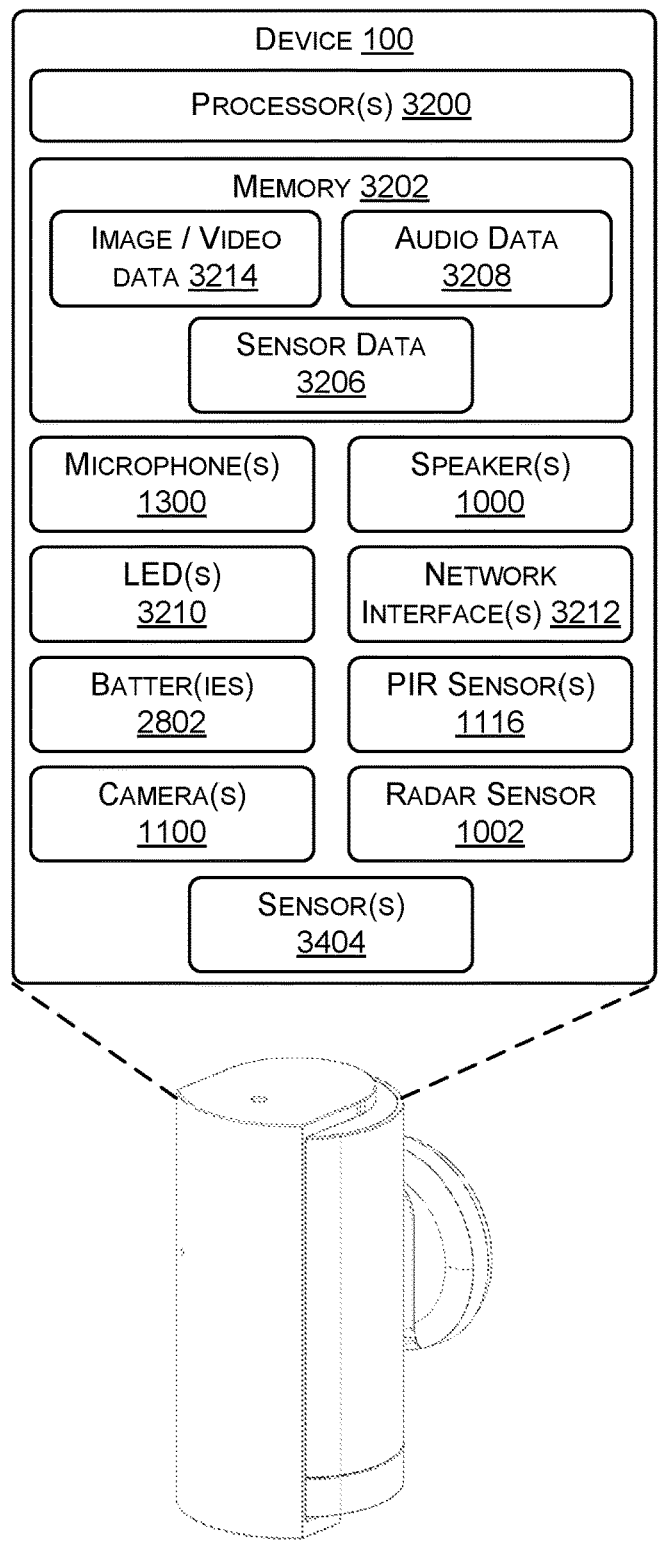
FIG. 32 illustrates select component of the device of FIG. 1, according to an example of the present disclosure.

FIG. 32 illustrates select components of the device 100, according to examples of the present disclosure. The device 100 is shown including processor(s) 3200 and memory 3202, where the processor(s) 3200 may perform various functions associated with controlling an operation of the device 100, and the memory 3202 may store instructions executable by the processor(s) 3200 to perform the operations described herein.

The device 100 includes camera(s) 1100 for capturing image/video data 3214 within an environment of the device 100. In some instances, the camera(s) 1100 may include red, green, blue, depth (RGBD) camera(s) and/or three-dimensional (3D) sensors. Additionally, the device 100 may include any other sensor(s) 3404 (e.g., ambient light sensor) that generates sensor data 3206. Further, the device 100 may include the PIR sensor(s) 1116 and the radar sensor 1002 that generates the sensor data 3206. In some instances, the PIR sensor(s) 1116 act as motion sensors for detecting movement within a field of view. The PIR sensor(s) 1116 may be secured on or within a PIR frame that may reside behind a lens (e.g., a Fresnel lens) of the device 100. In such examples, the PIR sensor(s) 1116 may detect IR radiation in a field of view of the PIR sensor(s) 1116, and produce an output signal (e.g., voltage) that changes as the amount of IR radiation in the field of view changes. The amount of voltage in the output signal may be compared, by the processor(s) 3200, for example, to one or more threshold voltage values to determine if the amount of voltage in the output signal is indicative of motion, and/or if the amount of voltage in the output signal is indicative of motion of an entity that is to be recorded by the camera(s) 1100. In some instances, the PIR sensor(s) 1116 may detect the motion for activating the camera(s) 1100 and/or a microphone(s) 1300 to begin capturing image/video data 3214 and/or audio data 3208, respectively.

In some instances, the PIR sensor(s) 1116 are used to detection motion within an environment of the device 100. However, in some instances, the camera(s) 1100 and/or the Radar sensor 1002, in addition to or alternative from the PIR sensor(s) 1116, may be used to detect motion. For example, computer vision techniques may be used to detect objects of interest. In some instances, the camera(s) 1100 may include a CMOS image sensor, and a digital processor that may perform embedded processing within the low-power CVM itself, such that the low-power CVM may output post-processed computer vision metadata to the processor(s) 3200. The metadata may include information such as the presence of a particular type of entity (e.g., person, animal, vehicle, parcel, etc.), a direction of movement of the entity, a distance of the entity from the device 100, etc. As a result of including the computer vision, the device 100 may leverage computer vision to implement computer vision for one or more aspects, such as motion detection, object recognition, and/or facial recognition. Computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. The device 100 may also include one or more IR cut filter(s).

The device 100 also includes LED(s) 3210, such as IR LEDs and/or white LEDs, for illuminating and/or emitting light within the environment of the device 100. Any number of IR LEDs and/or white LEDs may be included, and the IR LEDs and the white LEDs may be arranged about various sides of the device 100 (e.g., front, sides, etc.). In some instances, in response to the PIR sensor(s) 1116, the camera(s) 1100, and/or the Radar sensor 1002 detecting motion, the LED(s) 3210 may receive an output signal from the processor(s) 3200 that causes the LED(s) 3210 to activate the LED(s) 3210. The IR LEDs may also be used to detect motion and/or record image/video data 3214 in low-light conditions.

The device 100 includes the microphone(s) 1300 that generate audio data 3208. The microphone(s) 1300 may include an array of microphone for beamforming audio signals within the environment of the device 100. Speaker(s) 1000 may output sound in a direction away from the device 100. The sound output by the speaker(s) 1000 may include the audio data 3208, which may be received from one or more communicatively coupled device, or other audio (e.g., siren, alarm, etc.).

Network interface(s) 3212 permit the device 100 to communicate over one or more networks. Example network interface(s) 3212 include, without limitation, Wi-Fi, Bluetooth, ZigBee, Bluetooth Low Energy (BLE), LTE, and so forth. The network interface(s) 3212 permit communication with remote device(s), such as mobile devices (e.g., phone), systems (e.g., cloud), and so forth. The network(s) may be representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

The sensor(s) 3404 may also include the switch 1600, where the sensor data 3206 indicates whether the switch 1600 is in a retracted (e.g., resting) or depressed (e.g., engaged) state. For example, when the button 912 is engaged with the privacy cover 108, the leg 1602 activates the switch. In response, the processor(s) 3200 may cause the camera(s) 1100 and/or other components of the device 100, such as the microphone(s) 1300 to be deactivated. Conversely, when the leg 1602 is not engaged with the switch 1600, the processor(s) 3200 may permit the camera(s) 1100 and/or other components of the device 100, such as the microphone(s) 1300 to be activated (e.g., in response to motion being detected). The processor(s) 3700 may also cause the status indicator 1106 output a second indication when the privacy cover 108 is in the first position, the second position, and the third position, respectively. As such, depending on the position of the privacy cover 108, the processor(s) 3700 may cause certain action(s) associated with the device 100 to be performed, or refrained from being performed.

In some instances, inbound data from may be routed through the network interface(s) 3212 before being directed to the processor(s) 3200, and outbound data from the processor(s) 3200 may be routed through the network interface(s) 3212. The network interface(s) 3212 may therefore receive inputs, such as data, from the processor(s) 3200, the camera(s) 1100, the PIR sensor(s) 1116, the Radar sensor 1002, and so forth. For example, the network interface(s) 3212 may be configured to transmit data to and/or receive data from one or more network devices. The network interface(s) 3212 may act as a conduit for data communicated between various components and the processor(s) 3200.

Batter(ies) 2802 may power the components of the device 100. Any number of batter(ies) 2802 may be included, and the batter(ies) 2802 may be rechargeable/replaceable. Additionally, the device 100 may be powered using a source of external AC (alternating-current) power, such as mains power. When the batter(ies) 2802 are depleted, the batter(ies) 2802 may be recharged by connecting a power source to the batter(ies) 2802 (e.g., using a USB connector).

Although certain components of the device 100 are illustrated, it is to be understood that the device 100 may include additional or alternative components. For example, the device 100 may include other input/output devices (e.g., display screen), heat dissipating elements, computing components (e.g., PCBs), antennas, ports (e.g., USB), and so forth.

As used herein, a processor, such as the processor(s) 3200 may include multiple processors and/or a processor having multiple cores. Further, the processor(s) may comprise one or more cores of different types. For example, the processor(s) may include application processor units, graphic processing units, and so forth. In one implementation, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Memory, such as the memory 3202 may include volatile and nonvolatile memory, removable and non-removable media implemented in any method or technology for storage of information, such as computer-readable instructions, data structures, program component, or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. An electronic device, comprising:
   a housing including an arm with a protrusion;
   a camera disposed at least partially within the housing;
   a microphone disposed at least partially within the housing;
   a button;
   a switch; and
   a privacy cover rotationally coupled to the housing, the privacy cover being rotatable between a first position in which the camera is obstructed, and a second position in which the camera is unobstructed, the privacy cover including a rib, wherein:
      when the privacy cover is in the first position, the rib engages with the button such that the button translates the arm and causes the protrusion to contact the switch and deactivate the camera, and
      when the privacy cover is in the second position, the rib is disengaged from the button such that the protrusion is spaced apart from the switch and the camera is activated and wherein:
      the privacy cover includes:
      a first passageway,
      a second passageway, and
      a light pipe residing at least partially within the second passageway; and
      a light indicator configured to indicate an operational state of the electronic device, the light indicator being configured to emit first light through the light pipe when the privacy cover is in the first position,
      a first indication visible through the first passageway when the privacy cover is in the first position, the first indication indicating that the camera is obstructed; and
      a second indication visible through the first passageway when the privacy cover is in the second position, the second indication indicating that the camera is unobstructed.

2. The electronic device of claim 1, wherein:
   a third indication is visible through the first passageway when the privacy cover is in a third position, the third indication indicating that the camera is unobstructed.

3. The electronic device of claim 1, further comprising an insert including a first prong and a second prong, wherein:

the privacy cover further includes:
first protrusions,
second protrusions,
third protrusions, and
fourth protrusions;
in the first position, the first protrusions engage with the first prong and the second protrusions engage with the second prong;
in the first position, the third protrusions are disengaged from the first prong and the fourth protrusions are disengaged with the second prong;
in the second position, the third protrusions engage with the first prong and the fourth protrusions engage with the second prong; and
in the second position, the first protrusions are disengaged from the first prong and the second protrusions are disengaged with the first prong.

4. A device, comprising:
a housing including an arm;
a camera at least partially disposed within the housing;
one or more microphones at least partially disposed within the housing;
a switch;
a button transitionable between:
a depressed position in which the button translates the arm to engage the switch, and
a non-depressed position in which the arm is disengaged with the switch;
a privacy cover coupled to the housing, the privacy cover including a protrusion on an inner surface of the privacy cover, the privacy cover being transitionable between:
a first position in which the camera is obstructed and the protrusion engages the button to transition the button to the depressed position, and
a second position in which the camera is unobstructed and the protrusion disengages the button to permit the button to transition to the non-depressed position;
one or more processors; and
one or more non-transitory computer-readable media storing computer-executable instructions that, when executed by the one or more processors, cause the one or more processors to perform acts comprising:
determining a state of the switch,
based on the state of the switch, deactivating the camera and the one or more microphones;
determining that the button is in the depressed position; and
based at least in part on determining that the button is in the depressed position, turning off a light source.

5. The device of claim 4, wherein the one or more non-transitory computer-readable media store computer-executable instructions that, when executed by the one or more processors, cause the one or more processors to perform acts comprising:
determining a second state of the switch; and
based on the second state of the switch, activating the camera and the one or more microphones.

6. The device of claim 4, wherein the privacy cover is configured to transition to a third position in which the camera is unobstructed and the protrusion disengages the button.

7. The device of claim 4, wherein the privacy cover includes a first passageway, a second passageway, and a light pipe at least partially disposed within the second passageway, further comprising:

a first visual element associated with the camera being obstructed, the first visual element being visible via the first passageway when the privacy cover is in the first position; and
a second visual element associated with the camera being unobstructed, the second visual element being visible via the first passageway when the privacy cover is in the second position;
wherein the second passageway and the light pipe are arranged such that, when the privacy cover is in the first position, the second passageway is disposed proximate the light source such that light emitted by the light source travels through the light pipe.

8. The device of claim 7, wherein the one or more non-transitory computer-readable media store computer-executable instructions that, when executed by the one or more processors, cause the one or more processors to perform acts comprising:
based at least in part on determining that the button is in the depressed position, causing the light source to emit light of a first color.

9. The device of claim 8, wherein the one or more non-transitory computer-readable media store computer-executable instructions that, when executed by the one or more processors, cause the one or more processors to perform acts comprising:
determining that the button is in the non-depressed position; and
based at least in part on determining that the button is in the non-depressed position, causing the light source to emit light of a second color, the second color being different than the first color.

10. The device of claim 4, wherein:
the privacy cover includes:
a body,
a first arm extending from a first end of the body, the first arm being coupled to a top end of the housing, and
a second arm extending from a second end of the body that is opposite the first end of the body, the second arm being coupled to a bottom end of the housing;
in the first position, the body is disposed at least partially over a front of the device; and
in the second position, the body is disposed at least partially over a side of the device.

11. The device of claim 4, wherein the housing includes a top and a bottom that is opposite the top, further comprising:
a speaker located closer to the bottom of the housing than the camera and the one or more microphones;
one or more lighting elements located closer to the top of the housing than the camera and the speaker;
one or more infrared (IR) sensors located closer to the top of the housing than the speaker, the one or more lighting elements, and the camera; and
a radar sensor located closer to the top of the housing than the speaker and the camera.

12. The device of claim 4, further comprising:
a first cover coupled to a top of the housing; and
a second cover coupled to a bottom of the housing,
wherein the privacy cover rotationally couples to the first cover and the second cover.

13. The device of claim 12, further comprising an insert coupled to the first cover, the insert including a first prong and a second prong, wherein:

the privacy cover further includes:
first protrusions,
second protrusions,
third protrusions, and
fourth protrusions;
in the first position, the first protrusions engage with the first prong and the second protrusions engage with the second prong;
in the first position, the third protrusions are disengaged from the first prong and the fourth protrusions are disengaged with the second prong;
in the second position, the third protrusions engage with the first prong and the fourth protrusions engage with the second prong; and
in the second position, the first protrusions are disengaged from the first prong and the second protrusions are disengaged with the first prong.

14. The device of claim 12, further comprising a mount coupled to at least one of the housing or the second cover.

15. The device of claim 4, wherein when the button is in the depressed position, the button translates the arm to contact with the switch such that the camera and the one or more microphones are deactivated.

16. The device of claim 4, wherein the device is a video doorbell.

17. The device of claim 4, further comprising:
a wireless interface;
a passive infrared sensor; and
a radar sensor.

18. The device of claim 4, further comprising:
an infrared light source; and
an infrared cut filter.

19. The device of claim 4, wherein the privacy cover comprises a light pipe, and wherein, when the privacy cover is in the first position, at least a portion of the light pipe is disposed proximate the light source.

20. The device of claim 19, wherein the one or more non-transitory computer-readable media store computer-executable instructions that, when executed by the one or more processors, cause the one or more processors to perform acts comprising based on the state of the switch, changing a state of the light source.

21. The device of claim 20, wherein changing the state of the light source comprises causing the light source to emit light of a first color.

22. The device of claim 21, wherein the one or more non-transitory computer-readable media store computer-executable instructions that, when executed by the one or more processors, cause the one or more processors to perform acts comprising:
determining a second state of the switch; and
based on the second state of the switch, turning off the light source.

23. The device of claim 21, wherein the one or more non-transitory computer-readable media store computer-executable instructions that, when executed by the one or more processors, cause the one or more processors to perform acts comprising:
determining a second state of the switch; and
based at least in part on the second state of the switch, causing the light source to emit light of a second color.

24. The device of claim 4, wherein the one or more non-transitory computer-readable media store computer-executable instructions that, when executed by the one or more processors, cause the one or more processors to perform acts comprising based on the state of the switch, turning off the light source.

25. The device of claim 4, wherein the one or more non-transitory computer-readable media store computer-executable instructions that, when executed by the one or more processors, cause the one or more processors to perform acts comprising based on the state of the switch, causing the light source to emit light.

26. The device of claim 19, wherein the privacy cover includes a layer of paint covering the light pipe.

27. The device of claim 4, wherein the device comprises a bracket coupled to a housing of the device proximate a first end of the housing, and a cover coupled to the housing proximate a second end of the housing, wherein the privacy cover comprises a first arm proximate a first end of the privacy cover and a second arm proximate a second end of the privacy cover, wherein the first arm comprises tabs that snap over a base of the bracket, and wherein a protruding member of the cover is received within a slot of the second arm.

28. The device of claim 27, wherein the button extends through the cover.

29. The device of claim 4, further comprising a leg having the arm, wherein:
in the first position, the engagement between the protrusion and the button causes the button to translate to engage the leg such that the arm displaces a portion of the switch; and
in the second position, the protrusion disengages with the button.

* * * * *